(12) United States Patent
Lakkis

(10) Patent No.: US 7,483,483 B2
(45) Date of Patent: Jan. 27, 2009

(54) ULTRA-WIDEBAND COMMUNICATION APPARATUS AND METHODS

(75) Inventor: Ismail Lakkis, San Diego, CA (US)

(73) Assignee: Pulse-Link, Inc., Carlsbad, CA (US)

( * ) Notice: Subject to any disclaimer, the term of this patent is extended or adjusted under 35 U.S.C. 154(b) by 616 days.

(21) Appl. No.: 10/984,436

(22) Filed: Nov. 8, 2004

(65) Prior Publication Data

US 2005/0069020 A1 Mar. 31, 2005

Related U.S. Application Data

(63) Continuation-in-part of application No. 10/948,099, filed on Sep. 23, 2004, and a continuation-in-part of application No. 10/120,456, filed on Apr. 9, 2002, now abandoned, which is a continuation-in-part of application No. 10/010,601, filed on Dec. 6, 2001, now Pat. No. 7,289,494.

(60) Provisional application No. 60/547,221, filed on Feb. 23, 2004.

(51) Int. Cl.
*H03K 7/08* (2006.01)

(52) U.S. Cl. ........................ 375/238; 375/354

(58) Field of Classification Search ................ 375/238, 375/239; 370/205; 332/109, 112
See application file for complete search history.

(56) References Cited

U.S. PATENT DOCUMENTS

| | | | |
|---|---|---|---|
| 3,568,148 A | 3/1971 | Clark, Jr. | |
| 4,001,693 A | 1/1977 | Stackhouse et al. | |
| 4,039,972 A | 8/1977 | Scholten et al. | |
| 4,278,978 A | 7/1981 | Frosch et al. | |
| 4,317,210 A | 2/1982 | Dekker et al. | |
| 4,498,174 A | 2/1985 | LeGresley | |
| 4,569,052 A | 2/1986 | Cohn et al. | |
| 4,632,124 A | 12/1986 | Hiller et al. | |
| 4,707,839 A | 11/1987 | Andren et al. | |
| 4,847,876 A | 7/1989 | Baumbach et al. | |
| 4,860,003 A | 8/1989 | DeLuca et al. | |

(Continued)

OTHER PUBLICATIONS

Suk Won Kim, Dong Sam Ha & Jeong Ho Kim, Performance Gain of Smart Antennas with Diversity Combining at Handsets for the 3GPP WCDMA System, 13th International Conference on Wireless Communications (Wireless 2001), Jul. 2001, pp. 235-242, Calgary, ALberta, Canada.

(Continued)

*Primary Examiner*—Kevin Y Kim

(57) ABSTRACT

Apparatus and methods of ultra-wideband communication are provided. In one embodiment, a communication frame is generated and includes a synchronization section, and at least two data sections and at least two preamble sections. An ultra-wideband receiver synchronizes with the ultra-wideband transmitter using the synchronization section, and may also re-synchronize with the transmitter using at least one preamble section. In another embodiment, the length of the data sections are selected to ensure that drift between the ultra-wideband receiver and transmitter will be minimal before re-synchronization. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

40 Claims, 36 Drawing Sheets

U.S. PATENT DOCUMENTS

| | | |
|---|---|---|
| 4,905,234 A | 2/1990 | Childress et al. |
| 5,041,836 A | 8/1991 | Paschen et al. |
| 5,087,835 A | 2/1992 | Hattangadi |
| 5,109,390 A | 4/1992 | Gilhousen et al. |
| 5,170,412 A | 12/1992 | Massey |
| 5,177,765 A | 1/1993 | Holland et al. |
| 5,177,767 A | 1/1993 | Kato |
| 5,235,326 A | 8/1993 | Beigel et al. |
| 5,260,976 A | 11/1993 | Dolivo et al. |
| 5,377,223 A | 12/1994 | Schilling |
| 5,389,939 A | 2/1995 | Tang et al. |
| 5,396,110 A | 3/1995 | Houston |
| 5,416,767 A | 5/1995 | Koppelaar et al. |
| 5,422,952 A | 6/1995 | Kennedy et al. |
| 5,457,702 A | 10/1995 | Williams et al. |
| 5,467,367 A | 11/1995 | Izumi et al. |
| 5,555,183 A | 9/1996 | Willard et al. |
| 5,561,468 A | 10/1996 | Bryan et al. |
| 5,563,909 A | 10/1996 | Nakazawa |
| 5,590,399 A | 12/1996 | Matsumoto et al. |
| 5,606,729 A | 2/1997 | D'Amico et al. |
| 5,633,889 A | 5/1997 | Schilling et al. |
| 5,642,391 A | 6/1997 | Ewell et al. |
| 5,644,568 A | 7/1997 | Ayerst et al. |
| 5,675,572 A | 10/1997 | Hidejima et al. |
| 5,677,927 A | 10/1997 | Fullerton et al. |
| 5,680,419 A | 10/1997 | Bottomley |
| 5,734,963 A | 3/1998 | Fitzgerals et al. |
| 5,757,766 A | 5/1998 | Sugita |
| 5,784,387 A | 7/1998 | Widmer |
| 5,787,118 A | 7/1998 | Ueda |
| 5,790,591 A | 8/1998 | Gold et al. |
| 5,793,756 A | 8/1998 | Ayerst et al. |
| 5,809,060 A | 9/1998 | Cafarella et al. |
| 5,822,359 A | 10/1998 | Bruckert et al. |
| 5,835,498 A | 11/1998 | Kim et al. |
| 5,852,770 A | 12/1998 | Kasamatsu |
| 5,867,478 A | 2/1999 | Baum et al. |
| 5,870,432 A | 2/1999 | Kerckhove |
| 5,903,556 A | 5/1999 | Matui |
| 5,926,503 A | 7/1999 | Kelton et al. |
| 5,930,296 A | 7/1999 | Kot |
| 5,943,331 A | 8/1999 | Lavean |
| 5,949,813 A | 9/1999 | Hunsinger et al. |
| 5,978,412 A | 11/1999 | Takai |
| 5,991,308 A | 11/1999 | Fuhrmann et al. |
| 5,991,331 A | 11/1999 | Chennakeshu et al. |
| 6,005,640 A | 12/1999 | Strolle et al. |
| 6,012,161 A | 1/2000 | Ariyavisitakul |
| 6,023,783 A | 2/2000 | Divsalar |
| 6,032,033 A | 2/2000 | Morris et al. |
| 6,034,987 A | 3/2000 | Chennakeshu et al. |
| 6,049,707 A | 4/2000 | Buer et al. |
| 6,064,663 A | 5/2000 | Honkasalo et al. |
| 6,067,290 A | 5/2000 | Paulraj et al. |
| 6,078,576 A | 6/2000 | Schilling et al. |
| 6,078,607 A | 6/2000 | Monroe et al. |
| 6,081,562 A | 6/2000 | He et al. |
| 6,108,317 A | 8/2000 | Jones et al. |
| 6,128,276 A | 10/2000 | Agee |
| 6,128,330 A | 10/2000 | Schilling |
| 6,128,387 A | 10/2000 | Hsieh |
| 6,128,473 A | 10/2000 | Ritzen et al. |
| 6,133,876 A | 10/2000 | Fullerton et al. |
| 6,141,374 A | 10/2000 | Burns |
| 6,142,946 A | 11/2000 | Hwang et al. |
| 6,154,486 A | 11/2000 | Scott et al. |
| 6,185,258 B1 | 2/2001 | Alamouti et al. |
| 6,191,724 B1 | 2/2001 | McEwan |
| 6,192,068 B1 | 2/2001 | Fattouche et al. |
| 6,198,327 B1 | 3/2001 | Takahashi |
| 6,198,989 B1 | 3/2001 | Tankhilevich et al. |
| 6,215,777 B1 | 4/2001 | Chen et al. |
| 6,215,814 B1 | 4/2001 | Ylitalo et al. |
| 6,222,832 B1 | 4/2001 | Proctor |
| 6,256,508 B1 | 7/2001 | Nakagawa |
| 6,259,687 B1 | 7/2001 | Lomp et al. |
| 6,298,092 B1 | 10/2001 | Heath, Jr. et al. |
| 6,298,726 B1 | 10/2001 | Adachi et al. |
| 6,300,903 B1 | 10/2001 | Richards et al. |
| 6,301,681 B1 | 10/2001 | Chen et al. |
| 6,307,868 B1 | 10/2001 | Rakib et al. |
| 6,310,866 B1 | 10/2001 | Kronestedt et al. |
| 6,317,411 B1 | 11/2001 | Whinnett et al. |
| 6,320,897 B1 | 11/2001 | Fattouche et al. |
| 6,337,878 B1 | 1/2002 | Endres |
| 6,351,499 B1 | 2/2002 | Paulraj et al. |
| 6,356,607 B1 | 3/2002 | Scott et al. |
| 6,363,107 B1 | 3/2002 | Scott |
| 6,366,613 B2 | 4/2002 | Sommer et al. |
| 6,388,997 B1 | 5/2002 | Logan |
| 6,392,500 B1 | 5/2002 | McCallister et al. |
| RE37,802 E | 7/2002 | Fattouche et al. |
| 6,430,170 B1 | 8/2002 | Saints et al. |
| 6,459,246 B1 | 10/2002 | Roo |
| 6,459,728 B1 | 10/2002 | Bar-David et al. |
| 6,466,610 B1 | 10/2002 | Schilling |
| 6,473,467 B1 | 10/2002 | Wallace et al. |
| 6,501,841 B1 | 12/2002 | Horne |
| 6,526,090 B1 | 2/2003 | Papasakellariou |
| 6,529,488 B1 | 3/2003 | Urs et al. |
| 6,529,545 B2 | 3/2003 | Tiirola et al. |
| 6,549,567 B1 | 4/2003 | Fullerton |
| 6,549,588 B2 | 4/2003 | Neubauer |
| 6,560,463 B1 | 5/2003 | Santhoff |
| 6,563,856 B1 | 5/2003 | O'Shea et al. |
| 6,570,912 B1 | 5/2003 | Mirfakhraei |
| 6,570,919 B1 | 5/2003 | Lee |
| 6,603,818 B1 | 8/2003 | Dress, Jr. |
| 6,606,350 B2 | 8/2003 | Dress, Jr. |
| 6,630,897 B2 | 10/2003 | Low et al. |
| 6,650,910 B1 | 11/2003 | Mazur et al. |
| 6,657,551 B2 | 12/2003 | Huckaba et al. |
| 6,683,955 B1 | 1/2004 | Horne |
| 6,690,723 B1 | 2/2004 | Goose et al. |
| 6,690,741 B1 | 2/2004 | Larrick et al. |
| 6,700,881 B1 | 3/2004 | Kong et al. |
| 6,700,939 B1 | 3/2004 | McCorkle et al. |
| 6,701,129 B1 | 3/2004 | Hashem et al. |
| 6,748,025 B1 | 6/2004 | Hickling |
| 6,754,294 B1 | 6/2004 | Adireddy et al. |
| 6,757,543 B2 | 6/2004 | Moran et al. |
| 6,763,075 B2 | 7/2004 | Zhengdi |
| 6,765,517 B1 | 7/2004 | Ali |
| 6,771,976 B1 | 8/2004 | Koyama |
| 6,781,470 B2 | 8/2004 | Rogerson |
| 6,785,323 B1 | 8/2004 | Proctor, Jr. |
| 6,795,424 B1 | 9/2004 | Kooper et al. |
| 6,810,259 B1 | 10/2004 | Zhang |
| 6,833,767 B1 | 12/2004 | Huff et al. |
| 6,842,495 B1 | 1/2005 | Jaffe et al. |
| 6,851,086 B2 | 2/2005 | Szymanski |
| 6,856,652 B2 | 2/2005 | West et al. |
| 6,904,110 B2 | 6/2005 | Trans et al. |
| 6,931,078 B2 | 8/2005 | McCorkle et al. |
| 6,937,667 B2 | 8/2005 | Fullerton et al. |
| 6,941,378 B2 | 9/2005 | Apostolopoulos et al. |
| 6,944,232 B2 | 9/2005 | Koga et al. |
| 6,946,981 B1 | 9/2005 | Zilberman et al. |
| 6,947,498 B2 | 9/2005 | Reed |
| 6,952,444 B1 | 10/2005 | Segal et al. |
| 6,952,456 B1 | 10/2005 | Aiello et al. |
| 6,990,348 B1 | 1/2006 | Benveniste |
| 7,046,187 B2 | 5/2006 | Fullerton et al. |

| | | |
|---|---|---|
| 7,050,508 B2 | 5/2006 | Sorrells |
| 7,072,413 B2 | 7/2006 | Walton et al. |
| 7,076,168 B1 | 7/2006 | Shattil |
| 7,076,927 B2 | 7/2006 | Trpkovski |
| 7,088,795 B1 | 8/2006 | Aiello et al. |
| 7,123,843 B2 | 10/2006 | Melick et al. |
| 7,145,954 B1 | 12/2006 | Pendergrass et al. |
| 7,154,955 B2 | 12/2006 | Suwa et al. |
| 7,206,349 B2 | 4/2007 | Linnartz et al. |
| 7,209,523 B1 | 4/2007 | Larrick et al. |
| 7,236,757 B2 | 6/2007 | Raghavan et al. |
| 2001/0017563 A1 | 8/2001 | Kim |
| 2001/0019282 A1 | 9/2001 | Kuhne |
| 2001/0025361 A1 | 9/2001 | Kim |
| 2001/0026584 A1 | 10/2001 | Sommer et al. |
| 2001/0030973 A1 | 10/2001 | Lomp et al. |
| 2001/0038674 A1 | 11/2001 | Trans |
| 2001/0040931 A1 | 11/2001 | Samueli et al. |
| 2001/0048333 A1 | 12/2001 | Fujii |
| 2001/0050623 A1 | 12/2001 | Kalman |
| 2002/0034191 A1 | 3/2002 | Shattil |
| 2002/0042899 A1 | 4/2002 | Tzannes et al. |
| 2002/0048333 A1 | 4/2002 | Ahmed et al. |
| 2002/0064245 A1 | 5/2002 | McCorkle |
| 2002/0097790 A1 | 7/2002 | Dress et al. |
| 2002/0114355 A1 | 8/2002 | Kim et al. |
| 2002/0118783 A1 | 8/2002 | Cripps et al. |
| 2002/0126769 A1 | 9/2002 | Jett et al. |
| 2002/0146994 A1 | 10/2002 | Marrah et al. |
| 2002/0159425 A1 | 10/2002 | Uesugi et al. |
| 2002/0176511 A1 | 11/2002 | Fullerton et al. |
| 2002/0190786 A1 | 12/2002 | Yoon et al. |
| 2003/0033575 A1 | 2/2003 | Richardson et al. |
| 2003/0040329 A1 | 2/2003 | Yona et al. |
| 2003/0048840 A1 | 3/2003 | Ling et al. |
| 2003/0053555 A1 | 3/2003 | McCorkle et al. |
| 2003/0067963 A1 | 4/2003 | Miller et al. |
| 2003/0079171 A1 | 4/2003 | Coe |
| 2003/0091100 A1 | 5/2003 | El Nahas El Homsi et al. |
| 2003/0104788 A1 | 6/2003 | Kim |
| 2003/0108133 A1 | 6/2003 | Richards |
| 2003/0128776 A1 | 7/2003 | Rawlins et al. |
| 2003/0147655 A1 | 8/2003 | Shattil |
| 2003/0161411 A1 | 8/2003 | McCorkle et al. |
| 2003/0193970 A1 | 10/2003 | Kim et al. |
| 2003/0202537 A1 | 10/2003 | Rogerson et al. |
| 2003/0227980 A1 | 12/2003 | Batra et al. |
| 2004/0001540 A1 | 1/2004 | Jones |
| 2004/0008617 A1 | 1/2004 | Dabak et al. |
| 2004/0034828 A1 | 2/2004 | Hocevar |
| 2004/0047430 A1 | 3/2004 | McCarty |
| 2004/0052312 A1 | 3/2004 | Matero |
| 2004/0057575 A1 | 3/2004 | McCarty |
| 2004/0070433 A1 | 4/2004 | Adams et al. |
| 2004/0071249 A1 | 4/2004 | Schell |
| 2004/0086027 A1 | 5/2004 | Shattil |
| 2004/0087291 A1 | 5/2004 | Wada |
| 2004/0098659 A1 | 5/2004 | Bjerke et al. |
| 2004/0141561 A1 | 7/2004 | Santhoff et al. |
| 2004/0151269 A1 | 8/2004 | Balakrishnan |
| 2004/0153938 A1 | 8/2004 | Okamura et al. |
| 2004/0161064 A1 | 8/2004 | Brethour et al. |
| 2004/0174928 A1 | 9/2004 | Siwiak |
| 2004/0176121 A1 | 9/2004 | Zhou |
| 2004/0213351 A1 | 10/2004 | Shattil |
| 2004/0213352 A1 | 10/2004 | Lundby et al. |
| 2004/0218581 A1 | 11/2004 | Cattaneo |
| 2004/0218683 A1 | 11/2004 | Batra et al. |
| 2004/0224656 A1 | 11/2004 | Mimura et al. |
| 2004/0234147 A1 | 11/2004 | Malvar |
| 2004/0239562 A1 | 12/2004 | Schantz |
| 2004/0266374 A1* | 12/2004 | Saed et al. .............. 455/134 |
| 2005/0031045 A1 | 2/2005 | Mayor et al. |
| 2005/0053121 A1 | 3/2005 | Lakkis |
| 2005/0084031 A1 | 4/2005 | Rosen et al. |
| 2005/0105594 A1 | 5/2005 | Giannakis et al. |
| 2005/0157782 A1 | 7/2005 | Lakkis |
| 2005/0159129 A1 | 7/2005 | Iida |
| 2005/0207351 A1 | 9/2005 | Inagawa |
| 2006/0039317 A1 | 2/2006 | Subramanian et al. |
| 2006/0193373 A1 | 8/2006 | Agee et al. |
| 2006/0291537 A1 | 12/2006 | Fullerton et al. |
| 2007/0053471 A1 | 3/2007 | Feher |

OTHER PUBLICATIONS

Yiannia Argyropoulos, Scott Jordon & Srikanta P. R. Kumar, Dynamic Channel Allocation in Interference-Limited Cellular SYstems with Uneven Traffic Distribution, IEEE Transactions on Vehicular Technology, vol. 48, No. 1, Jan. 1999, pp. 224-232.

Anurag Kahol, Sumit Khurana, Sandeep K Gupta & Pradip K Srimani, Adaptive Distributed Dynamic Channel Allocation for Wireless Networks, Computer Science Technical Report CS-98-105, May 27, 1998, 11 pages.

Shengli Zhou & Georgios B. Giannakis, Space-Time Coding with Maximum Diversity Gains Over Frequency-Selective Fading Channels, IEEE Signal Processing Letters, vol. 8, No. 10, Oct. 2001, pp. 269-272.

Zhiqiang Liu, Yan Xin & Georgios B. Giannakis, Space-Time-Frequency Coded OFDM Over Frequency-Selective Fading Channels, IEEE Transactions on Signal Processing, vol. 50, No. 10, Oct. 2002, pp. 2465-2476.

Hector Salgado, Marvin Sirbu & Jon Peha, Spectrum Sharing Through Dynamic Channel Assignment for Open Access to Personal Communications Services, Proc. of IEEE Intl. COmmunications Comference (ICC), Jun. 1995, pp. 417-422.

Helmut Bolcskei, Moritz Borgmann & Arogyaswami J. Paulraj, Space-Frequency Coded MIMO-OFDM with Variable Multiplexing-Diversity Tradeoff, IEEE 2003, pp. 2837-2841.

Timothy X Brown, Dynamic Channel Assignment in Shotgun Cellular Systems, Proc. of 1999 IEEE Radio and Wireless Conference (RAWCON99), pp. 147-150.

Chi Chung Lam, An Efficient Distributed Channel Allocation Algorithm Based on Dynamic Channel Boundaries, IEEE 1996, pp. 236-243.

Azzedine Boukerche, Sungbum Hong & Tom Jacob, Distributed Dynamic Channel Allocation for Mobile Communication System, Proceedings of the Eighth International Symposium on Modeling, Analysis and Simulation of Computer and Telecommunications Systems, IEEE 2000.

Jonathan S. Blogh, Peter J. Cherriman & Lajos Hanzo, Dynamic Channel Allocation Techniques Using Adaptive Modulation and Adaptive Antennas, IEEE Journal on Selected Areas in Communication, vol. 19, No. 2, Feb. 2001, pp. 312-321.

Sergio Verdu, Wireless Bandwidth in the Making, Multiple Access for Broadband Wireless Networks, IEEE Communications Magazine, Jul. 2000, pp. 53-58.

Jeff Foerster et al., Intel CFP Presentation for a UWB PHY, IEEE P802.15 Working Group for Wireless Personal Area Networks, IEEE 802.15-03/109, Mar. 3, 2003, 53 pages.

Joy Kelly et al., Multi-band OFDM Physical Layer Proposal Update, IEEE P802.15 Working Group for Wireless Personal Area Networks, IEEE 802.15-04/0122r4, Mar. 15, 2004, 26 pages.

David G. Leeper, Wireless Data Blaster, Scientific American, May 2002, pp. 64-69.

Bruno Pattan, A Brief Exposure to Ultra-Wideband Signaling, Microwace Journal, Dec. 2003, 5 pages.

Zhong Ye, Gary J. Saulnier, Kenneth S. Vastola and Michael J. Medley, Throuput Analysis for a Packet Radio Network Using Rate Adaptive OFDM Signaling, IEEE International Conference on Communications, Jun. 1999, 7 pages.

Patrick Vandenameele, Liesbet Van Der Perre, Marc Engels, Bert Gyselinckx and Hugo de Man, A Combined OFDM/SDMA Approach, IEEE Journal on Selected Areas in Communications, Nov. 2000, 27 pages.

Justin Chuang and Nelson Sollenberger, Beyond 3G: Wideband Wireless Data Access Based on OFDM and Dynamic Packet Assignment, Multiple Access for Broadband Wireless Networks, IEEE Communications Magazine, Jul. 2000, pp. 78-87.

Ove Edfords, Magnus Sandell, Jan-Jaap Van De Beek, Daniel Lamdstrom and Frank Sjoberg, An Introduction to orthogonal frequency-division multiplexing, Sep. 1996, 50 pages.

Rick S. Blum, Ye Li, Jack H. Winters and Qing Yan, Improved Space—Time Coding for MIMO-OFDM Wireless Communications, IEEE Transactions on Communications, vol. 49, No. 11, Nov. 2001, pp. 1873-1878.

Cheong Yui Wong, Roger S. Cheng, Khaled Ben Letaief and Ross D. Murch, Multiuser OFDM with Adaptive Subcarrier, Bit, and Power Allocation, IEEE Journal on Selected Areas in Communications, vol. 17, No. 10, Oct. 1999, pp. 1747-1758.

John A C. Bingham, Multicarrier Modulation for Data Transmission: An Idea Whose Time Has Come, IEEE Communications Magazine, May 1990, pp. 5-14.

Ramjee Prasad & Tero Ojanpera, An Overview of CDMA Evolution Toward Wideband CDMA, IEEE Communications Survey, Fourth Quarter 1998, vol. 1 No. 1, 28 pages.

CWTS WG1, Method and Principles of Uplink Synchronization, TSG-RAN Working Group 1 (Radio) meeting #5, Cheju, South Korea, Jun. 1-4, 1999, 6 pages.

Aijanen, Jussi et al. "Frame Configuration Impact to the Performance of Ultra TDD System" University of Jyvaskyla, Dep. of Mathematical Information Technology, pp. 1-5, Sep. 2003.

Alamouti, A Simple Transmit Diversity Technique for Wireless Communications, vol. 16, No. 8, Oct. 1998.

Baccarelli et al., A Novel Reduced-Complexity MAP Equalizer Using Soft-Statistics for Decision-Feedback ISI Cancellation, Info-Com Dpt. University of Rome, Italy, 5 pages, 1999.

Baier, Paul Walter et al., "Taking the Challenge of Multiple Access for Third-Generation Cellular Mobile Radio Systems—A European View" IEEE Communications Magazine, Feb. 1996, pp. 82-89.

Balakrishnan, Bidirectional Decision Feedback Equalization and Mimo Channel Training, A Dissertation presented to the faculty of Graduate School of Cornell University, Aug. 2002, 159 pages.

Celik, A New Method to Reduce Error Propagation in Decision Feedback Equalizer, IJCI Proceedings of International Conference on Signal Processing, ISSN 1304-2386, vol. 1, No. 2, Sep. 2003, pp. 213-216.

Chaudhury, Prodip et al. "The 3GPP Proposal for IMT-2000" IEEE Communications Magazine, Dec. 1999, pp. 72-81.

Cherubini, Giovanni "Hybrid TDMA/CDMA Based on Filtered Multitone Modulation for Uplink Transmission in HFC Networks" IEEE Communications Magazine, Oct. 2003, pp. 108-115.

Chiani, Introducing Erasures in Decision-Feedback Equalization to Reduce Error Propagation, IEEE Transactions on Communications, vol. 45, No. 7, Jul. 1997, pp. 757-760.

Choi et al., Receivers With Chip-Level Decision Feedback Equalizer for CDMA Downlink Channels, IEEE Transactions on Wireless Communications, vol. 3, No. 1, Jan. 2004, pp. 300-314.

Cramer, et al., Impulse Radio Multipath Characteristics and Diversity Reception, IEEE, 5 page.

Drewes et al., Adaptive Equalization for Wireless ATM, 13th International Conference on Digital Signaling Processing (DSP '97), Santorini, Greec, Jul. 1997, 4 pages.

Ertel, et al., Overview of Spatial Channel Models for Antenna Array Communication Systems, IEEE Personal Communications, Feb. 1998, pp. 10-22.

Fleminget al., CMOS Ultra-Wideband Localizers for Networking in the Extreme, Sep. 10, 2001, 28 pages.

Fujii et al., Implementation of Space-Time Equalizer Using Multiple Single-Constrained SMI Array Processors and MLSE, IEEE Transactions on Wireless Communications, vol. 1, No. 2, Apr. 2002, pp. 333-341.

Gallager, Low-Density Parity-Check Codes, Cambridge, Massachussets, Jul. 1963, 90 pages.

Galli, Optimal Non-Linear MMSE Channel Estimation for Broadband Wireless TDMA Systems and Necessity of Soft Decisions, Telcordia Technologies Inc, Morristwown, New Jersey, 7 pages, 2001.

Guilloud, Generic Architecture for LDPC Codes Decoding, Telecom Paris, Jul. 2004, 174 pages.

Haas, Harold "A Dynamic Channel Assignment Algorithm for a Hybrid TDMA/CDMA—TDD Interface Using the Novel TS-Operating Technique" IEEE Journal on Selected Areas in Communications, vol. 19, No. 10, Oct. 2001, pp. 1831-1846.

Karkooti, Semi-Parallel Architectures For Real-Time LDPC Coding, A Thesis Submitted in Partial Fulfillment of the Requirements for the Degree Master of Science, Rice University, Houston, Texas, May 2004, 78 pages.

Krishnamachari et al., Ultra High Speed Digital Processing for Wireless System using Passive Microwave Logic, The Cooper Union for the Advancement of Science and Art, Rawcon'98 Proceedings, 1998 IEEE, New York, New York, 4 pages.

Le Martret, et al., All-Digital Impulse Radio with Multiuser Detection for Wireless Cellular Systems, IEEE Transactions on Communications, vol. 50, No. 9, Sep. 2002, pp. 1440-1450.

Levine et al., Implementation of Near Shannon Limit Error-Correction Codes Using Reconfigurable Hardware, Carnegie Mellon University, Pittsburg, Pennsylvania, 10 pages, 2000.

Lida et al., IEEE 2005 Digest of Technical Papers, "A 3 to 5GHz CMOS DSSS UWB Transceiver for WPANs", vol. 48, Section 11.8, Feb. 6, 2005, pp. 214-215.

Lopes et al., Exploiting Error-Control Coding in Blind Channel Estimation, School of Electrical and Computer Engineering, Georgia Institute of Technology, 6 pages, 2001.

Lopez-Valcarce, Realizable Linear and Decision Feedback Equalizers: Properties and Connections, IEEE Transactions on Signal Processing vol. 52, No. 3, Mar. 2004, pp. 757-773.

Lu et al., LDPC-Based Space-Time Coded OFDM Systems Over Correlated Fading Channels: Performance Analysis and Receiver Design, IEEE Transactions on Communications, vol. 50, No. 1, Jan. 2002, pp. 74-88.

Lu, et al., A Practical Implementation of Broadband Multiple Antenna Systems, 0-7803-4788-9/98 IEEE 1998, 5 pages.

M'Sir et al., Designing a High Speed Decoder for Cycling Codes, Proceedings of the 10th IEEE International On-Live Testing Symposium (IOTS'04), 6 pages, France, 2004.

O'Donnell, et al., An Integrated, Low-Power, Ultra-Wideband Transceiver Architecture for Low-Rate Indoor Wireless Systems, IEEE CAS Workshop on Wireless Communications and Networking, Sep. 4-5, 2002, 23 pages, Pasadena.

Olson, Examining and Modifying Marker Generator Output, Jackson Harbor Press, Oct. 26, 1999, 5 pages.

Png et al., Performance Studies of a Multi-band OFDM System Using a Simplified LDPC Code, 0-7803-8373-7/04 IEEE 2004, pp. 376-380, Singapore.

Reuter et al., Mitigating Error Propagation Effects in a Decision Feedback Equalizer, IEEE Transactions on Communications, vol. 49, No. 11, Nov. 2001, pp. 2028-2041.

Richardson, K. W. "UMTS Overview", Electronics & Communication Engineering Journal, Jun. 2000, pp. 93-101.

Rihacczek et al., "Range Sidelobe Suppression for Barker Codes" IEEE Transactions on Aerospace and Electronic Systems, vol. 7, No. 6, Nov. 1971, pp. 1087-1092.

Rohling et al., "Mismatched-Filter Design for Periodical Binary Phased Signals", IEEE Transactions on Aerospace and Electronic Systedms, vol. 25, No. 6, Nov. 1989, pp. 890-896. C. Cantoni, R.T.

Ryan, An Introduction to LDPC Codes, University of Arizona, Tucson, Arizona, Aug. 19, 2003, 23 pages.

Schlagenhaufer, Equalizer Structures for Spread Spectrum Multiuser Systems, Calgary, Alberta, Apr. 2001, Background Section 1.1 pp. 2-6 & Chapter 4 pp. 134-179.

Schober et al., Adaptive Noncoherent DFE for MDPSK Signals Transmitted over ISI Channels, IEEE Transactions on Communications, vol. 48, No. 7, Jul. 2000, pp. 1128-1140.

Winters, On the Capacity of Radio Communication Systems with Diversity in a Rayleigh Fading Environment, IEEE Journal on Selected Areas in Communication, vol. SAC-5, No. 5, Jun. 1987, pp. 871-878.

Winters, Optimum Combining for Indoor Radio Systems with Multiple Users, IEEE Transactions on Communications, vol. COM-35, No. 11, Nov. 1987, pp. 1222-1230.

Winters, Optimum Combining in Digital Mobile Radio with Cochannel Interference, IEEE Journal on Selected Areas in Communications, vol. SAC-2, No. 4, Jul. 1984, pp. 528-539.

Winters, Smart Antennas for Wireless Systems, IEEE Personal Communications, Feb. 1998, pp. 23-27.

Wornell et al., Efficient Signal Processing Techniques for Exploiting Transmit Antenna Diversity on Fading Channels, vol. 45, No. 1, Jan. 1997.

Zhang et al., A 54 MBPS (3,6)-Regular FPGA LDPC Decoder, University of Minnesota, Minneapolis, Minnesota, 6 pages, 2002.

US 5,987,079, 11/1999, Scott et al. (withdrawn)

* cited by examiner

ULTRA-WIDEBAND COMMUNICATION APPARATUS AND METHODS

This is a continuation-in-part of co-pending U.S. patent application Ser. No. 10/948,099, filed Sep. 23, 2004, entitled "Systems and Methods for Implementing an Open Loop Architecture in a Wireless Communication Network," which itself claims priority under 35 U.S.C. Section 119 to U.S. provisional patent application Ser. No. 60/547,221, entitled "Systems and Methods for Implementing an Open Loop Architecture in a Wireless Communication Network," filed Feb. 23, 2004, and is a continuation-in-part of U.S. patent application Ser. No. 10/120,456, entitled "Systems and Methods for Recovering Bandwidth in a Wireless Communication Network," filed Apr. 9, 2002, now abandoned, which is a continuation-in-part of U.S. patent application Ser. No. 10/010,601, filed Dec. 6, 2001, now U.S. Pat. No. 7,289,494 entitled "Systems and Methods for Wireless Communication over a Wide Bandwidth Channel using a Plurality of Sub-Channels."

BACKGROUND OF THE INVENTION

1. Field of the Invention

The invention relates generally to ultra-wideband communications, and more particularly to systems and methods for communication using ultra-wideband technology.

2. Background

Wireless communication systems are proliferating at the Wide Area Network (WAN), Local Area Network (LAN), and Personal Area Network (PAN) levels. These wireless communication systems use a variety of techniques to allow simultaneous access to multiple users. The most common of these techniques are Frequency Division Multiple Access (FDMA), which assigns specific frequencies to each user, Time Division Multiple Access (TDMA), which assigns particular time slots to each user, and Code Division Multiple Access (CDMA), which assigns specific codes to each user. But these wireless communication systems and various modulation techniques are afflicted by a host of problems that limit the capacity and the quality of service provided to the users. The following paragraphs briefly describe a few of these problems for the purpose of illustration.

One problem that can exist in a wireless communication system is multipath interference. Multipath interference, or multipath, occurs because some of the energy in a transmitted wireless signal bounces off of obstacles, such as buildings or mountains, as it travels from source to destination. The obstacles in effect create reflections of the transmitted signal and the more obstacles there are, the more reflections they generate. The reflections then travel along their own transmission paths to the destination (or receiver). The reflections will contain the same information as the original signal; however, because of the differing transmission path lengths, the reflected signals will be out of phase with the original signal. As a result, they will often combine destructively with the original signal in the receiver. This is referred to as fading. To combat fading, current systems typically try to estimate the multipath effects and then compensate for them in the receiver using an equalizer. In practice, however, it is very difficult to achieve effective multipath compensation.

A second problem that can affect the operation of wireless communication systems is interference from adjacent communication cells within the system. In FDMA/TDMA systems, this type of interference is prevented through a frequency reuse plan. Under a frequency reuse plan, available communication frequencies are allocated to communication cells within the communication system such that the same frequency will not be used in adjacent ceils. Essentially, the available frequencies are split into groups. The number of groups is termed the reuse factor. Then the communication cells are grouped into clusters, each cluster containing the same number of cells as there are frequency groups. Each frequency group is then assigned to a cell in each cluster. Thus, if a frequency reuse factor of 7 is used, for example, then a particular communication frequency will be used only once in every seven communication cells. As a result, in any group of seven communication cells, each cell can only use $\frac{1}{7}^{th}$ of the available frequencies, i.e., each cell is only able to use $\frac{1}{7}^{th}$ of the available bandwidth.

In a CDMA communication system, each cell uses the same wideband communication channel. In order to avoid interference with adjacent cells, each communication cell uses a particular set of spread spectrum codes to differentiate communications within the cell from those originating outside of the cell. Thus, CDMA systems preserve the bandwidth in the sense that they avoid limitations inherent to conventional reuse planning. But as will be discussed, there are other issues that limit the bandwidth in CDMA systems as well.

Thus, in overcoming interference, system bandwidth is often sacrificed. Bandwidth is becoming a very valuable commodity as wireless communication systems continue to expand by adding more and more users. Therefore, trading off bandwidth for system performance is a costly, albeit necessary, proposition that is inherent in all wireless communication systems.

The foregoing are just two examples of the types of problems that can affect conventional wireless communication systems. The examples also illustrate that there are many aspects of wireless communication system performance that can be improved through systems and methods that, for example, reduce interference, increase bandwidth, or both.

Ultra-wideband (UWB) communications systems, while somewhat more resistant to multipath, also suffer from its effects. UWB is a pulsed form of communications wherein the continuous carrier wave of traditional communications is replaced with discrete pulses of electro-magnetic energy. Some UWB communications systems employ modulation techniques where the data is carried by the precise timing of pulses. As described above, reflected energy travels a different path from the transmitter to the receiver. The path length additionally causes the reflected energy to arrive at the receiver at a different time. Since some UWB systems use timing to impart data, reflected copies of pulses may interfere with the demodulation of the UWB signal.

Not only are conventional wireless communication systems effected by problems, such as those described in the preceding paragraphs, but also different types of systems are effected in different ways and to different degrees. Wireless communication systems can be split into three types: 1) line-of-sight systems, which can include point-to-point or point-to-multipoint systems; 2) indoor non-line of sight systems; and 3) outdoor systems such as wireless WANs. Line-of-sight systems are least affected by the problems described above, while indoor systems are more affected, due for example to signals bouncing off of building walls. Outdoor systems are by far the most affected of the three systems. Because these types of problems are limiting factors in the design of wireless transmitters and receivers, such designs must be tailored to the specific types of system in which it will operate. In practice, each type of system implements unique communication standards that address the issues unique to the particular type of system. Even if an indoor system used the same communication protocols and modulation techniques as an outdoor system, for example, the receiver designs would still be different because multipath and other problems are unique to a given type of system and must be addressed with unique solutions. This would not necessarily be the case if cost efficient and effective methodologies can be developed to combat such problems as described above that build in programmability so that a device can be reconfigured for different types of systems and still maintain superior performance.

SUMMARY

In order to combat the above problems, apparatus and methods described herein provide novel ultra-wideband communication apparatus, systems and methods. In one embodiment of the present invention, a communication frame is generated and includes a synchronization section, and at least two data sections and at least two preamble sections. An ultra-wideband receiver synchronizes with the ultra-wideband transmitter using the synchronization section, and may also re-synchronize with the transmitter using at least one preamble section. In another embodiment, the length of the data sections are selected to ensure that drift between the ultra-wideband receiver and transmitter will be minimal before re-synchronization.

These and other features and advantages of the present invention will be appreciated from review of the following Detailed Description of the Preferred Embodiments, along with the accompanying figures in which like reference numerals are used to describe the same, similar or corresponding parts in the several views of the drawings.

BRIEF DESCRIPTION OF THE DRAWINGS

Preferred embodiments of the present inventions taught herein are illustrated by way of example, and not by way of limitation, in the figures of the accompanying drawings, in which.

Figure 1:
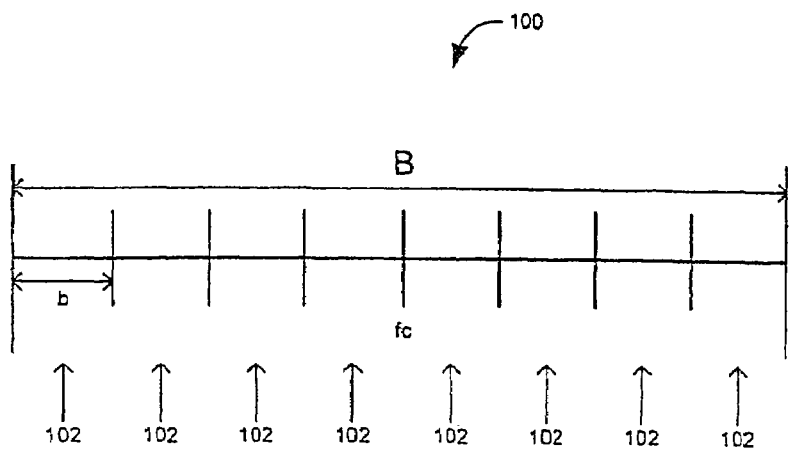
FIG. 1 is a diagram illustrating an example embodiment of a wideband channel divided into a plurality of sub-channels in accordance with the invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

1. Introduction

In order to improve wireless communication system performance and allow a single device to move from one type of system to another, while still maintaining superior performance, the systems and methods described herein provide various communication methodologies that enhance performance of transmitters and receivers with regard to various common problems that afflict such systems and that allow the transmitters and/or receivers to be reconfigured for optimal performance in a variety of systems. Accordingly, the systems and methods described herein define a channel access protocol that uses a common wideband communication channel— for all communication cells. The wideband channel, however, is then divided into a plurality of sub-channels. Different sub-channels are then assigned to one or more users within each cell. But the base station, or service access point, within each cell transmits one message that occupies the entire bandwidth of the wideband channel. Each user's communication device receives the entire message, but only decodes those portions of the message that reside in sub-channels assigned to the user. For a point-to-point system, for example, a single user may be assigned all sub-channels and, therefore, has the full wide band channel available to them. In a wireless WAN, on the other hand, the sub-channels may be divided among a plurality of users.

In the descriptions of example embodiments that follow, implementation differences, or unique concerns, relating to different types of systems will be pointed out to the extent possible. But it should be understood that the systems and methods described herein are applicable to any type of communication systems. In addition, terms such as communication cell, base station, service access point, etc. are used interchangeably to refer to the common aspects of networks at these different levels.

To begin illustrating the advantages of the systems and methods described herein, one can start by looking at the multipath effects for a single wideband communication channel 100 of bandwidth B as shown in FIG. 1. Communications sent over channel 100 in a traditional wireless communication system will comprise digital data symbols, or symbols, that are encoded and modulated onto a RF carrier that is centered at frequency $f_c$ and occupies bandwidth B. Generally, the width of the symbols (or the symbol duration) T is defined as 1/B. Thus, if the bandwidth B is equal to 100 MHz, then the symbol duration T is defined by the following equation:

$$T=1/B=\text{1/100 megahertz (MHZ)}=10 \text{ nanoseconds (ns)}. \quad (1)$$

Figure 2:
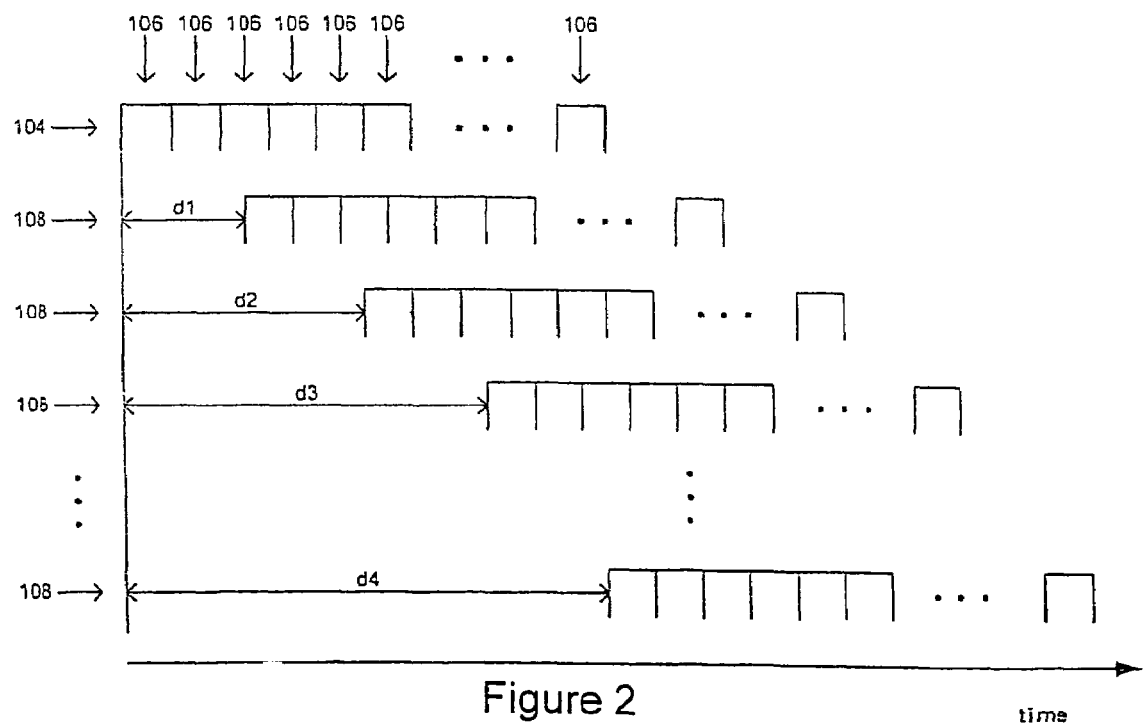
FIG. 2 is a diagram illustrating the effects of multipath in a wireless communication system.

When a receiver receives the communication, demodulates it, and then decodes it, it will recreate a stream 104 of data symbols 106 as illustrated in FIG. 2. But the receiver will also receive multipath versions 108 of the same data stream. Because multipath data streams 108 are delayed in time relative to the data stream 104 by delays d1, d2, d3, and d4, for example, they may combine destructively with data stream 104.

A delay spread $d_s$ is defined as the delay from reception of data stream 104 to the reception of the last multipath data stream 108 that interferes with the reception of data stream 104. Thus, in the example illustrated in FIG. 2, the delay spread $d_s$ is equal to delay d4. The delay spread $d_s$ will vary for different environments. An environment with a lot of obstacles will create a lot of multipath reflections. Thus, the delay spread $d_s$ will be longer. Experiments have shown that for outdoor WAN type environments, the delay spread $d_s$ can be as long as 20 microseconds (20 μs). Using the 10 ns symbol duration of equation (1), this translates to 2000 symbols. Thus, with a very large bandwidth, such as 100 MHz, multipath interference can cause a significant amount of interference at the symbol level for which adequate compensation is difficult to achieve. This is true even for indoor environments. For indoor LAN type systems, the delay spread $d_s$ is significantly shorter, typically about 10 s. For a 10 ns symbol duration, this is equivalent to 100 symbols, which is more manageable but still significant.

Figure 3:
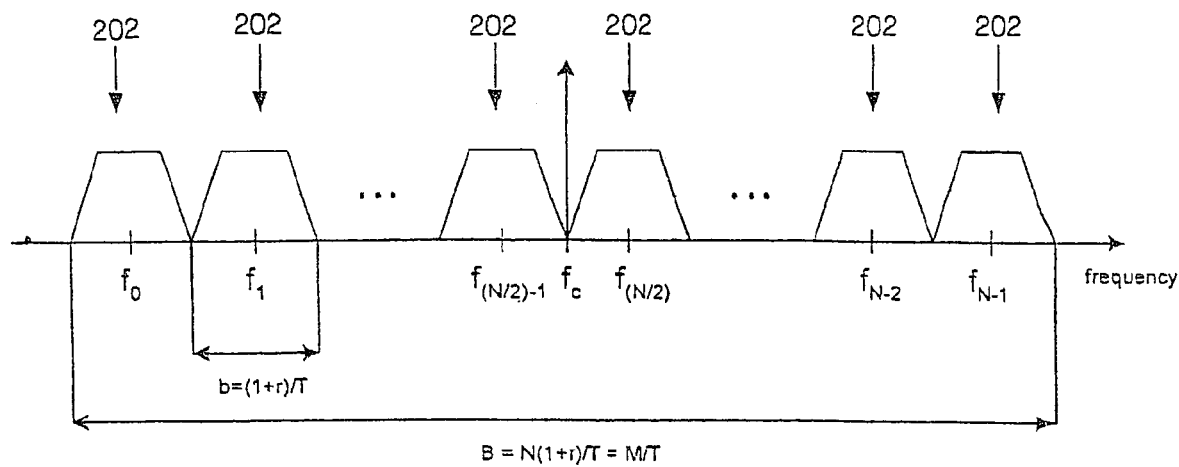
FIG. 3 is a diagram illustrating another example embodiment of a wideband communication channel divided into a plurality of sub-channels in accordance with the invention.

By segmenting the bandwidth B into a plurality of sub-channels 200, as illustrated in FIG. 3, and generating a distinct data stream for each sub-channel, the multipath effect can be reduced to a much more manageable level. For example, if the bandwidth B of each sub-channel 200 is 500 KHz, then the symbol duration is 2 μs. Thus, the delay spread $d_s$ for each sub-channel is equivalent to only 10 symbols (outdoor) or half a symbol (indoor). Thus, by breaking up a message that occupies the entire bandwidth B into discrete messages, each occupying the bandwidth B of sub-channels 200, a very wideband signal that suffers from relatively minor multipath effects is created.

Before discussing further features and advantages of using a wideband communication channel segmented into a plurality of sub-channels as described, certain aspects of the sub-channels will be explained in more detail. Referring back to FIG. 3, the overall bandwidth B is segmented into N sub-channels center at frequencies $f_o$ to $f_{N-1}$. Thus, the sub-channel 200 that is immediately to the right of fc is offset from fc by b/2, where b is the bandwidth of each sub-channel 200. The next sub-channel 200 is offset by 3b/2, the next by 5b/2, and so on. To the left of fc, each sub-channel 200 is offset by −b/2, −3b/2, −5b/2, etc.

Preferably, sub-channels 200 are non-overlapping as this allows each sub-channel to be processed independently in the receiver. To accomplish this, a roll-off factor is preferably applied to the signals in each sub-channel in a pulse-shaping step. The effect of such a pulse-shaping step is illustrated in FIG. 3 by the non-rectangular shape of the pulses in each sub-channel 200. Thus, the bandwidth b of each sub-channel can be represented by an equation such as the following:

$$b=(1+r)/T; \qquad (2)$$

Where r=the roll-off factor; and
T=the symbol duration.

Figure 4:
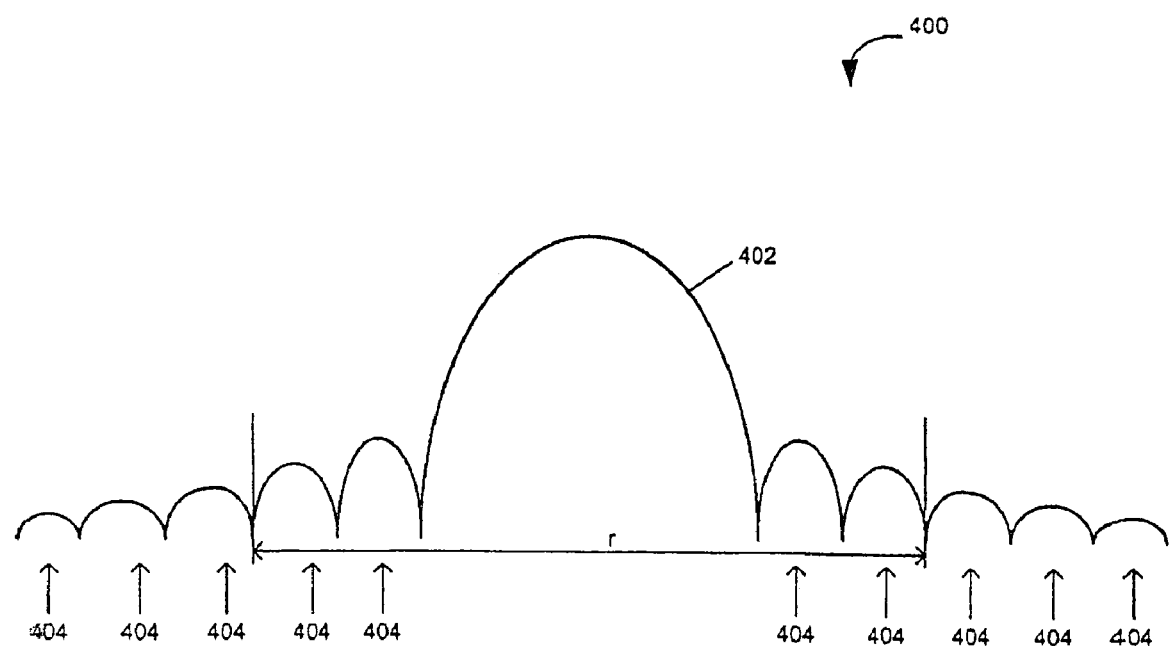
FIG. 4 is a diagram illustrating the application of a roll-off factor to the sub-channels of FIGS. 1, 2 and 3.

Without the roll-off factor, i.e., b=1/T, the pulse shape would be rectangular in the frequency domain, which corresponds to a (sin x)/x function in the time domain. The time domain signal for a (sin x)/x signal 400 is shown in FIG. 4 in order to illustrate the problems associated with a rectangular pulse shape and the need to use a roll-off factor.

As can be seen, main lobe 402 comprises almost all of signal 400. But some of the signal also resides in side lobes 404, which stretch-out indefinitely in both directions from main lobe 402. Side lobes 404 make processing signal 400 much more difficult, which increases the complexity of the receiver. Applying a roll-off factor r, as in equation (2), causes signal 400 to decay faster, reducing the number of side lobes 404. Thus, increasing the roll-off factor decreases the length of signal 400, i.e., signal 400 becomes shorter in time. But including the roll-off factor also decreases the available bandwidth in each sub-channel 200. Therefore, r must be selected so as to reduce the number of side lobes 404 to a sufficient number, e.g., 15, while still maximizing the available bandwidth in each sub-channel 200.

Thus, the overall bandwidth B for communication channel 200 is given by the following equation:

$$B=N(1+r)/T; \qquad (3)$$

or $$B=M/T; \qquad (4)$$

Where $$M=(1+r)N. \qquad (5)$$

For efficiency purposes related to transmitter design, it is preferable that r is chosen so that M in equation (5) is an integer. Choosing r so that M is an integer allows for more efficient transmitters designs using, for example, Inverse Fast Fourier Transform (IFFT) techniques. Since M=N+N(r), and N is always an integer, this means that r must be chosen so that N(r) is an integer. Generally, it is preferable for r to be between 0.1 and 0.5. Therefore, if N is 16, for example, then 0.5 could be selected for r so that N(r) is an integer. Alternatively, if a value for r is chosen in the above example so that N(r) is not an integer, B can be made slightly wider than M/T to compensate. In this case, it is still preferable that r be chosen so that N(r) is approximately an integer.

2. Example Embodiment of a Wireless Communication System

Figure 6:
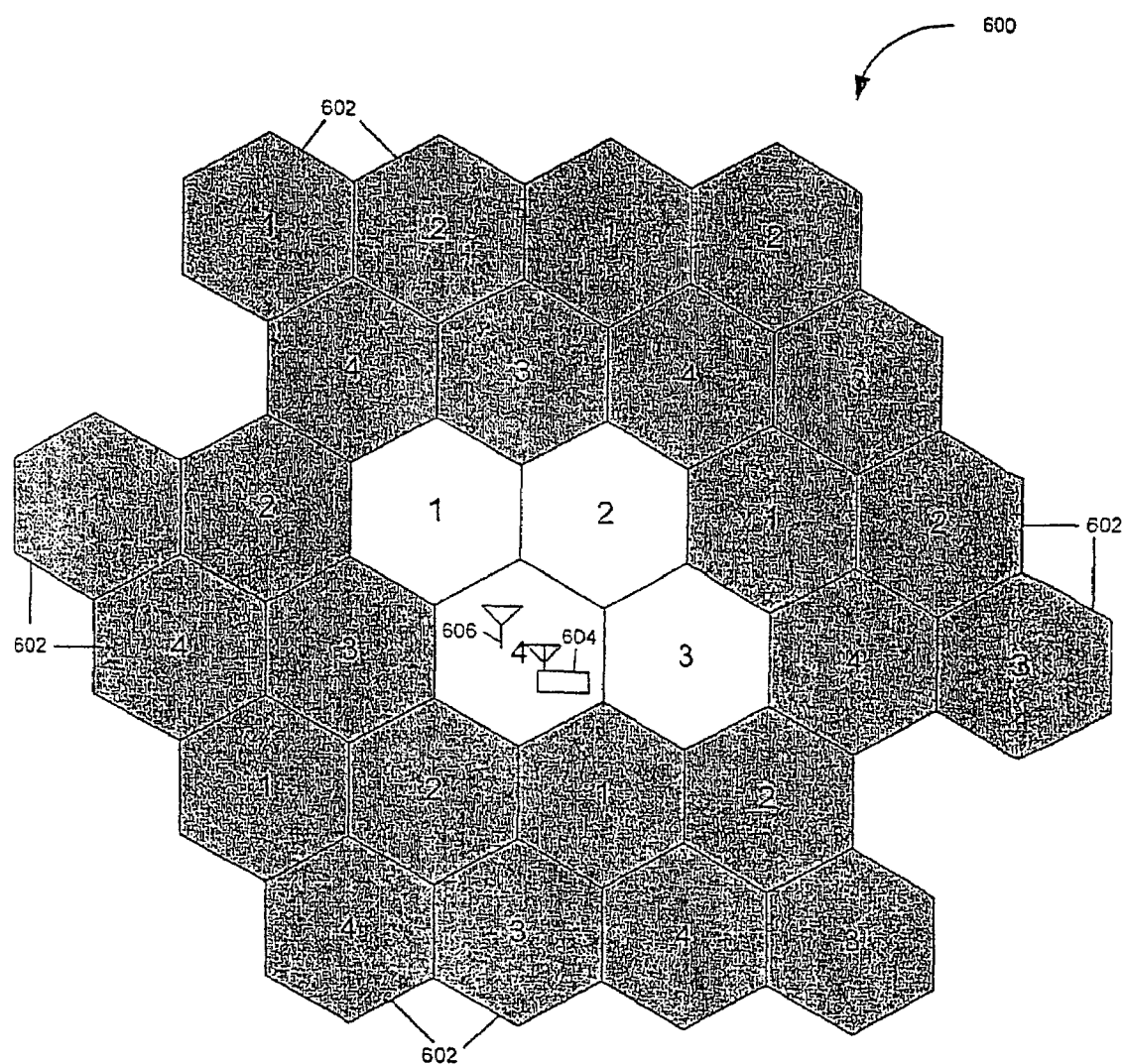
FIG. 6 is a diagram illustrating an example embodiment of a wireless communication in accordance with one embodiment of the invention.

With the above in mind, FIG. 6 illustrates an example communication system 600 comprising a plurality of cells 602 that each use a common wideband communication channel to communicate with communication devices 604 within each cell 602. The common communication channel is a wideband communication channel as described above. Each communication cell 602 is defined as the coverage area of a base station, or service access point, 606 within the cell. One such base station 606 is shown for illustration in FIG. 6. For purposes of this specification and the claims that follow, the term base station will be used generically to refer to a device that provides wireless access to the wireless communication system for a plurality of communication devices, whether the system is a line of sight, indoor, or outdoor system.

Because each cell 602 uses the same communication channel signals in one cell 602 must be distinguishable from signals in adjacent cells 602. To differentiate signals from one cell 602 to another, adjacent base stations 606 use different synchronization codes according to a code reuse plan. In FIG. 6, system 600 uses a synchronization code reuse factor of 4, although the reuse factor can vary depending on the application.

Figure 7:
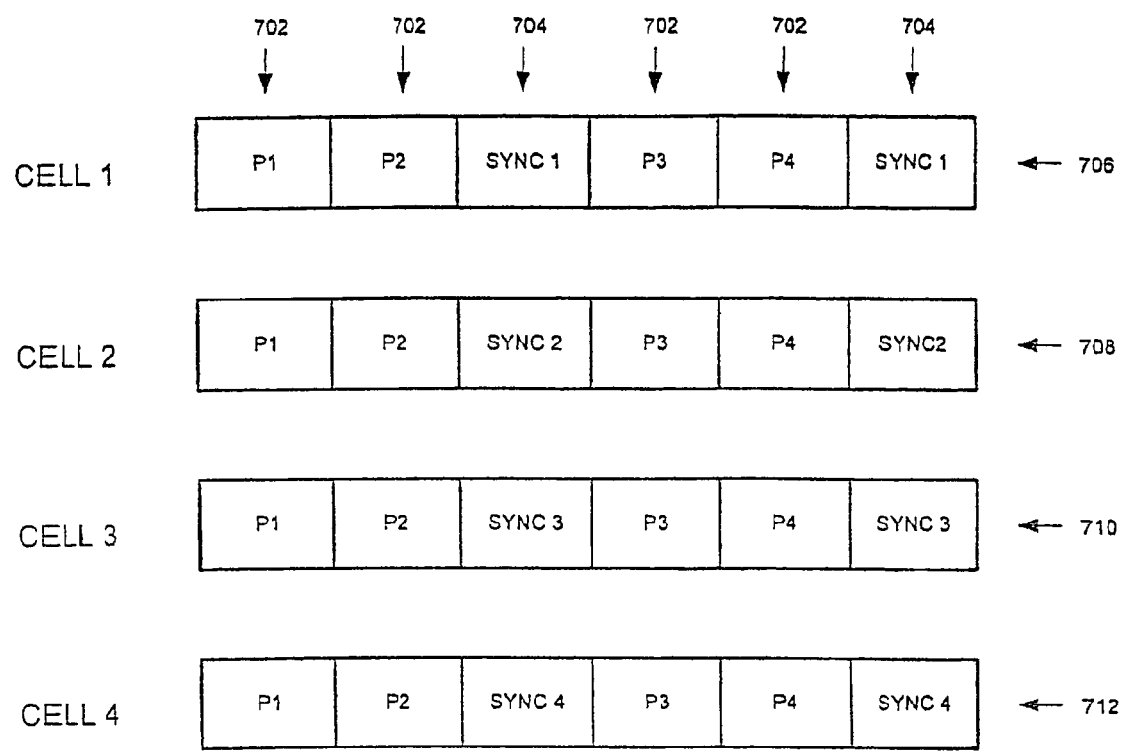
FIG. 7 is a diagram illustrating the use of synchronization codes in the wireless communication system of FIG. 6 in accordance with the invention.

Preferably, the synchronization code is periodically inserted into a communication from a base station 606 to a communication device 604 as illustrated in FIG. 7, After a predetermined number of data packets 702, in this case two, the particular synchronization code 704 is inserted into the information being transmitted by each base station 606. A synchronization code is a sequence of data bits known to both the base station 606 and any communication devices 604 with which it is communicating. The synchronization code allows such a communication device 604 to synchronize its timing to that of base station 606, which, in turn, allows device 604 to decode the data properly. Thus, in cell 1 (see lightly shaded cells 602 in FIG. 6), for example, synchronization code 1 (SYNC1) is inserted into data stream 706, which is generated by base station 606 in cell 1, after every two packets 702; in cell 2 SYNC2 is inserted after every two packets 702; in cell 3 SYNC3 is inserted; and in cell 4 SYNC4 is inserted. Use of the synchronization codes is discussed in more detail below.

Figure 5A:
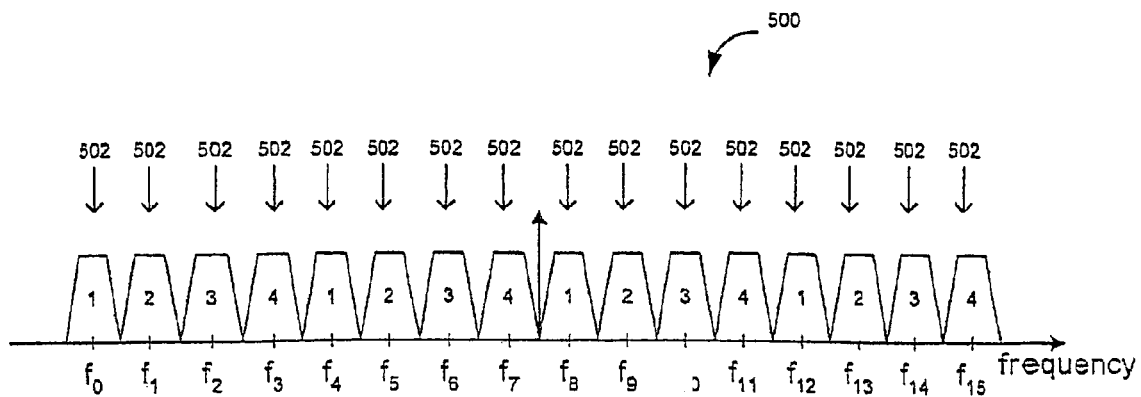
FIG. 5A is a diagram illustrating the assignment of sub-channels for a wideband communication channel in accordance with the invention.
Figure 5B:
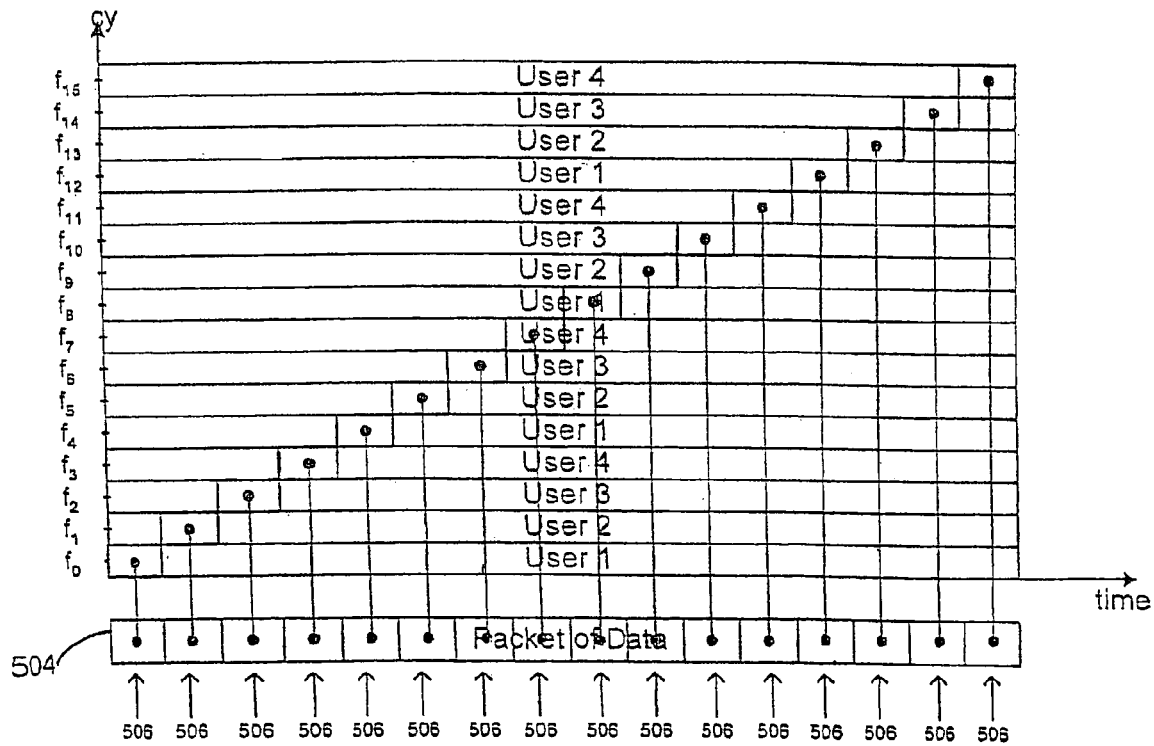
FIG. 5B is a diagram illustrating the assignment of time slots for a wideband communication channel in accordance with the invention.

In FIG. 5A an example wideband communication channel 500 for use in communication system 600 is divided into 16 sub-channels 502, centered at frequencies $f_0$ to $f_{15}$. A base station 606 at the center of each communication cell 602 transmits a single packet occupying the whole bandwidth B of wideband channel 500. Such a packet is illustrated by packet 504 in FIG. 5B. Packet 504 comprises sub-packets 506 that are encoded with a frequency offset corresponding to one of sub-channels 502. Sub-packets 506 in effect define available time slots in packet 504. Similarly, sub-channels 502 can be said to define available frequency bins in communication channel 500. Therefore, the resources available in communication cell 602 are time slots 506 and frequency bins 502, which can be assigned to different communication devices 604 within each cell 602.

Thus, for example, frequency bins 502 and time slots 506 can be assigned to 4 different communication devices 604 within a cell 602 as shown in FIG. 5, Each communication device 604 receives the entire packet 504, but only processes those frequency bins 502 and/or timeslots 506 that are assigned to it. Preferably, each device 604 is assigned non-adjacent frequency bins 502, as in FIG. 5. This way, if interference corrupts the information in a portion of communication channel 500, then the effects are spread across all devices 604 within a cell 602. Hopefully, by spreading out the effects of interference in this manner the effects are minimized and the entire information sent to each device 604 can still be recreated from the unaffected information received in other frequency bins. For example, if interference, such as fading, corrupted the information in bins $f_0$-$f_4$, then each user 1-4 loses one packet of data. But each user potentially receives three unaffected packets from the other bins assigned to them. Hopefully, the unaffected data in the other three bins provides enough information to recreate the entire message for each user. Thus, frequency diversity can be achieved by assigning non-adjacent bins to each of multiple users.

Ensuring that the bins assigned to one user are separated by more than the coherence bandwidth ensures frequency diversity. As discussed above, the coherence bandwidth is approximately equal to $1/d_s$. For outdoor systems, where ds is typically 1 microsecond, $1/d_s=1/1$ microsecond=1 megahertz (MHz). Thus, the non-adjacent frequency bands assigned to a user are preferably separated by at least 1 MHz. It can be even more preferable, however, if the coherence bandwidth plus some guard band to ensure sufficient frequency diversity separate the non-adjacent bins assigned to each user. For example, it is preferable in certain implementations to ensure that at least 5 times the coherence bandwidth, or 5 MHz in the above example, separates the non-adjacent bins.

Another way to provide frequency diversity is to repeat blocks of data in frequency bins assigned to a particular user that are separated by more than the coherence bandwidth. In other words, if 4 sub-channels 200 are assigned to a user, then data block a can be repeated in the first and third sub-channels 200 and data block b can be repeated in the second and fourth sub-channels 202, provided the sub-channels are sufficiently separated in frequency. In this case, the system can be said to be using a diversity length factor of 2. The system can similarly be configured to implement other diversity lengths, e.g., 3, 4, . . . , l.

It should be noted that spatial diversity can also be included depending on the embodiment. Spatial diversity can comprise transmit spatial diversity, receive spatial diversity, or both. In transmit spatial diversity, the transmitter uses, a plurality of separate transmitters and a plurality of separate antennas to transmit each message. In other words, each transmitter transmits the same message in parallel. The messages are then received from the transmitters and combined in the receiver. Because the parallel transmissions travel different paths, if one is affected by fading, the others will likely not be affected. Thus, when they are combined in the receiver, the message should be recoverable even if one or more of the other transmission paths experienced severe fading.

Receive spatial diversity uses a plurality of separate receivers and a plurality of separate antennas to receive a single message. If an adequate distance separates the antennas, then the transmission path for the signals received by the antennas will be different. Again, this difference in the transmission paths will provide imperviousness to fading when the signals from the receivers are combined.

Transmit and receive spatial diversity can also be combined within a system such as system 600 so that two antennas are used to transmit and two antennas are used to receive. Thus, each base station 606 transmitter can include two antennas, for transmit spatial diversity, and each communication device 604 receiver can include two antennas, for receive spatial diversity. If only transmit spatial diversity is implemented in system 600, then it can be implemented in base stations 606 or in communication devices 604. Similarly, if only receive spatial diversity is included in system 600, then it can be implemented in base stations 606 or communication devices 604.

The number of communication devices 604 assigned frequency bins 502 and/or time slots 506 in each cell 602 is preferably programmable in real time. In other words, the resource allocation within a communication cell 602 is preferably programmable in the face of varying external conditions, i.e., multipath or adjacent cell interference, and varying requirements, i.e., bandwidth requirements for various users within the cell. Thus, if user 1 requires the whole bandwidth to download a large video file, for example, then the allocation of bins 502 can be adjusted to provide user 1 with more, or even all, of bins 502. Once user 1 no longer requires such large amounts of bandwidth, the allocation of bins 502 can be readjusted among all of users 1-4.

It should also be noted that all of the bins assigned to a particular user can be used for both the forward and reverse link. Alternatively, some bins 502 can be assigned as the forward link and some can be assigned for use on the reverse link, depending on the implementation.

To increase capacity, the entire bandwidth B is preferably reused in each communication cell 602, with each cell 602 being differentiated by a unique synchronization code (see discussion below). Thus, system 600 provides increased immunity to multipath and fading as well as increased band width due to the elimination of frequency reuse requirements.

3. Synchronization

Figure 8:
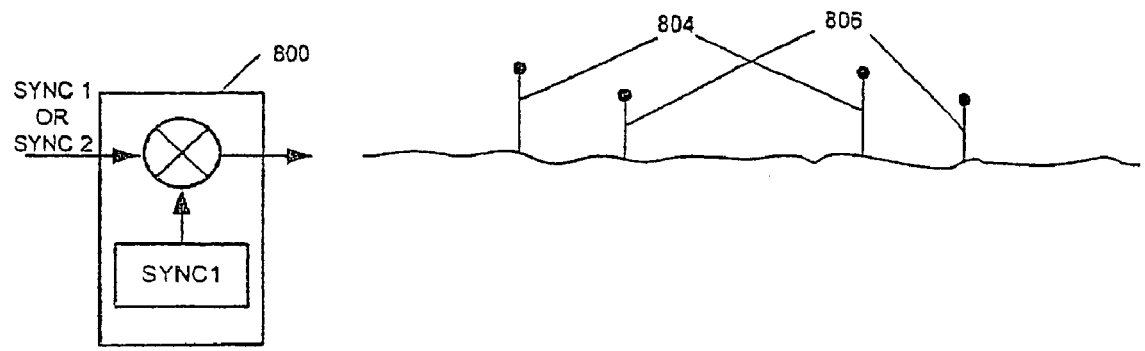
FIG. 8 is a diagram illustrating a correlator that can be used to correlate synchronization codes in the wireless communication system of FIG. 6.

FIG. 8 illustrates an example embodiment of a synchronization code correlator 800. When a device 604 in cell 1 (see FIG. 6), for example, receives an incoming communication from the cell 1 base station 606, it compares the incoming data with SYNC1 in correlator 800. Essentially, the device scans the incoming data trying to correlate the data with the known synchronization code, in this case SYNC1. Once correlator 800 matches the incoming data to SYNC1 it generates a correlation peak 804 at the output. Multipath versions of the data will also generate correlation peaks 806, although these peaks 806 are generally smaller than correlation peak 804, The device can then use the correlation peaks to perform channel estimation, which allows the device to adjust for the multipath using, e.g., an equalizer. Thus, in cell 1, if correlator 800 receives a data stream comprising SYNC1, it will generate correlation peaks 804 and 806. If, on the other hand, the data stream comprises SYNC2, for example, then no peaks will be generated and the device will essentially ignore the incoming communication.

Even though a data stream that comprises SYNC2 will not create any correlation peaks, it can create noise in correlator 800 that can prevent detection of correlation peaks 804 and 806. Several steps can be taken to prevent this from occurring. One way to minimize the noise created in correlator 800 by signals from adjacent cells 602, is to configure system 600 so that each base station 606 transmits at the same time. This way, the synchronization codes can preferably be generated in such a manner that only the synchronization codes 704 of adjacent cell data streams, e.g., streams 708, 710, and 712, as opposed to packets 702 within those streams, will interfere with detection of the correct synchronization code 704, e.g., SYNC1. The synchronization codes can then be further configured to eliminate or reduce the interference.

Figure 9:
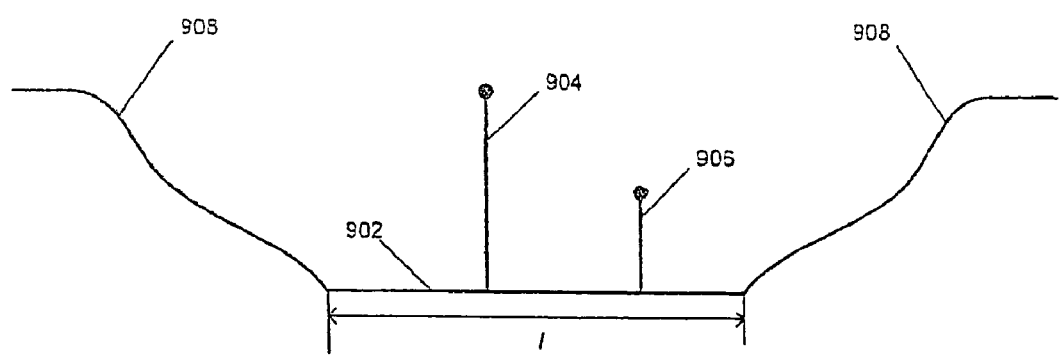
FIG. 9 is a diagram illustrating synchronization code correlation in accordance with the invention.

For example, the noise or interference caused by an incorrect synchronization code is a function of the cross correlation of that synchronization code with respect to the correct code. The better the cross correlation between the two, the lower the noise level. When the cross correlation is ideal, then the noise level will be virtually zero as illustrated in FIG. 9 by noise level 902. Therefore, a preferred embodiment of system 600 uses synchronization codes that exhibit ideal cross correlation, i.e., zero. Preferably, the ideal cross correlation of the synchronization codes covers a period 1 that is sufficient to allow accurate detection of multipath correlation peaks 906 as well as correlation peak 904. This is important so that accurate channel estimation and equalization can take place. Outside of period 1, the noise level 908 goes up, because the data in packets 702 is random and will exhibit low cross correlation with the synchronization code, e.g., SYNC1. Preferably, period 1 is actually slightly longer then the multipath length in order to ensure that the multipath can be detected.

a. Synchronization Code Generation

Conventional systems use orthogonal codes to achieve cross correlation in correlator 800. In system 600 for example, SYNC1, SYNC2, SYNC3, and SYNC4, corresponding to cells 1-4 (see lightly shaded cells 602 of FIG. 6) respectively, will all need to be generated in such a manner that they will have ideal cross correlation with each other. In one embodiment, if the data streams involved comprise high and low data bits, then the value "1" can be assigned to the high data bits and "−1" to the low data bits. Orthogonal data sequences are then those that produce a "0" output when they are exclusively ORed (XORed) together in correlator 800. The following example illustrates this point for orthogonal sequences 1 and 2:

$$\begin{array}{ll}\text{sequence 1:} & 1\ 1 - 1\ 1 \\ \text{sequence 2:} & 1\ 1\ 1 - 1 \\ \hline & 1\ 1 - 1 - 1 = 0\end{array}$$

Thus, when the results of XORing each bit pair are added, the result is "0".

But in system 600, for example, each code must have ideal, or zero, cross correlation with each of the other codes used in adjacent cells 602. Therefore, in one example embodiment of a method for generating synchronization codes exhibiting the properties described above, the process begins by selecting a "perfect sequence" to be used as the basis for the codes. A perfect sequence is one that when correlated with itself produces a number equal to the number of bits in the sequence. For example:

$$\begin{array}{ll}\text{Perfect sequence 1:} & 1\ 1 - 1\ 1 \\ & \underline{1\ 1 - 1\ 1} \\ & 1\ 1\ 1\ 1 = 4\end{array}$$

But each time a perfect sequence is cyclically shifted by one bit, the new sequence is orthogonal with the original sequence. Thus, for example, if perfect sequence 1 is cyclically shifted by one bit and then correlated with the original, the correlation produces a "0" as in the following example:

$$\begin{array}{ll}\text{Perfect sequence 1:} & 1\ 1 - 1\ 1 \\ & \underline{1\ 1\ 1 - 1} \\ & 1\ 1 - 1 - 1 = 0\end{array}$$

If the perfect sequence 1 is again cyclically shifted by one bit, and again correlated with the original, then it will produce a "0". In general, you can cyclically shift a perfect sequence by any number of bits up to its length and correlate the shifted sequence with the original to obtain a "0".

Once a perfect sequence of the correct length is selected, the first synchronization code is preferably generated in one embodiment by repeating the sequence 4 times. Thus, if perfect sequence 1 is being used, then a first synchronization code y would be the following:

$y=1\ 1 - 1\ 1\ 1\ 1 - 1\ 1\ 1\ 1 - 1\ 1\ 1\ 1 - 1\ 1.$

Or in generic form:

$y=x(0)x(1)x(2)x(3)x(0)x(1)x(2)x(3)x(0)x(1)x(2)x(3)x$
$(0)x(1)x(2)x(3).$

For a sequence of length L:

$y=x(0)x(1)\ldots x(L)x(0)x(1)\ldots x(L)x(0)x(1)\ldots x(L)x$
$(0)x(1)\ldots$

Repeating the perfect sequence allows correlator 800 a better opportunity to detect the synchronization code and allows generation of other uncorrelated frequencies as well. Repeating has the effect of sampling in the frequency domain. This effect is illustrated by the graphs in FIG. 10. Thus, in trace 1, which corresponds to synchronization code y, a sample 1002 is generated every fourth sample bin 1000. Each sample bin is separated by 1/(4L×T), where T is the symbol duration. Thus in the above example, where L=4, each sample bin is separated by 1/(16×T) in the frequency domain. Traces 2-4 illustrate the next three synchronization codes. As can be seen, the samples for each subsequent synchronization code are shifted by one sample bin relative to the samples for the previous sequence. Therefore, none of sequences interfere with each other.

To generate the subsequent sequences, corresponding to traces 2-4, sequence y must be shifted in frequency. This can be accomplished using the following equation:

$$z^r(m)=y(m)*\exp(j*2*\pi*r*m/(n*L)), \qquad (5)$$

for r=1 to L (# of sequences) and m=0 to 4*L−1 (time); and where: $z^r(m)$=each subsequent sequence;

y(m)=the first sequence; and n=the number of times the sequence is repeated.

Figure 10:
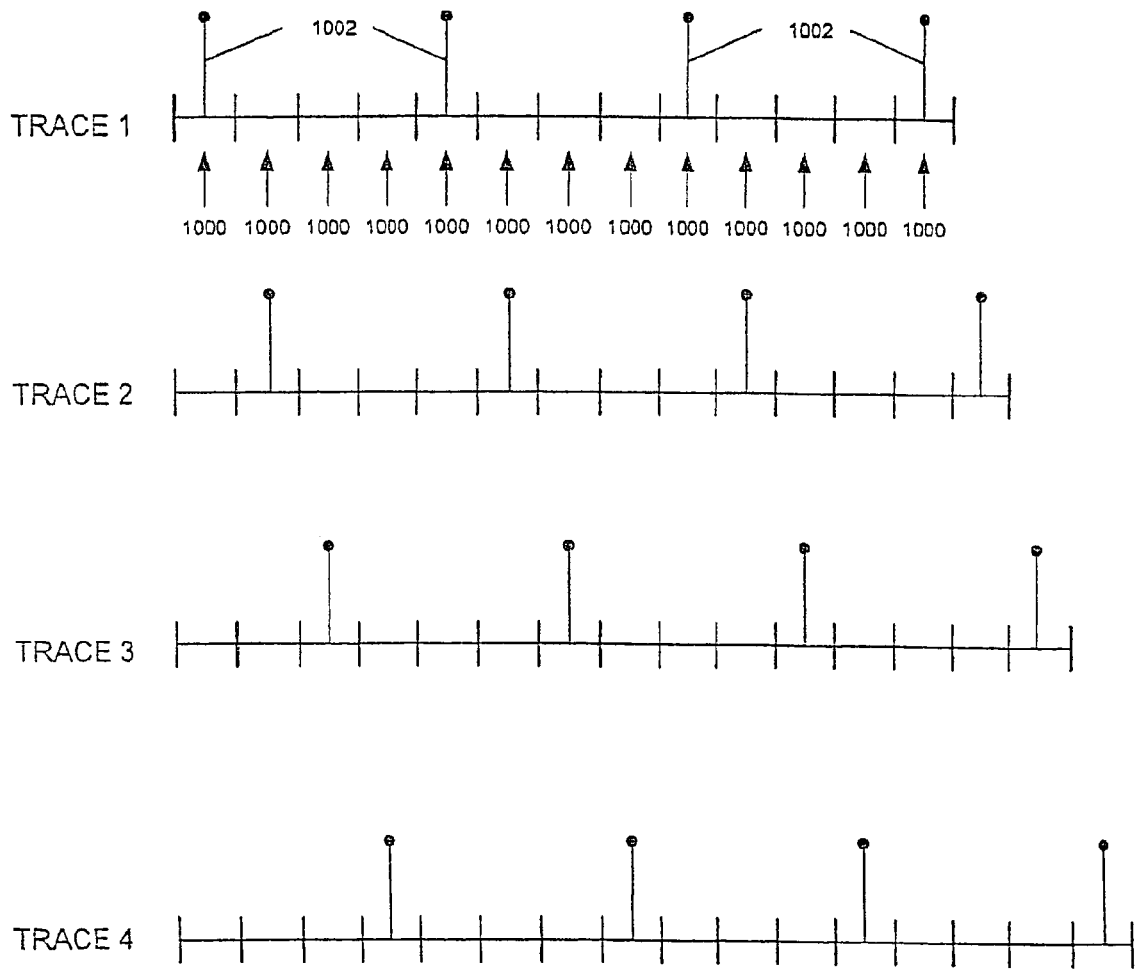
FIG. 10 is a diagram illustrating the cross-correlation properties of synchronization codes configured in accordance with the invention.

It will be understood that multiplying by an $\exp(j2\pi(r*m/N))$ factor, where N is equal to the number of times the sequence is repeated (n) multiplied by the length of the underlying perfect sequence Z, in the time domain results in a shift in the frequency domain. Equation (5) results in the desired shift as illustrated in FIG. 10 for each of synchronization codes 2-4, relative to synchronization code 1. The final step in generating each synchronization code is to append the copies of the last M samples, where M is the length of the multipath, to the front of each code. This is done to make the convolution with the multipath cyclic and to allow easier detection of the multipath.

It should be noted that synchronization codes can be generated from more than one perfect sequence using the same methodology. For example, a perfect sequence can be generated and repeated for times and then a second perfect sequence can be generated and repeated four times to get a n factor equal to eight. The resulting sequence can then be shifted as described above to create the synchronization codes.

b. Signal Measurements Using Synchronization Codes

Figure 11:
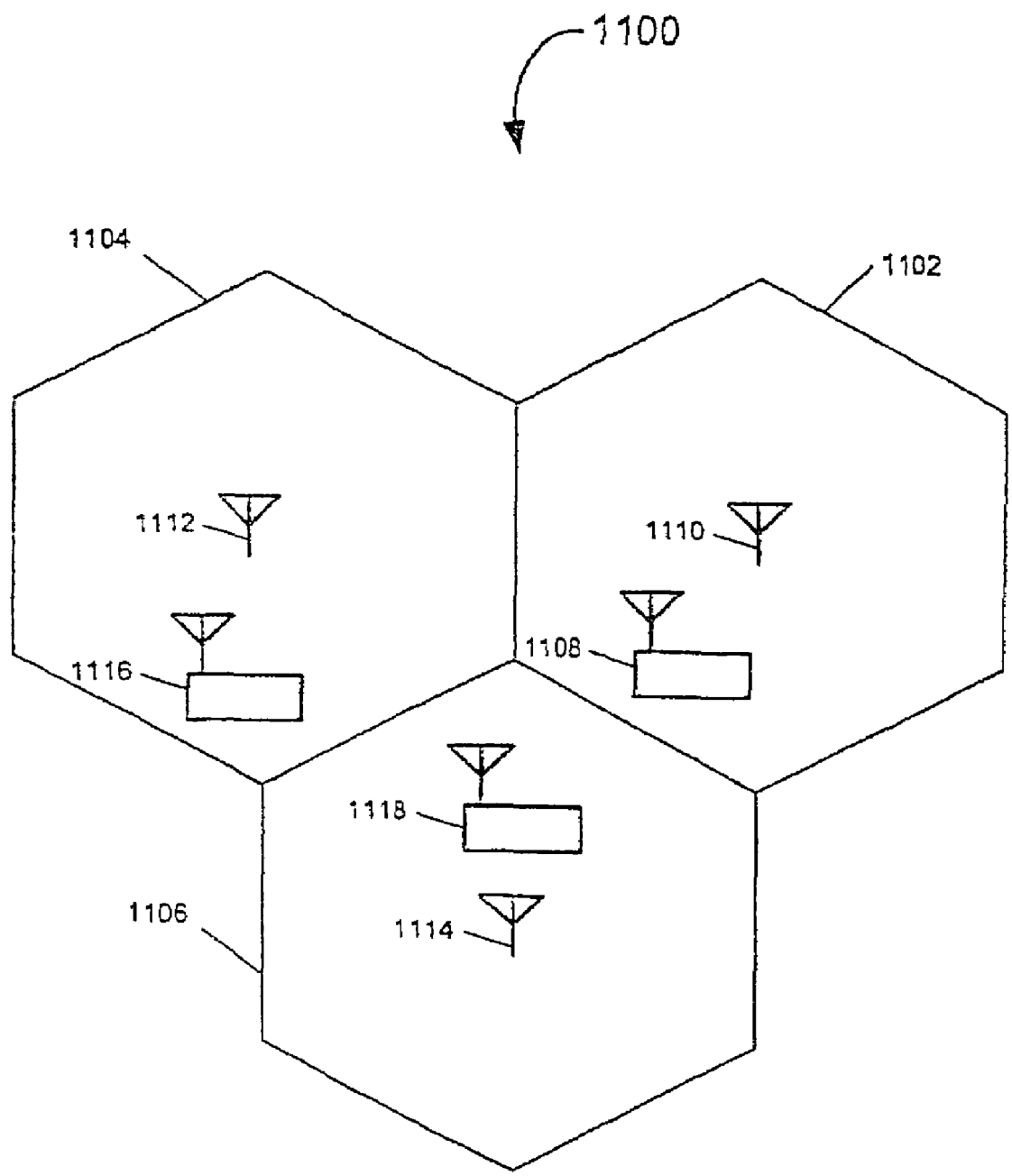
FIG. 11 is a diagram illustrating another example embodiment of a wireless communication system in accordance with the invention.

Therefore, when a communication device is at the edge of a cell, it will receive signals from multiple base stations and, therefore, will be decoding several synchronization codes at the same time. This can be illustrated with the help of FIG. 11, which illustrates another example embodiment of a wireless communication system 1100 comprising communication cells 1102, 1104, and 1106 as well as communication device 1108, which is in communication with base station 1110 of cell 1102 but also receiving communication from base stations 1112 and 1114 of cells 1104 and 1106, respectively.

If communications from base station 1110 comprise synchronization code SYNC1 and communications from base station 1112 and 1114 comprise SYNC2 and SYNC3 respectively, then device 1108 will effectively receive the sum of these three synchronization codes. This is because, as explained above, base stations 1110, 1112, and 1114 are configured to transmit at the same time. Also, the synchronization codes arrive at device 1108 at almost the same time because they are generated in accordance with the description above.

Again as described above, the synchronization codes SYNC1, SYNC2, and SYNC3 exhibit ideal cross correlation. Therefore, when device 1108 correlates the sum x of codes SYNC1, SYNC2, and SYNC3, the latter two will not interfere with proper detection of SYNC1 by device 1108. Importantly, the sum x can also be used to determine important signal characteristics, because the sum x is equal to the sum of the synchronization code signal in accordance with the following equation:

$$x = SYNC1 + SYNC2 + SYNC3. \quad (6)$$

Therefore, when SYNC1 is removed, the sum of SYNC2 and SYNC3 is left, as shown in the following:

$$x - SYNC1 = SYNC2 + SYNC3. \quad (7)$$

The energy computed from the sum (SYNC2+SYNC3) is equal to the noise or interference seen by device 1108. Since the purpose of correlating the synchronization code in device 1106 is to extract the energy in SYNC1, device 1108 also has the energy in the signal from base station 1110, i.e., the energy represented by SYNC1. Therefore, device 1106 can use the energy of SYNC1 and of (SYNC2+SYNC3) to perform a signal-to-interference measurement for the communication channel over which it is communicating with base station 1110. The result of the measurement is preferably a signal-to-interference ratio (SIR). The SIR measurement can then be communicated back to base station 1110 for purposes that will be discussed below.

The ideal cross correlation of the synchronization codes also allows device 1108 to perform extremely accurate determinations of the Channel Impulse Response (CIR), or channel estimation, from the correlation produced by correlator 800. This allows for highly accurate equalization using low cost, low complexity equalizers, thus overcoming a significant draw back of conventional systems.

4. Sub-Channel Assignments

Figure 12A:
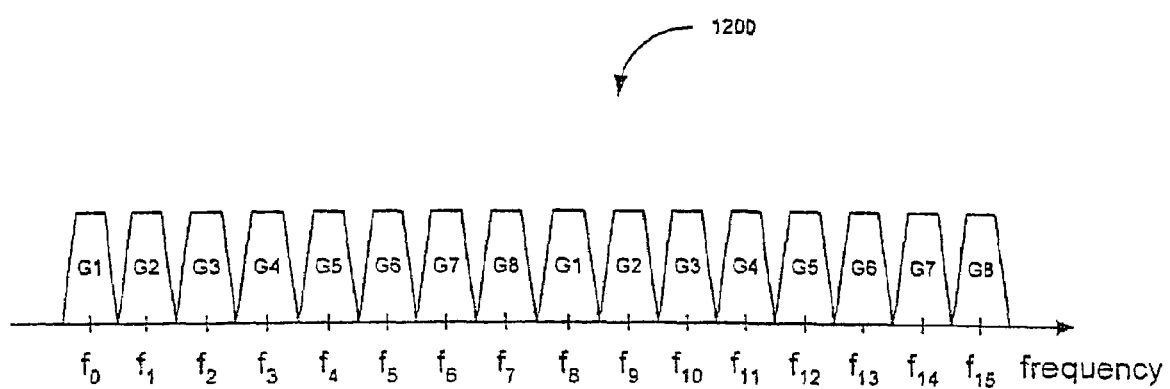
FIG. 12A is a diagram illustrating how sub-channels of a wideband communication channel according to the present invention can be grouped in accordance with the present invention.

As mentioned, the SIR as determined by device 1108 can be communicated back to base station 1110 for use in the assignment of slots 502. In one embodiment, due to the fact that each sub-channel 502 is processed independently, the SIR for each sub-channel 502 can be measured and communicated back to base station 1110. In such an embodiment, therefore, sub-channels 502 can be divided into groups and a SIR measurement for each group can be sent to base station 1110. This is illustrated in FIG. 12A, which shows a wideband communication channel 1200 segmented into sub-channels $f_0$ to $f_{15}$. Sub-channels $f_0$ to $f_{15}$ are then grouped into 8 groups G1 to G8. Thus, in one embodiment, device 1108 and base station 1110 communicate over a channel such as channel 1200.

Sub-channels in the same group are preferably separated by as many sub-channels as possible to ensure diversity. In FIG. 12A for example, sub-channels within the same group are 7 sub-channels apart, e.g., group G1 comprises $f_0$ and $f_8$.

Device 1102 reports a SIR measurement for each of the groups G1 to G8. These SIR measurements are preferably compared with a threshold value to determine which sub-channels groups are useable by device 1108. This comparison can occur in device 1108 or base station 1110. If it occurs in device 1108, then device 1108 can simply report to base station 1110 which sub-channel groups are useable by device 1108.

Figure 12B:
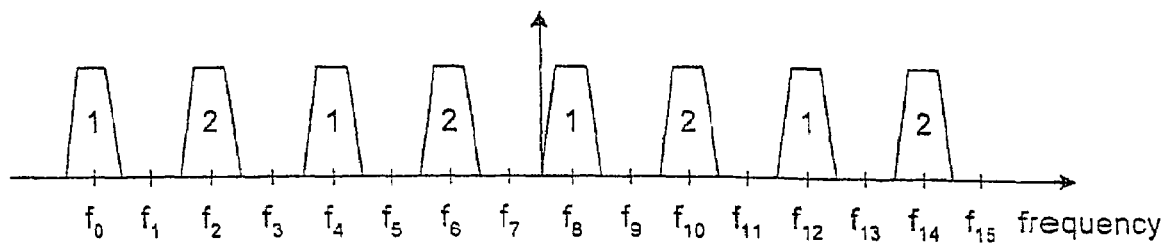
FIG. 12B is a diagram illustrating the assignment of the groups of sub-channels of FIG. 12A in accordance with the invention.

SIR reporting will be simultaneously occurring for a plurality of devices within cell 1102. Thus, FIG. 12B illustrates the situation where two communication devices corresponding to user1 and user2 report SIR levels above the threshold for groups G1, G3, G5, and G7. Base station 1110 preferably then assigns sub-channel groups to user1 and user2 based on the SIR reporting as illustrated in FIG. 12B. When assigning the "good" sub-channel groups to user1 and user2, base station 1110 also preferably assigns them based on the principles of frequency diversity. In FIG. 12B, therefore, user1 and user2 are alternately assigned every other "good" sub-channel.

Figure 13:
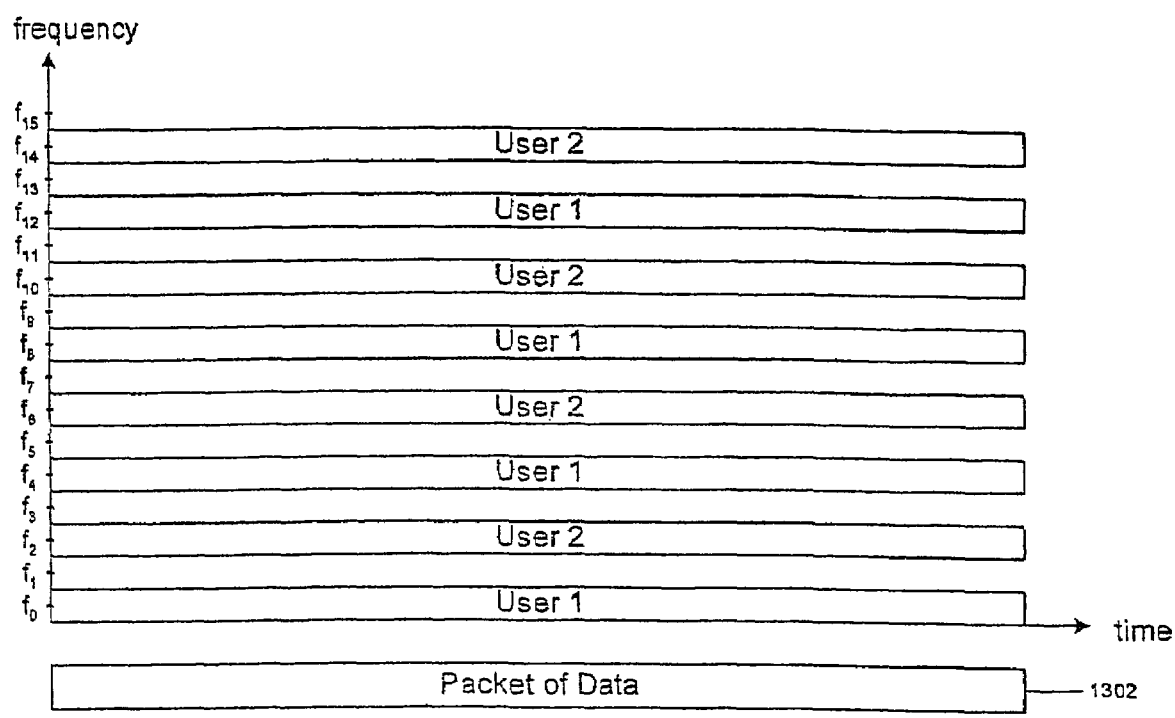
FIG. 13 is a diagram illustrating the group assignments of FIG. 12B in the time domain.

The assignment of sub-channels in the frequency domain is equivalent to the assignment of time slots in the time domain. Therefore, as illustrated in FIG. 13, two users, user1 and user2, receive packet 1302 transmitted over communication channel 1200. FIG. 13 also illustrated the sub-channel assignment of FIG. 12B. While FIGS. 12 and 13 illustrate sub-channel/time slot assignment based on SIR for two users, the principles illustrated can be extended for any number of users. Thus, a packet within cell 1102 can be received by 3 or more users. Although, as the number of available sub-channels is reduced due to high SIR, so is the available bandwidth. In other words, as available sub-channels are reduced, the number of users that can gain access to communication channel 1200 is also reduced.

Poor SIR can be caused for a variety of reasons, but frequently it results from a device at the edge of a cell receiving communication signals from adjacent cells. Because each cell is using the same bandwidth B, the adjacent cell signals will eventually raise the noise level and degrade SIR for certain sub-channels. In certain embodiments, therefore, sub-channel assignment can be coordinated between cells, such as cells 1102, 1104, and 1106 in FIG. 11, in order to prevent interference from adjacent cells.

Thus, if communication device 1108 is near the edge of cell 1102, and device 1118 is near the edge of cell 1106, then the two can interfere with each other. As a result, the SIR measurements that device 1108 and 1118 report back to base stations 1110 and 1114, respectively, will indicate that the interference level is too high. Base station 1110 can then be configured to assign only the odd groups, i.e., G1, G3, G5, etc., to device 1108, while base station 1114 can be configured to assign the even groups to device 1118 in a coordinated fashion. The two devices 1108 and 1118 will then not interfere with each other due to the coordinated assignment of sub-channel groups.

Assigning the sub-channels in this manner reduces the overall bandwidth available to devices 1108 and 1118, respectively. In this case the bandwidth is reduced by a factor of two. But it should be remembered that devices operating closer to each base station 1110 and 1114, respectively, will still be able to use all sub-channels if needed. Thus, it is only devices, such as device 1108, that are near the edge of a cell that will have the available bandwidth reduced. Contrast this with a CDMA system, for example, in which the bandwidth for all users is reduced, due to the spreading techniques used in such systems, by approximately a factor of 10 at all times. It can be seen, therefore, that the systems and methods for wireless communication over a wide bandwidth channel using a plurality of sub-channels not only improves the quality of service, but can also increase the available bandwidth significantly.

When there are three devices 1108, 1118, and 1116 near the edge of their respective adjacent cells 1102, 1104, and 1106, the sub-channels can be divided by three. Thus device 1108, for example, can be assigned groups G1, G4, etc., device 1118 can be assigned groups G2, G5, etc., and device 1116 can be assigned groups G3, G6, etc. In this case the available bandwidth for these devices, i.e., devices near the edges of cells 1102, 1104, and 1106, is reduced by a factor of 3, but this is still better than a CDMA system, for example.

Figure 14:
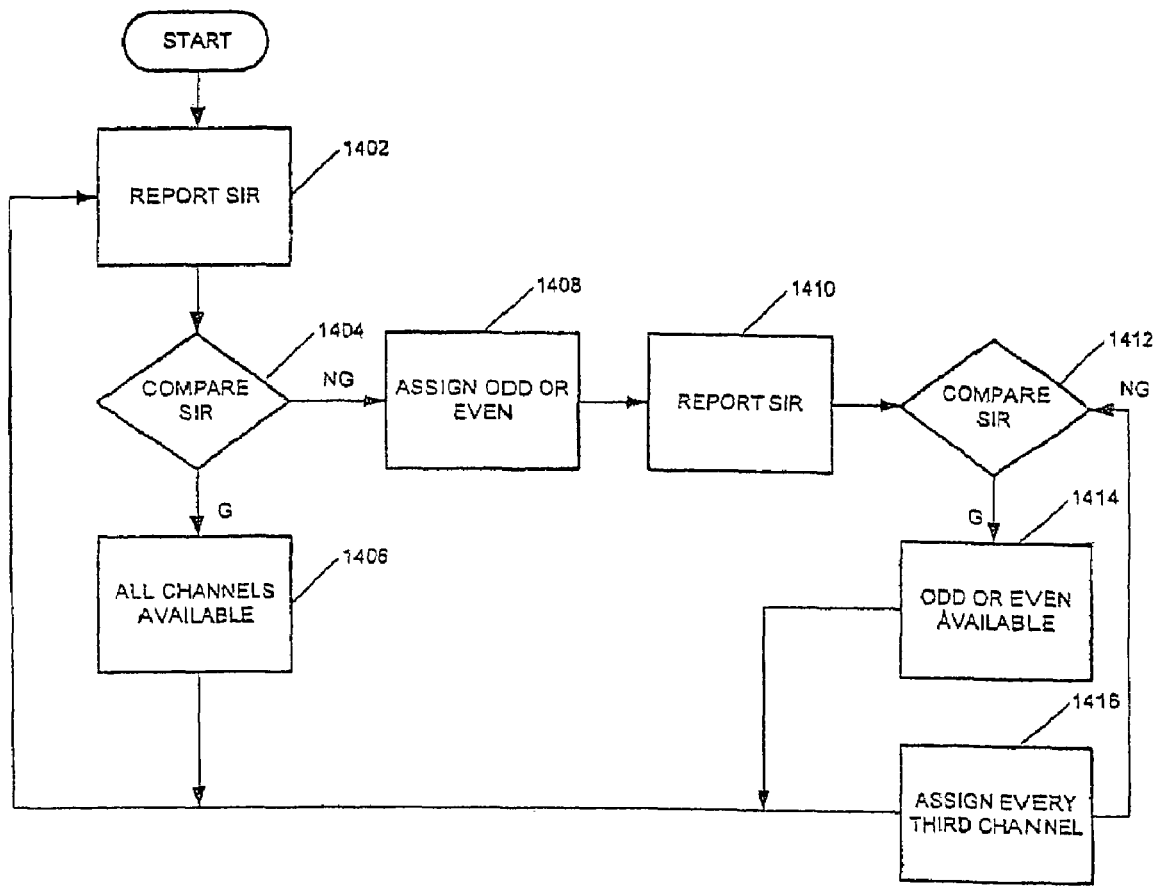
FIG. 14 is a flow chart illustrating the assignment of sub-channels based on SIR measurements in the wireless communication system of FIG. 11 in accordance with the invention.

The manner in which such a coordinated assignment of sub-channels can work is illustrated by the flow chart in FIG. 14. First in step 1402, a communication device, such as device 1108, reports the SIR for all sub-channel groups G1 to G8. The SIRs reported are then compared, in step 1404, to a threshold to determine if the SIR is sufficiently low for each group. Alternatively, device 1108 can make the determination and simply report which groups are above or below the SIR threshold. If the SIR levels are good for each group, then base station 1110 can make each group available to device 1108, in step 1406. Periodically, device 1108 preferably measures the SIR level and updates base station 1110 in case the SIR as deteriorated. For example, device 1108 may move from near the center of cell 1102 toward the edge, where interference from an adjacent cell may affect the SIR for device 1108.

If the comparison in step 1404 reveals that the SIR levels are not good, then base station 1110 can be preprogrammed to assign either the odd groups or the even groups only to device 1108, which it will do in step 1408. Device 1108 then reports the SIR measurements for the odd or even groups it is assigned in step 1410, and they are again compared to a SIR threshold in step 1412.

It is assumed that the poor SIR level is due to the fact that device 1108 is operating at the edge of cell 1102 and is therefore being interfered with by a device such as device 1118. But device 1108 will be interfering with device 1118 at the same time. Therefore, the assignment of odd or even groups in step 1408 preferably corresponds with the assignment of the opposite groups to device 1118, by base station 1114, Accordingly, when device 1108 reports the SIR measurements for whichever groups, odd or even, are assigned to it, the comparison in step 1410 should reveal that the SIR levels are now below the threshold level. Thus, base station 1110 makes the assigned groups available to device 1108 in step 1414. Again, device 1108 preferably periodically updates the SIR measurements by returning to step 1402.

It is possible for the comparison of step 1410 to reveal that the SIR levels are still above the threshold, which should indicate that a third device, e.g., device 1116 is still interfering with device 1108. In this case, base station 1110 can be preprogrammed to assign every third group to device 1108 in step 1416. This should correspond with the corresponding assignments of non-interfering channels to devices 1118 and 1116 by base stations 1114 and 1112, respectively. Thus, device 1108 should be able to operate on the sub-channel groups assigned, i.e., G1, G4, etc., without undue interference. Again, device 1108 preferably periodically updates the SIR measurements by returning to step 1402. Optionally, a third comparison step (not shown) can be implemented after step 1416, to ensure that the groups assigned to device 1408 posses an adequate SIR level for proper operation. Moreover, if there are more adjacent cells, i.e., if it is possible for devices in a $4^{th}$ or even a $5^{th}$ adjacent cell to interfere with device 1108, then the process of FIG. 14 would continue and the sub-channel groups would be divided even further to ensure adequate SIR levels on the sub-channels assigned to device 1108.

Even though the process of FIG. 14 reduces the bandwidth available to devices at the edge of cells 1102, 1104, and 1106, the SIR measurements can be used in such a manner as to increase the data rate and therefore restore or even increase bandwidth. To accomplish this, the transmitters and receivers used in base stations 1102, 1104, and 1106, and in devices in communication therewith, e.g., devices 1108, 1114, and 1116 respectively, must be capable of dynamically changing the symbol mapping schemes used for some or all of the sub-channel. For example, in some embodiments, the symbol mapping scheme can be dynamically changed among BPSK, QPSK, 8PSK, 16QAM, 32QAM, etc. As the symbol mapping scheme moves higher, i.e., toward 32QAM, the SIR level required for proper operation moves higher, i.e., less and less interference can be withstood. Therefore, once the SIR levels are determined for each group, the base station, e.g., base station 1110, can then determine what symbol mapping scheme can be supported for each sub-channel group and can change the modulation scheme accordingly. Device 1108 must also change the symbol mapping scheme to correspond to that of the base stations. The change can be effected for all groups uniformly, or it can be effected for individual groups. Moreover, the symbol mapping scheme can be changed on just the forward link, just the reverse link, or both, depending on the embodiment.

Thus, by maintaining the capability to dynamically change the symbol mapping scheme used for assigned sub-channels, the systems and methods described herein provide the ability to maintain higher available bandwidths with higher performance levels than conventional systems. To fully realize the benefits described, however, the systems and methods described thus far must be capable of implementation in a cost effect and convenient manner. Moreover, the implementation must include reconfigurability so that a single device can move between different types of communication systems and still maintain optimum performance in accordance with the systems and methods described herein. The following descriptions detail example high level embodiments of hardware implementations configured to operate in accordance with the systems and methods described herein in such a manner as to provide the capability just described above.

5. Sample Transmitter Embodiments

Figure 15:
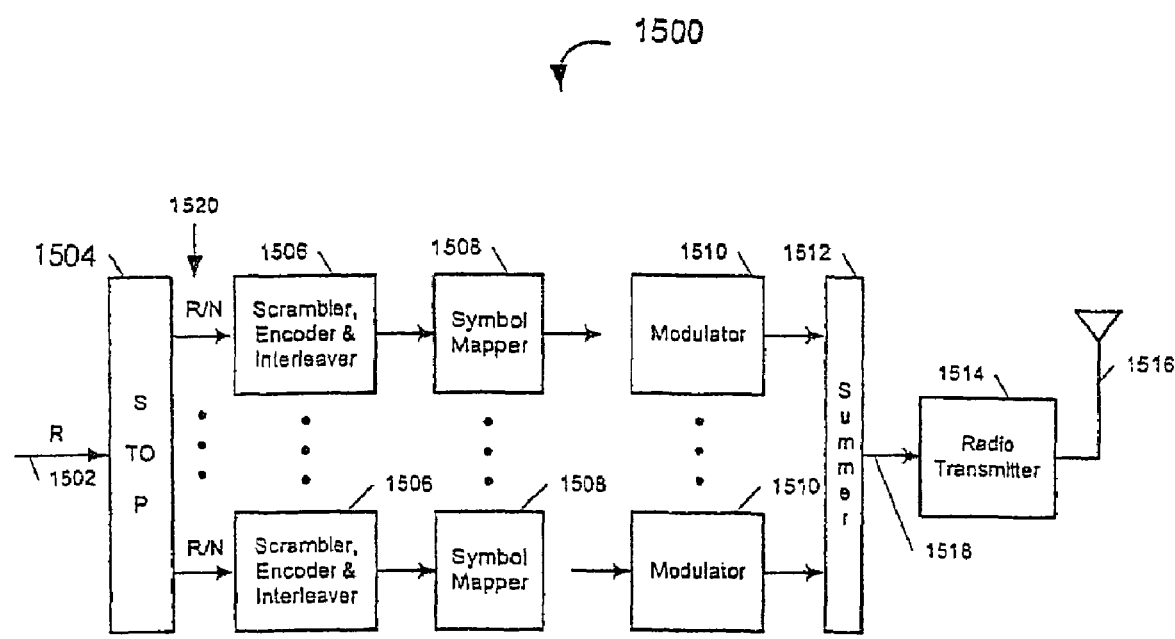
FIG. 15 is a logical block diagram of an example embodiment of transmitter configured in accordance with the invention.

FIG. 15 is logical block diagram illustrating an example embodiment of a transmitter 1500 configured for wireless communication in accordance with the systems and methods described above. The transmitter could, for example be within a base station, e.g., base station 606, or within a communication device, such as device 604. Transmitter 1500 is provided to illustrate logical components that can be included in a transmitter configured in accordance with the systems and methods described herein. It is not intended to limit the systems and methods for wireless communication over a wide bandwidth channel using a plurality of sub-channels to any particular transmitter configuration or any particular wireless communication system.

With this in mind, it can be seen that transmitter 1500 comprises a serial-to-parallel converter 1504 configured to receive a serial data stream 1502 comprising a data rate R. Serial-to-parallel converter 1504 converts data stream 1502 into N parallel data streams 1504, where N is the number of sub-channels 200. It should be noted that while the discussion that follows assumes that a single serial data stream is used, more than one serial data stream can also be used if required or desired. In any case, the data rate of each parallel data stream 1504 is then R/N. Each data stream 1504 is then sent to a scrambler, encoder, and interleaver block 1506. Scrambling, encoding, and interleaving are common techniques implemented in many wireless communication transmitters and help to provide robust, secure communication. Examples of these techniques will be briefly explained for illustrative purposes.

Scrambling breaks up the data to be transmitted in an effort to smooth out the spectral density of the transmitted data. For example, if the data comprises a long string of "1"s, there will be a spike in the spectral density. This spike can cause greater interference within the wireless communication system. By breaking up the data, the spectral density can be smoothed out to avoid any such peaks. Often, scrambling is achieved by XORing the data with a random sequence.

Encoding, or coding, the parallel bit streams 1504 can, for example, provide Forward Error Correction (FEC). The purpose of FEC is to improve the capacity of a communication channel by adding some carefully designed redundant information to the data being transmitted through the channel. The process of adding this redundant information is known as channel coding. Convolutional coding and block coding are the two major forms of channel coding. Convolutional codes operate on serial data, one or a few bits at a time. Block codes operate on relatively large (typically, up to a couple of hundred bytes) message blocks. There are a variety of useful convolutional and block codes, and a variety of algorithms for decoding the received coded information sequences to recover the original data. For example, convolutional encoding or turbo coding with Viterbi decoding is a FEC technique that is particularly suited to a channel in which the transmitted signal is corrupted mainly by additive white gaussian noise (AWGN) or even a channel that simply experiences fading.

Convolutional codes are usually described using two parameters: the code rate and the constraint length. The code rate, k/n, is expressed as a ratio of the number of bits into the convolutional encoder (k) to the number of channel symbols (n) output by the convolutional encoder in a given encoder cycle. A common code rate is ½, which means that 2 symbols are produced for every 1-bit input into the coder. The constraint length parameter, K, denotes the "length" of the convolutional encoder, i.e. how many &-bit stages are available to feed the combinatorial logic that produces the output symbols. Closely related to K is the parameter m, which indicates how many encoder cycles an input bit is retained and used for encoding after it first appears at the input to the convolutional encoder. The m parameter can be thought of as the memory length of the encoder.

Interleaving is used to reduce the effects of fading. Interleaving mixes up the order of the data so that if a fade interferes with a portion of the transmitted signal, the overall message will not be effected. This is because once the message is de-interleaved and decoded in the receiver, the data lost wall comprise non-contiguous portions of the overall message. In other words, the fade will interfere with a contiguous portion of the interleaved message, but when the message is de-interleaved, the interfered with portion is spread throughout the overall message. Using techniques such as FEC, the missing information can then be filled in, or the impact of the lost data may just be negligible.

After blocks 1506, each parallel data stream 1504 is sent to symbol mappers 1508. Symbol mappers 1508 apply the requisite symbol mapping, e.g., BPSK, QPSK. etc.; to each parallel data stream 1504. Symbol mappers 1508 are preferably programmable so that the modulation applied to parallel data streams can be changed, for example, in response to the SIR reported for each sub-channel 202. It is also preferable, that each symbol mapper 1508 be separately programmable so that the optimum symbol mapping scheme for each sub-channel can be selected and applied to each parallel data stream 1504.

After symbol mappers 1508, parallel data streams 1504 are sent to modulators 1510. Important aspects and features of example embodiments of modulators 1510 are described below. After modulators 1510, parallel data streams 1504 are sent to summer 1512, which is configured to sum the parallel data streams and thereby generate a single serial data stream 1518 comprising each of the individually processed parallel data streams 1504. Serial data stream 1518 is then sent to radio module 1512, where it is modulated with an RJF carrier, amplified, and transmitted via antenna 1516 according to known techniques. Radio module embodiments that can be used in conjunction with the systems and methods described herein are described below.

The transmitted signal occupies the entire bandwidth B of communication channel 100 and comprises each of the discrete parallel data streams 1504 encoded onto their respective sub-channels 102 within bandwidth B. Encoding parallel data streams 1504 onto the appropriate sub-channels 102 requires that each parallel data stream 1504 be shifted in frequency by an appropriate offset. This is achieved in modulator 1510.

Figure 16:
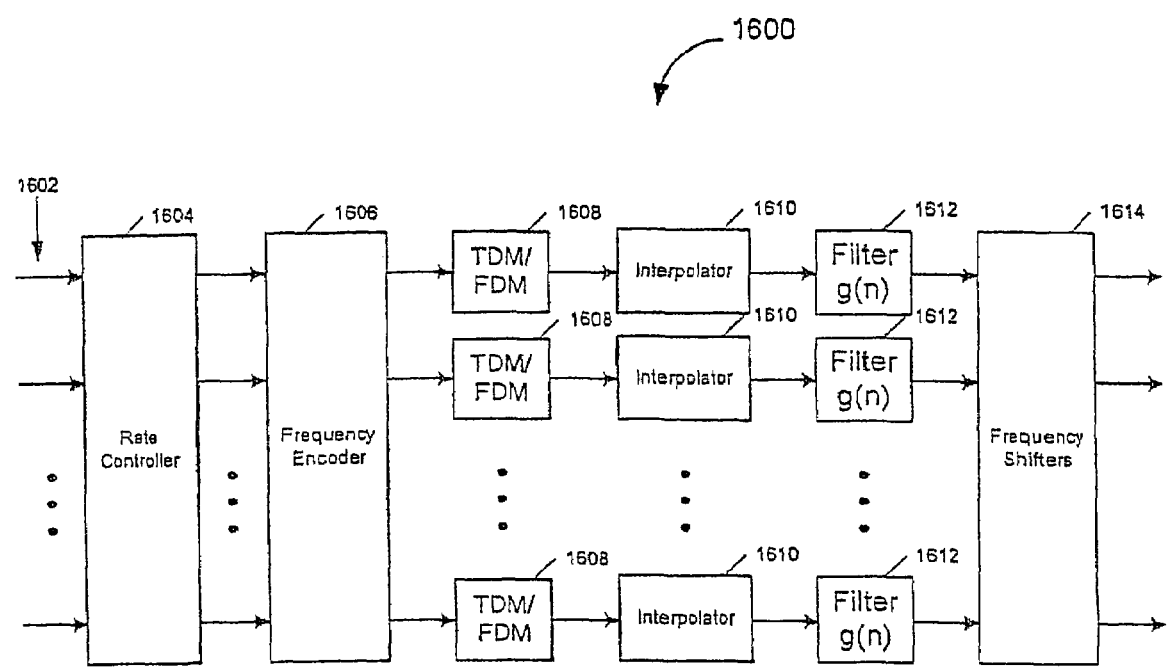
FIG. 16 is a logical block diagram of an example embodiment of a modulator configured in accordance with the present invention for use in the transmitter of FIG. 15.

FIG. 16 is a logical block diagram of an example embodiment of a modulator 1600 in accordance with the systems and methods described herein. Importantly, modulator 1600 takes parallel data streams 1602 performs Time Division Modulation (TDM) or Frequency Division Modulation (FDM) on each data stream 1602, filters them using filters 1612, and then shifts each data stream in frequency using frequency shifter 1614 so that they occupy the appropriate sub-channel. Filters 1612 apply the required pulse snapping, i.e., they apply the roll-off factor described in section 1. The frequency shifted parallel data streams 1602 are then summed and transmitted. Modulator 1600 can also include rate controller 1604, frequency encoder 1606, and interpolators 1610. All of the components shown in FIG. 16 are described in more detail in the following paragraphs and in conjunction with FIGS. 17-23.

Figure 17:
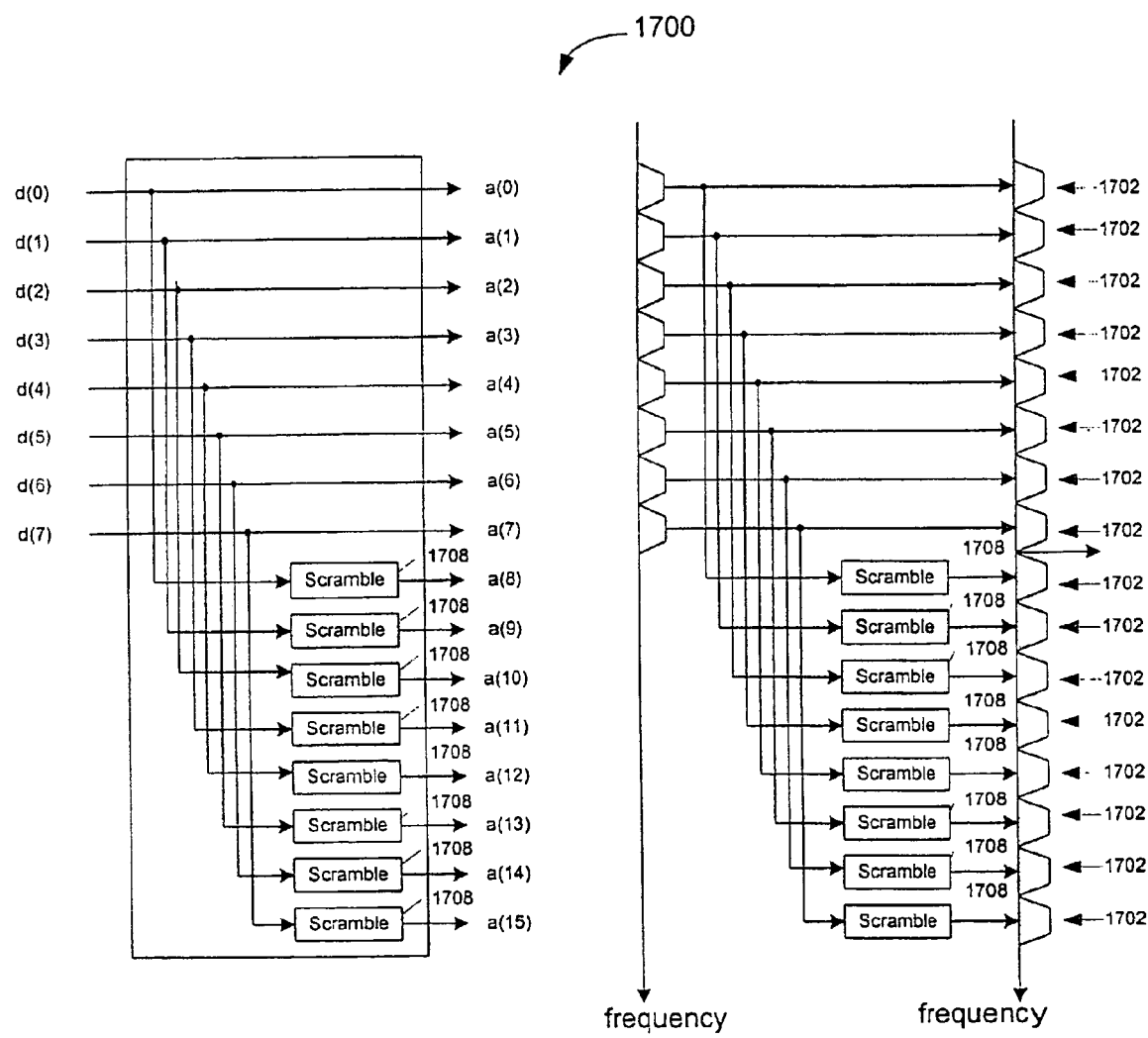
FIG. 17 is a diagram illustrating an example embodiment of a rate controller configured in accordance with the invention for use in the modulator of FIG. 16.

FIG. 17 illustrates one example embodiment of a rate controller 1700 in accordance with the systems and methods described herein. Rate control 1700 is used to control the data rate of each parallel data stream 1602. In rate controller 1700, the data rate is halved by repeating data streams d(0) to d(7), for example, producing streams a(0) to a(15) in which a(0) is the same as a(8), a(1) is the same as a(9), etc. FIG. 17 illustrates that the effect of repeating the data streams in this manner is to take the data streams that are encoded onto the first 8 sub-channels 1702, and duplicate them on the next 8 sub-channels 1702. As can be seen, 7 sub-channels separate sub-channels 1702 comprising the same, or duplicate, data streams. Thus, if fading effects one sub-channel 1702, for example, the other sub-channels 1702 carrying the same data will likely not be effected, i.e., there is frequency diversity between the duplicate data streams. So by sacrificing data rate, in this case half the data rate, more robust transmission is achieved. Moreover, the robustness provided by duplicating the data streams d(0) to d(8) can be further enhanced by applying scrambling to the duplicated data streams via scramblers 1704.

It should be noted that the data rate can be reduced by more than half, e.g. by four or more. Alternatively, the data rate can also be reduced by an amount other than half. For example if information from n data stream is encoded m sub-channels, where m>n. Thus, to decrease the rate by ⅔, information from one data stream can be encoded on a first sub-channel, information from a second data stream can be encoded on a second data channel, and the sum or difference of the two data streams can be encoded on a third channel. In which case, proper scaling will need to be applied to the power in the third channel. Otherwise, for example, the power in the third channel can be twice the power in the first two.

Preferably, rate controller 1700 is programmable so that the data rate can be changed responsive to certain operational factors. For example, if the SIR reported for sub-channels 1702 is low, then rate controller 1700 can be programmed to provide more robust transmission via repetition to ensure that no data is lost due to interference. Additionally, different types of wireless communication system, e.g., indoor, outdoor, line-of-sight, may require varying degrees of robustness. Thus, rate controller 1700 can be adjusted to provide the minimum required robustness for the particular type of communication system. This type of programmability not only ensures robust communication, it can also be used to allow a single device to move between communication systems and maintain superior performance.

Figure 18:
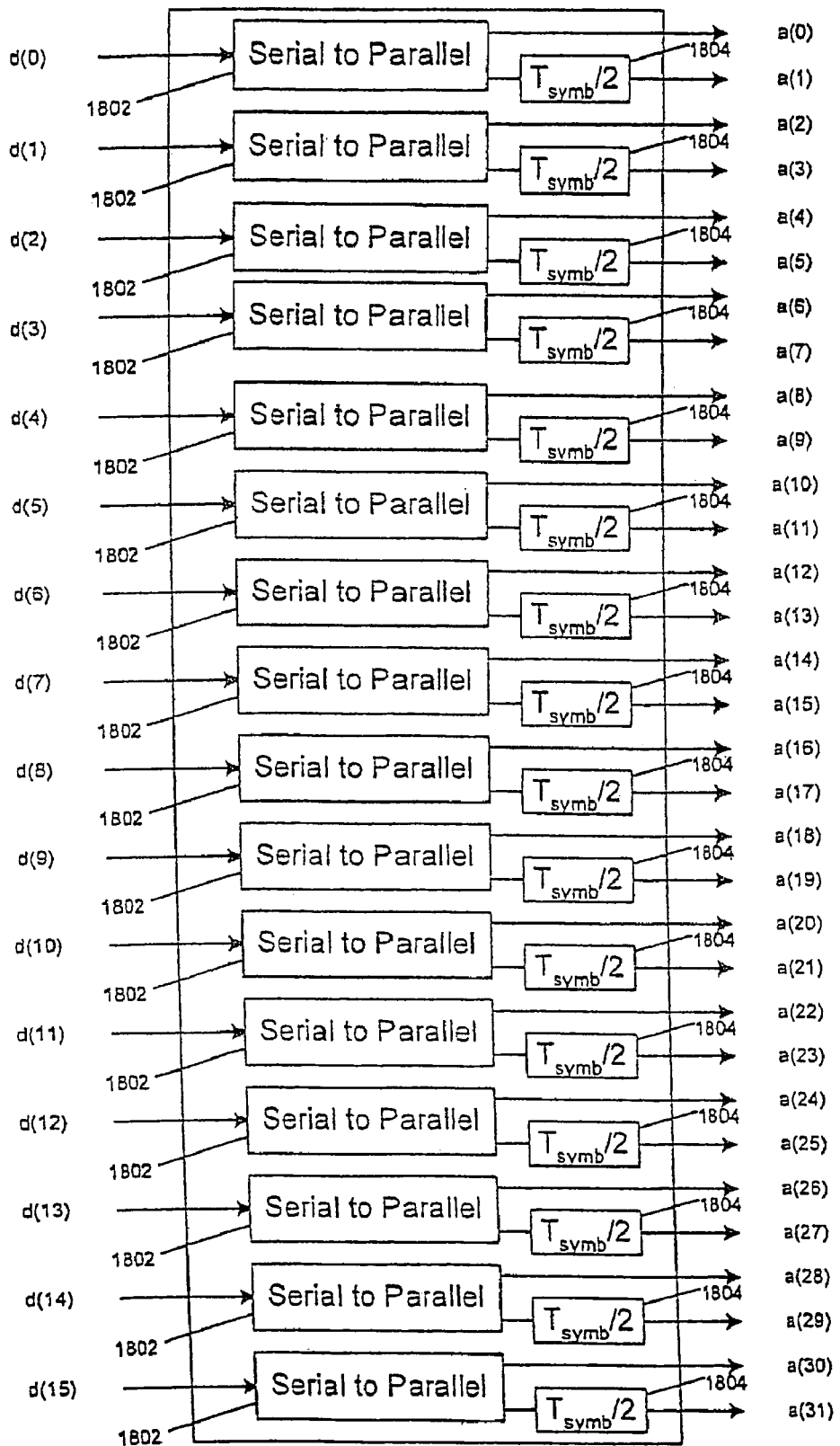
FIG. 18 is a diagram illustrating another example embodiment of a rate controller configured in accordance with the invention for use in the modulator of FIG. 16.

FIG. 18 illustrates an alternative example embodiment of a rate controller 1800 in accordance with the systems and methods described. In rate controller 1800 the data rate is increased instead of decreased. This is accomplished using serial-to-parallel converters 1802 to convert each data streams d(0) to d(15), for example, into two data streams. Delay circuits 1804 then delay one of the two data streams generated by each serial-to-parallel converter 1802 by ½ a symbol. Thus, data streams d(0) to d(15) are transformed into data streams a(0) to a(31). The data streams generated by a particular serial-to-parallel converter 1802 and associate delay circuit 1804 must then be summed and encoded onto the appropriate sub-channel. For example, data streams a(0) and a(1) must be summed and encoded onto the first sub-channel. Preferably, the data streams are summed subsequent to each data stream being pulsed shaped by a filter 1612.

Thus, rate controller 1604 is preferably programmable so that the data rate can be increased, as in rate controller 1800, or decreased, as in rate controller 1700, as required by a particular type of wireless communication system, or as required by the communication channel conditions or sub-channel conditions. In the event that the data rate is increased, filters 1612 are also preferably programmable so that they can be configured to apply pulse snapping to data streams a(0) to a(31), for example, and then sum the appropriate streams to generate the appropriate number of parallel data streams to send to frequency shifter 1614.

The advantage of increasing the data rate in the manner illustrated in FIG. 18 is that higher symbol mapping rates can essentially be achieved, without changing the symbol mapping used in symbol mappers 1508. Once the data streams are summed, the summed streams are shifted in frequency so that they reside in the appropriate sub-channel But because the number of bits per each symbol has been doubled, the symbol mapping rate has been doubled. Thus, for example, a 4QAM symbol mapping can be converted to a 16QAM symbol mapping, even if the SIR is too high for 16QAM symbol mapping to otherwise be applied. In other words, programming rate controller 1800 to increase the data rate in the manner illustrated in FIG. 18 can increase the symbol mapping even when channel conditions would otherwise not allow it, which in turn can allow a communication device to maintain adequate or even superior performance regardless of the type of communication system.

The draw back to increasing the data rate as illustrated in FIG. 18 is that interference is increased, as is receiver complexity. The former is due to the increased amount of data. The latter is due to the fact that each symbol cannot be processed independently because of the ½ symbol overlap. Thus, these concerns must be balanced against the increase symbol mapping ability when implementing a rate controller such as rate controller 1800.

Figure 19:
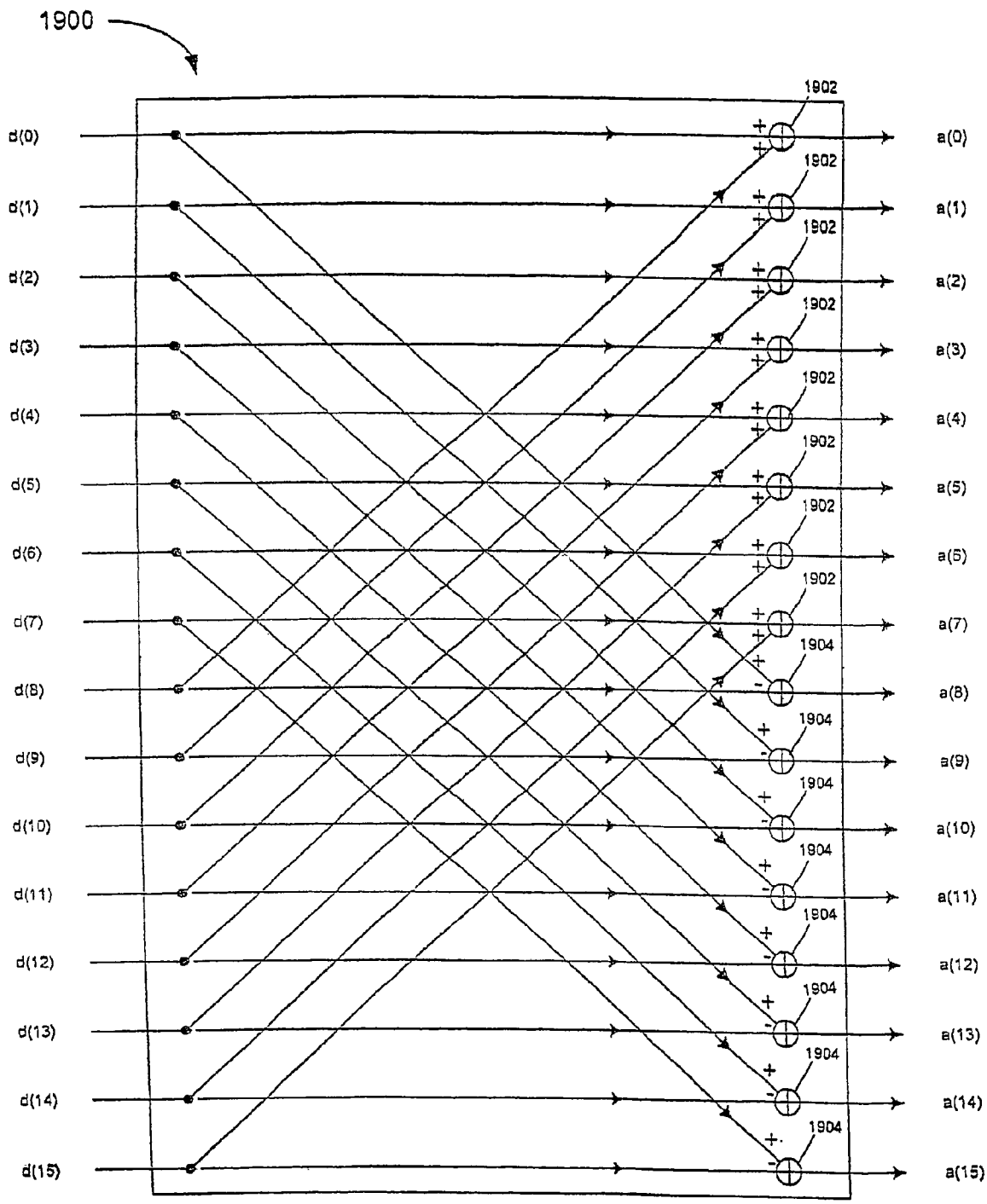
FIG. 19 is a diagram illustrating an example embodiment of a frequency encoder configured in accordance with the invention for use in the modulator of FIG. 16.

FIG. 19 illustrates one example embodiment of a frequency encoder 1900 in accordance with the systems and methods described herein. Similar to rate encoding, frequency encoding is preferably used to provide increased communication robustness. In frequency encoder 1900 the sum or difference of multiple data streams are encoded onto each sub-channel. This is accomplished using adders 1902 to sum data streams d(0) to d(7) with data streams d(8) to d(15), respectively, while adders 1904 subtract data streams d(0) to d(7) from data streams d(8) to d(15), respectively, as shown. Thus, data streams a(0) to a(15) generated by adders 1902 and 1904 comprise information related to more than one data streams d(0) to d(15). For example, a(0 comprises the sum of d(0) and d(8), i.e., d(0)+d(8), while a(8) comprises d(8)−d(0). Therefore, if either a(0) or a(8) is not received due to fading, for example, then both of data streams d(0) and d(8) can still be retrieved from data stream a(8).

Essentially, the relationship between data stream d(0) to d(15) and a(0) to a(15) is a matrix relationship. Thus, if the receiver knows the correct matrix to apply, it can recover the sums and differences of d(0) to d(15) from a(0) to a(15). Preferably, frequency encoder 1900 is programmable, so that it can be enabled and disabled in order to provided robustness when required. Preferable, adders 1902 and 1904 are programmable also so that different matrices can be applied to d(0) to d(15).

Figure 20:
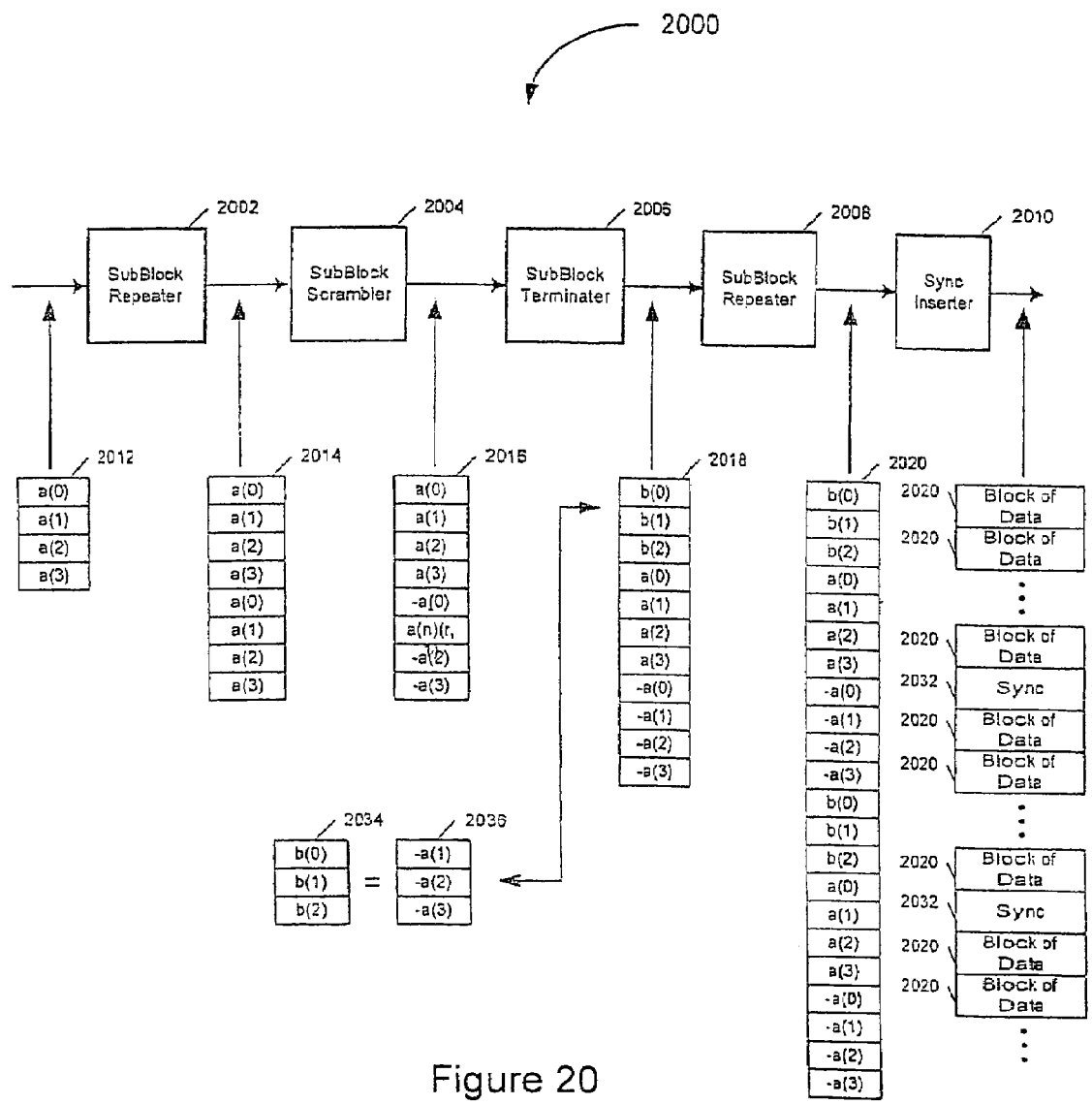
FIG. 20 is a logical block diagram of an example embodiment of a TDM/FDM block configured in accordance with the invention for use in the modulator of FIG. 16.

After frequency encoding, if it is included, data streams 1602 are sent to TDM/TDM blocks 1608. TDM/FDM blocks 1608 perform TDM or FDM on the data streams as required by the particular embodiment. FIG. 20 illustrates an example embodiment of a TDM/FDM block 2000 configured to perform TDM on a data stream. TDM/FDM block 2000 is provided to illustrate the logical components that can be included in a TDM/FDM block configured to perform TDM on a data stream, Depending on the actual implementation, some of the logical components may or may not be included. TDM/FDM block 2000 comprises a sub-block repeater 2002, a sub-block scrambler 2004, a sub-block terminator 2006, a sub-block repeater 2008, and a SYNC inserter 2010.

Sub-block repeater 2002 is configured to receive a sub-block of data, such as block 2012 comprising bits a(0) to a(3) for example. Sub-block repeater is then configured to repeat block 2012 to provide repetition, which in turn leads to more robust communication. Thus, sub-block repeater 2002 generates block 2014, which comprises 2 blocks 2012. Sub-block scrambler 2004 is then configured to receive block 2014 and to scramble it, thus generating block 2016. One method of scrambling can be to invert half of block 2014 as illustrated in block 2016. But other scrambling methods can also be implemented depending on the embodiment.

Sub-block terminator 2006 takes block 2016 generated by sub-block scrambler 2004 and adds a termination block 2034 to the front of block 2016 to form block 2018. Termination block 2034 ensures that each block can be processed independently in the receiver. Without termination block 2034, some blocks may be delayed due to multipath, for example, and they would therefore overlap part of the next block of data. But by including termination block 2034, the delayed block can be prevented from overlapping any of the actual data in the next block.

Termination block 2034 can be a cyclic prefix termination 2036. A cyclic prefix termination 2036 simply repeats the last few symbols of block 2018. Thus, for example, if cyclic prefix termination 2036 is three symbols long, then it would simply repeat the last three symbols of block 2018. Alternatively, termination block 2034 can comprise a sequence of symbols that are known to both the transmitter and receiver. The selection of what type of block termination 2034 to use can impact what type of equalizer is used in the receiver. Therefore, receiver complexity and choice of equalizers must be considered when determining what type of termination block 2034 to use in TDM/FDM block 2000.

After sub-block terminator 2006, TDM/FDM block 2000 can include a sub-block repeater 2008 configured to perform a second block repetition step in which block 2018 is repeated to form block 2020. in certain embodiments, sub-block repeater can be configured to perform a second block scrambling step as well. After sub-block repeater 2008, if included, TDM/FDM block 2000 comprises a SYNC inserter 210 configured to periodically insert an appropriate synchronization code 2032 after a predetermined number of blocks 2020 and/or to insert known symbols into each block. The purpose of synchronization code 2032 is discussed in section 3.

Figure 21:
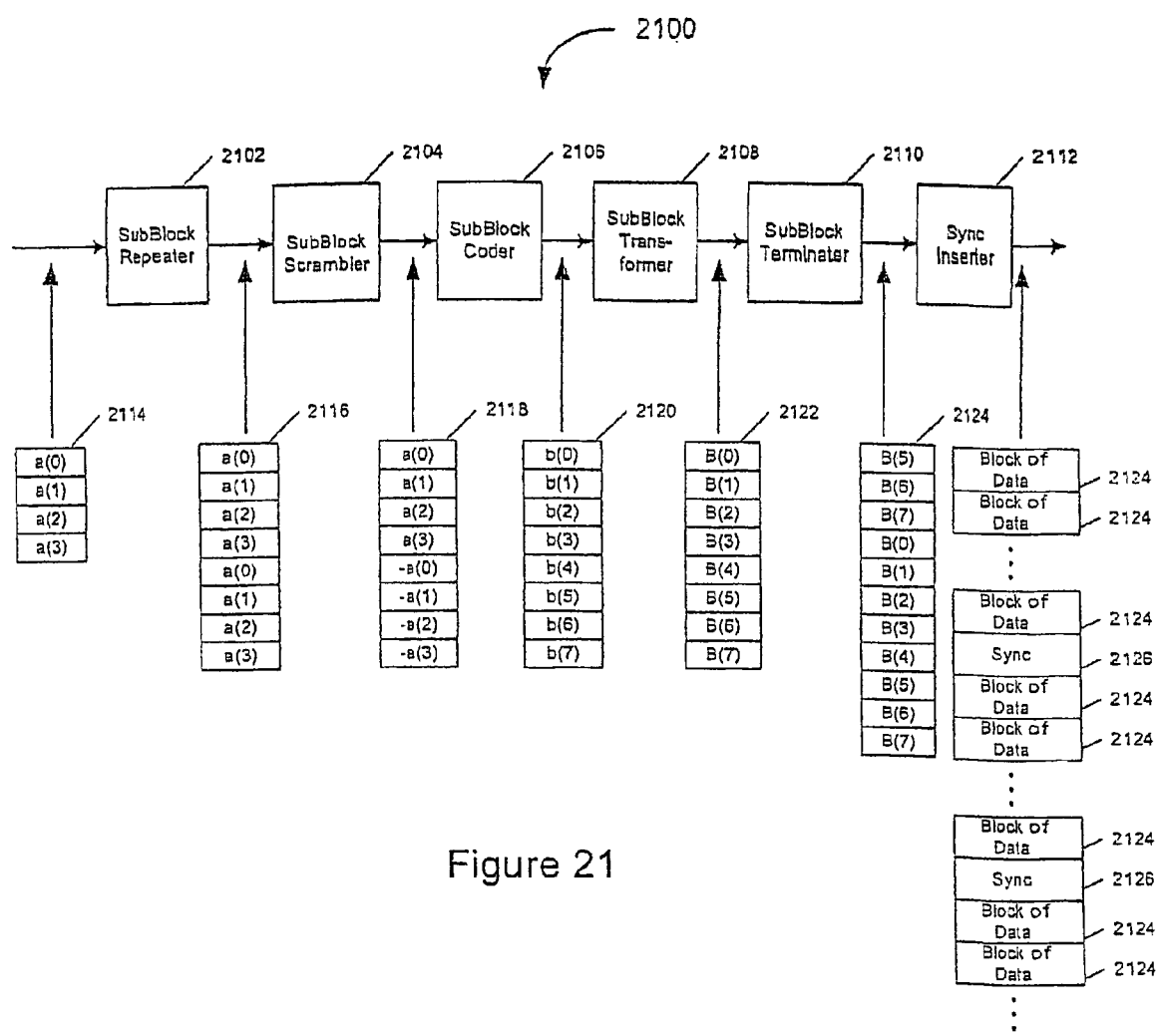
FIG. 21 is a logical block diagram of another example embodiment of a TDM/FDM block configured in accordance with the invention for use in the modulator of FIG. 16.

FIG. 21, on the other hand, illustrates an example embodiment of a TDM/FDM block 2100 configured for FDM, which comprises sub-block repeater 2102, sub-block scrambler 2104, block coder 2106, sub-block transformer 2108, sub-block terminator 2110, and SYNC inserter 2112, Sub-block repeater 2102 repeats block 2114 and generates block 2116. Sub-block scrambler then scrambles block 2116 generating block 2118. Sub-block coder 2106 takes block 2118 and codes it, generating block 2120. Coding block correlates the data symbols together and generates symbols b. This requires joint demodulation in the receiver, which is more robust but also more complex. Sub-block transformer 2108 then performs a transformation on block 2120, generating block 2122. Preferably, the transformation is an IFFT of block 2120, which allows for more efficient equalizers to be used in the receiver. Next, sub-block terminator 2110 terminates block 2122, generating block 2124 and SYNC inserter 2112 periodically inserts a synchronization code 2126 after a certain number of blocks 2124 and/or insert known symbols into each block. Preferably, sub-block terminator 2110 only uses cyclic prefix termination as described above. Again this allows for more efficient receiver designs.

TDM/FDM block 2100 is provided to illustrate the logical components that can be included in a TDM/FDM block configured to perform FDM on a data stream. Depending on the actual implementation, some of the logical components may or may not be included. Moreover, TDM/FDM block 2000 and 2100 are preferably programmable so that the appropriate logical components can be included as required by a particular implementation. This allows a device that incorporates one of blocks 2000 or 2100 to move between different systems with different requirements. Further, it is preferable that TDM/FDM block 1608 in FIG. 16 be programmable so that it can be programmed to perform TDM, such as described in conjunction with block 2000, or FDM, such as described in conjunction with block 2100, as required by a particular communication system.

After TDM/FDM blocks 1608, in FIG. 16, the parallel data streams are preferably passed to interpolators 1610.

After interpolators 1610, the parallel data streams are passed to filters 1612, which apply the pulse snapping described in conjunction with the roll-off factor of equation (2) in section 1. Then the parallel data streams are sent to frequency shifter 1614, which is configured to shift each parallel data stream by the frequency offset associated with the sub-channel to which the particular parallel data stream is associated.

Figure 22:
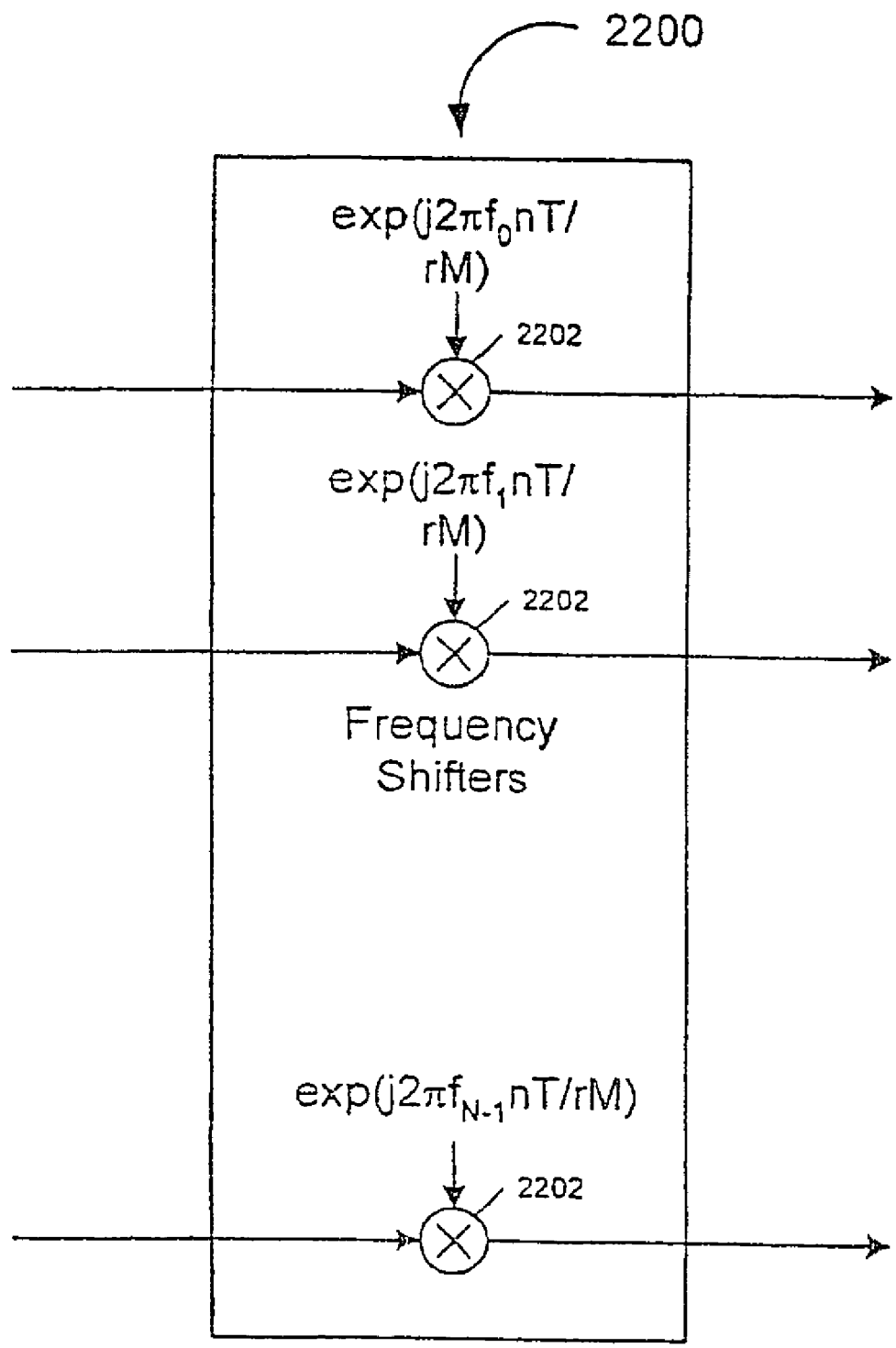
FIG. 22 is a logical block diagram of an example embodiment of a frequency shifter configured in accordance with the invention for use in the modulator of FIG. 16.

FIG. 22 illustrates an example embodiment of a frequency shifter 2200 in accordance with the systems and methods described herein. As can be seen, frequency shifter 2200 comprises multipliers 2202 configured to multiply each parallel data stream by the appropriate exponential to achieve the required frequency shift. Each exponential is of the form: $\exp(j2\pi f_c nT/rM)$, where c is the corresponding sub-channel, e.g., c=0 to N−1, and n is time. Preferably, frequency shifter 1614 in FIG. 5 is programmable so that various channel/sub-channel configurations can be accommodated for various different systems. Alternatively, an IFFT block can replace shifter 1614 and filtering can be done after the IFFT block. This type of implementation can be more efficient depending on the implementation.

After the parallel data streams are shifted, they are summed, e.g., in summer 1512 of FIG. 15. The summed data stream is then transmitted using the entire bandwidth B of the communication channel being used. But the transmitted data stream also comprises each of the parallel data streams shifted in frequency such that they occupy the appropriate sub-channel. Thus, each sub-channel may be assigned to one user, or each sub-channel may carry a data stream intended for different users. The assignment of sub-channels is described in section 3b. Regardless of how the sub-channels are assigned, however, each user will receive the entire bandwidth, comprising-all the sub-channels, but will only decode those sub-channels assigned to the user.

6. Sample Receiver Embodiments

Figure 23:
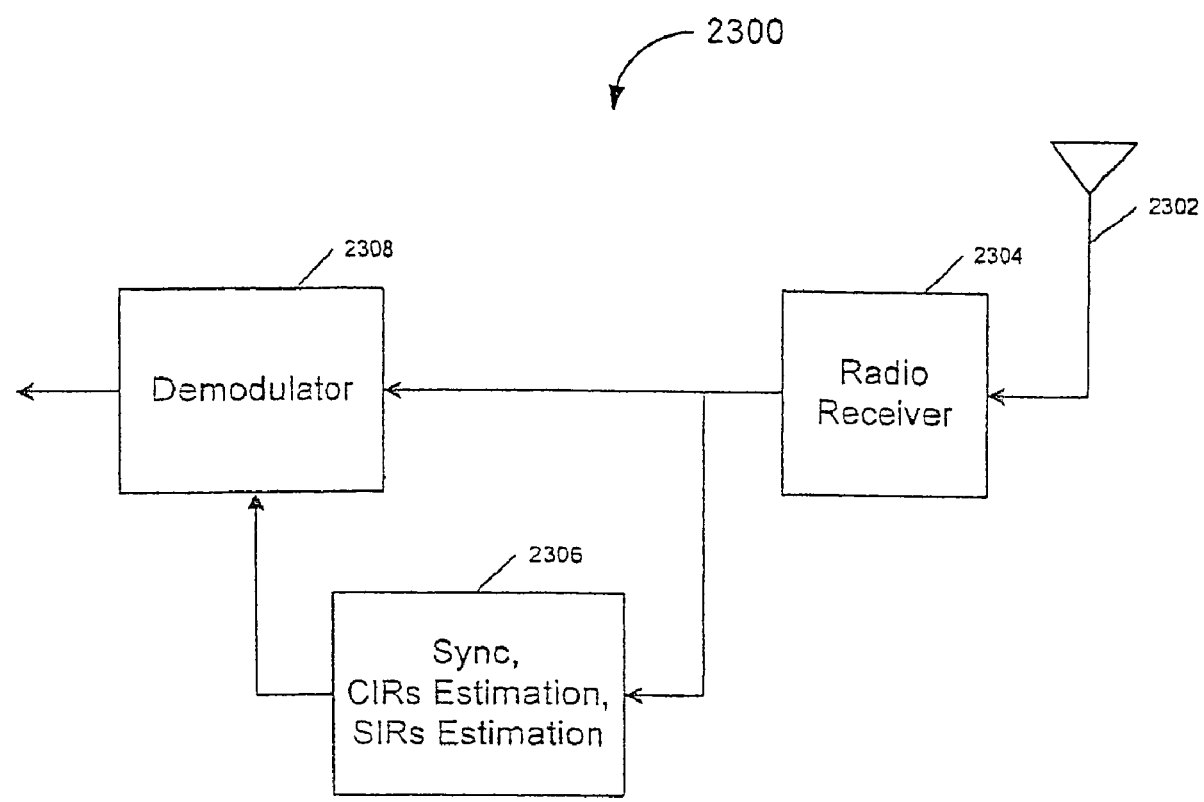
FIG. 23 is a logical block diagram of a receiver configured in accordance with the invention.

FIG. 23 illustrates an example embodiment of a receiver 2300 that can be configured in accordance with the present invention. Receiver 2300 comprises an antenna 2302 configured to receive a message transmitted by a transmitter, such as transmitter 1500. Thus, antenna 2302 is configured to receive a wide band message comprising the entire bandwidth B of a wide band channel that is divided into sub-channels of bandwidth B. As described above, the wide band message comprises a plurality of messages each encoded onto each of a corresponding sub-channel. All of the sub-channels may or may not be assigned to a device that includes receiver 2300; therefore, receiver 2300 may or may not be required to decode all of the sub-channels.

After the message is received by antenna 2300, it is sent to radio receiver 2304, which is configured to remove the carrier associated with the wide band communication channel and extract a baseband signal comprising the data stream transmitted by the transmitter. Example radio receiver embodiments are described in more detail below.

The baseband signal is then sent to correlator 2306 and demodulator 2308. Correlator 2306 is configured to correlated with a synchronization code inserted in the data stream as described in section 3. It is also preferably configured to perform SIR and multipath estimations as described in section 3(b). Demodulator 2308 is configured to extract the parallel data streams from each sub-channel assigned to the device comprising receiver 2300 and to generate a single data stream therefrom.

Figure 24:
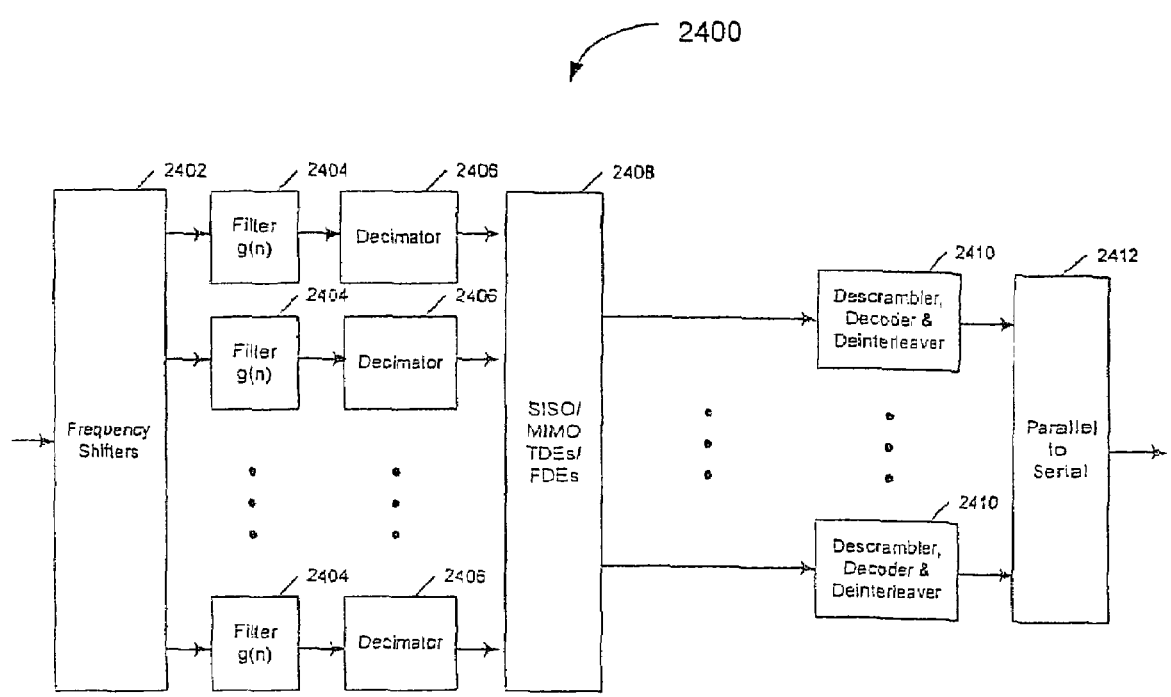
FIG. 24 is a logical block diagram of an example embodiment of a demodulator configured in accordance with the invention for use in the receiver of FIG. 23.

FIG. 24 illustrates an example embodiment of a demodulator 2400 in accordance with the systems and methods described herein. Demodulator 2402 comprises a frequency shifter 2402, which is configured to apply a frequency offset to the baseband data stream so that parallel data streams comprising the baseband data stream can be independently processed in receiver 2400. Thus, the output of frequency shifter 2402 is a plurality of parallel data streams, which are then preferably filtered by filters 2404. Filters 2404 apply a filter to each parallel data stream that corresponds to the pulse shape applied in the transmitter, e.g., transmitter 1500. Alternatively, an IFFT block can replace shifter 1614 and filtering can be done after the IFFT block. This type of implementation can be more efficient depending on the implementation.

Next, receiver 2400 preferably includes decimators 2406 configured to decimate the data rate of the parallel bit streams. Sampling at higher rates helps to ensure accurate recreation of the data. But the higher the data rate, the larger and more complex equalizer 2408 becomes. Thus, the sampling rate, and therefore the number of samples, can be reduced by decimators 2406 to an adequate level that allows for a smaller and less costly equalizer 2408.

Equalizer 2408 is configured to reduce the effects of multipath in receiver 2300. Its operation will be discussed more fully below. After equalizer 2408, the parallel data streams are sent to de-scrambler, decoder, and de-interleaver 2410, which perform the opposite operations of scrambler, encoder, and interleaver 1506 so as to reproduce the original data generated in the transmitter. The parallel data streams are then sent to parallel to serial converter 2412, which generates a single serial data stream from the parallel data streams.

Equalizer 2408 uses the multipath estimates provided by correlator 2306 to equalize the effects of multipath in receiver 2300. In one embodiment, equalizer 2408 comprises Single-In Single-Out (SISO) equalizers operating on each parallel data stream in demodulator 2400. In this case, each SISO equalizer comprising equalizer 2408 receives a single input and generates a single equalized output. Alternatively, each equalizer can be a Multiple-In Multiple-Out (MIMO) or a Multiple-In Single-Out (MISO) equalizer. Multiple inputs can be required for example, when a frequency encoder or rate controller, such as frequency encoder 1900, is included in the transmitter. Because frequency encoder 1900 encodes information from more than one parallel data stream onto each sub-channel, each equalizers comprising equalizer 2408 need to equalize more than one sub-channel Thus, for example, if a parallel data stream in demodulator 2400 comprises d(1)+d(8), then equalizer 2408 will need to equalize both d(1) and d(8) together. Equalizer 2408 can then generate a single output corresponding to d(1) or d(8) (MISO) or it can generate both d(1) and d(8) (MIMO).

Equalizer 2408 can also be a time domain equalizer (TDE) or a frequency domain equalizer (FDE) depending on the embodiment. Generally, equalizer 2408 is a TDE if the modulator in the transmitter performs TDM on the parallel data streams, and a FDE if the modulator performs FDM. But equalizer 2408 can be an FDE even if TDM is used in the transmitter. Therefore, the preferred equalizer type should be taken into consideration when deciding what type of block termination to use in the transmitter. Because of power requirements, it is often preferable to use FDM on the forward link and TDM on the reverse link in a wireless communication system.

As with transmitter 1500, the various components comprising demodulator 2400 are preferably programmable, so that a single device can operate in a plurality of different systems and still maintain superior performance, which is a primary advantage of the systems and methods described herein. Accordingly, the above discussion provides systems and methods for implementing a channel access protocol that allows the transmitter and receiver hardware to be reprogrammed slightly depending on the communication system.

Thus, when a device moves from one system to another, it preferably reconfigures the hardware, i.e. transmitter and receiver, as required and switches to a protocol stack corresponding to the new system. An important part of reconfiguring the receiver is reconfiguring, or programming, the equalizer because multipath is a main problem for each type of system. The multipath, however, varies depending on the type of system, which previously has meant that a different equalizer is required for different types of communication systems. The channel access protocol described in the preceding sections, however, allows for equalizers to be used that need only be reconfigured slightly for operation in various systems.

a. Sample Equalizer Embodiment

Figure 25:
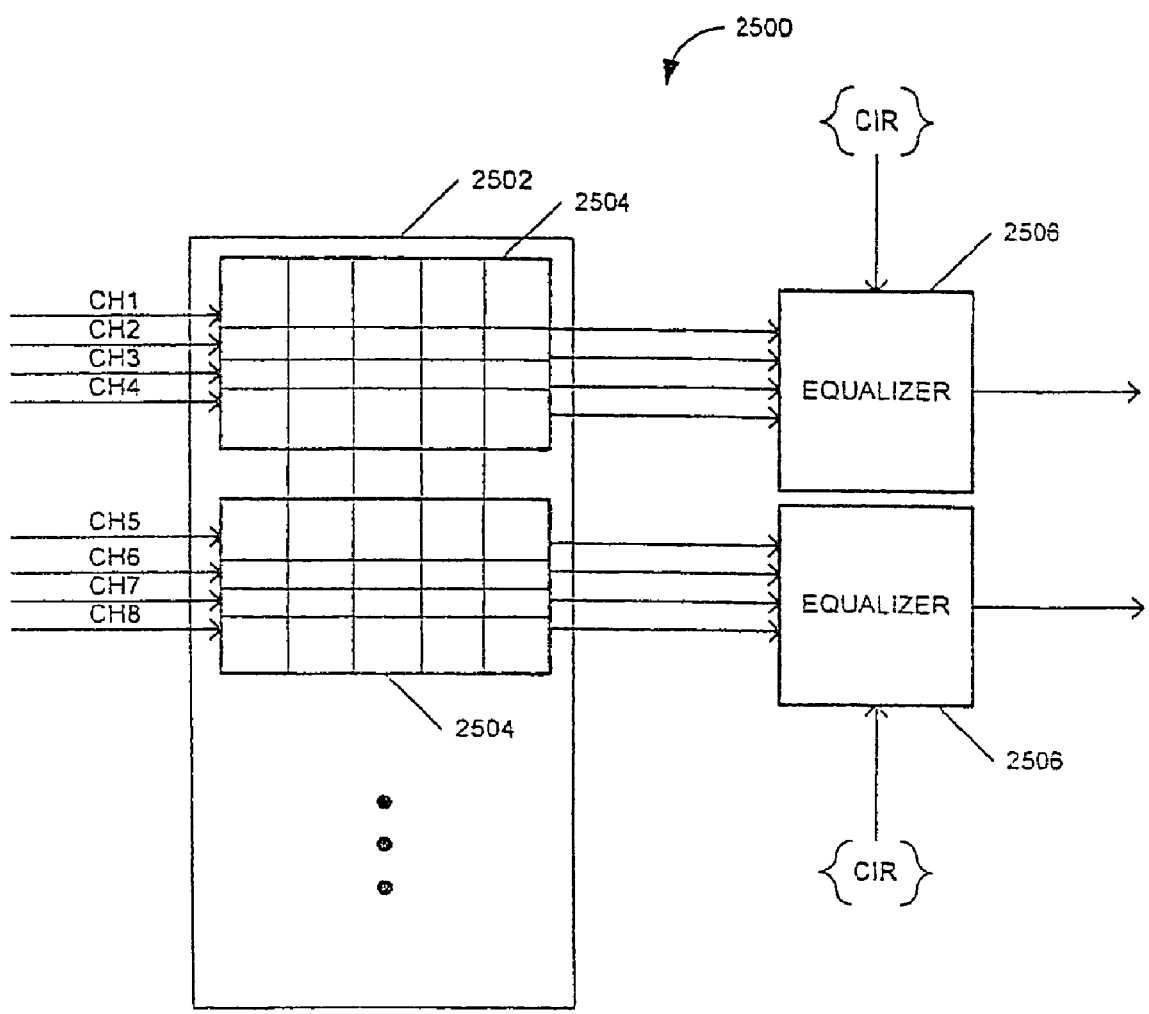
FIG. 25 is a logical block diagram of an example embodiment of an equalizer configured in accordance with the present invention for use in the demodulator of FIG. 24.

FIG. 25 illustrates an example embodiment of a receiver 2500 illustrating one way to configure equalizers 2506 in accordance with the systems and methods described herein. Before discussing the configuration of receiver 2500, it should be noted that one way to configure equalizers 2506 is to simply include one equalizer per channel (for the systems and methods described herein, a channel is the equivalent of a sub-channel as described above), A correlator, such as correlator 2306 (FIG. 23), can then provide equalizers 2506 with an estimate of the number, amplitude, and phase of any multipaths present, up to some maximum number. This is also known as the Channel Impulse Response (CIR). The maximum number of multipaths is determined based on design criteria for a particular implementation. The more multipaths included in the CIR the more path diversity the receiver has and the more robust communication in the system will be. Path diversity is discussed a little more fully below.

If there is one equalizer 2506 per channel, the CIR is preferably provided directly to equalizers 2506 from the correlator (not shown). If such a correlator configuration is used, then equalizers 2506 can be run at a slow rate, but the overall equalization process is relatively fast. For systems with a relatively small number of channels, such a configuration is therefore preferable. The problem, however, is that there is large variances in the number of channels used in different types of communication systems. For example, an outdoor system can have has many as 256 channels. This would require 256 equalizers 2506, which would make the receiver design too complex and costly. Thus, for systems with a lot of channels, the configuration illustrated in FIG. 25 is preferable. In receiver 2500, multiple channels share each equalizer 2506. For example, each equalizer can be shared by 4 channels, e.g., CH1-Ch4, Ch5-CH8, etc., as illustrated in FIG. 25, In which case, receiver 2500 preferably comprises a memory 2502 configured to store information arriving on each channel.

Memory 2502 is preferably divided into sub-sections 2504, which are each configured to store information for a particular subset of channels. Information for each channel in each subset is then alternately sent to the appropriate equalizer 2506, which equalizes the information based on the CIR provided for that channel. In this case, each equalizer must run much faster than it would if there was simply one equalizer per channel. For example, equalizers 2506 would need to run 4 or more times as fast in order to effectively equalize 4 channels as opposed to 1. In addition, extra memory 2502 is required to buffer the channel information. But overall, the complexity of receiver 2500 is reduced, because there are fewer equalizers. This should also lower the overall cost to implement receiver 2500.

Preferably, memory 2502 and the number of channels that are sent to a particular equalizer is programmable. In this way, receiver 2500 can be reconfigured for the most optimum operation for a given system. Thus, if receiver 2500 were moved from an outdoor system to an indoor system with fewer channels, then receiver 2500 can preferably be reconfigured so that there are fewer, even as few as 1, channel per equalizer. The rate at which equalizers 2506 are run is also preferably programmable such that equalizers 2506 can be run at the optimum rate for the number of channels being equalized.

In addition, if each equalizer 2506 is equalizing multiple channels, then the CIR for those multiple paths must alternately be provided to each equalizer 2506. Preferably, therefore, a memory (not shown) is also included to buffer the CIR information for each channel. The appropriate CIR information is then sent to each equalizer from the CIR memory (not shown) when the corresponding channel information is being equalized. The CIR memory (not shown) is also preferably programmable to ensure optimum operation regardless of what type of system receiver 2500 is operating in.

Returning to the issue of path diversity, the number of paths used by equalizers 2506 must account for the delay spread $d_s$ in the system. For example, if the system is an outdoor system operating in the 5 gigahertz (GHz) range, the communication channel can comprise a bandwidth of 125 megahertz (MHz), e.g., the channel can extend from 5.725 GHz to 5.85 GHz. If the channel is divided into 512 sub-channels with a roll-off factor r of 0.125, then each sub-channel will have a bandwidth of approximately 215 kilohertz (KHz), which provides approximately a 4.6 microsecond symbol duration. Since the worst case delay spread $d_s$ is 20 microseconds, the number of paths used by equalizers 2504 can be set to a maximum of 5. Thus, there would be a first path P1 at zero microseconds, a second path P2 at 4.6 microseconds, a third path P3 at 9.2 microseconds, a fourth path P4 at 13.8 microseconds, and fifth path P5 at 18.4 microseconds, which is close to the delay spread $d_s$ In another embodiment, a sixth path can be included so as to completely cover the delay spread $d_s$; however, 20 microseconds is the worst case. In fact, a delay spread $d_s$ of 3 microseconds is a more typical value. In most instances, therefore, the delay spread $d_s$ will actually be shorter and an extra path is not needed. Alternatively, fewer sub-channels can be used, thus providing a larger symbol duration, instead of using an extra path. But again, this would typically not be needed.

As explained above, equalizers 2506 are preferably configurable so that they can be reconfigured for various communication systems. Thus, for example, the number of paths used must be sufficient regardless of the type of communication system. But this is also dependent or the number of sub-channels used. If, for example, receiver 2500 went from operating in the above described outdoor system to an indoor system, where the delay spread $d_s$ is on the order of 1 microseconds, then receiver 2500 can preferably be reconfigured for 32 sub-channels and 5 paths. Assuming the same overall bandwidth of 125 MHz, the bandwidth of each sub-channel is approximately 4 MHz and the symbol duration is approximately 250 ns.

Therefore, there will be a first path P1 at zero microseconds and subsequent paths P2 to P5 at 250 ns, 500 ns, 750 ns, and 1 microsecond, respectively. Thus, the delay spread $d_s$ should be covered for the indoor environment. Again, the 1 microsecond delay spread $d_s$ is worst case so the 1 microsecond delay spread $d_s$ provided in the above example will often be more than is actually required. This is preferable, however, for indoor systems, because it can allow operation to extend outside of the inside environment, e.g., just outside the building in which the inside environment operates. For campus style environments, where a user is likely to be traveling between buildings, this can be advantageous.

7. Sample Embodiment of a Wireless Communication Device

Figure 26:
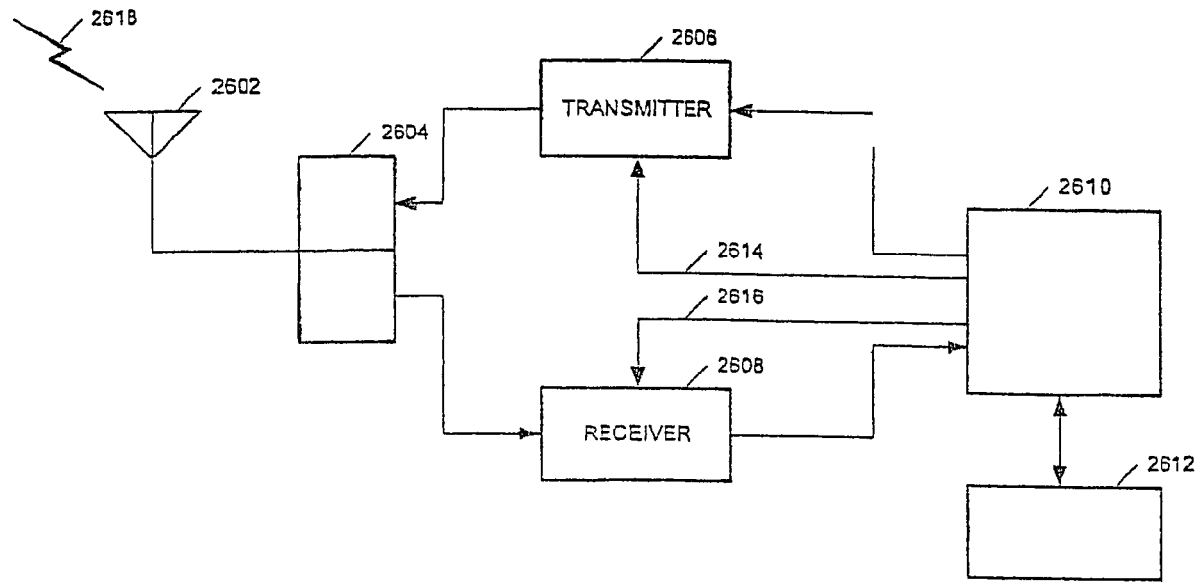
FIG. 26 is a logical block diagram of an example embodiment of a wireless communication device configured in accordance with the invention.

FIG. 26 illustrates an example embodiment of a wireless communication device in accordance with the systems and methods described herein. Device 2600 is, for example, a portable communication device configured for operation in a plurality of indoor and outdoor communication systems. Thus, device 2600 comprises an antenna 2602 for transmitting and receiving wireless communication signals over a wireless communication channel 2618. Duplexor 2604, or switch, can be included so that transmitter 2606 and receiver 2608 can both use antenna 2602, while being isolated from each other. Duplexors, or switches used for this purpose, are well known and will not be explained herein.

Transmitter 2606 is a configurable transmitter configured to. implement the channel access protocol described above. Thus, transmitter 2606 is capable of transmitting and encoding a wideband communication signal comprising a plurality of sub-channels. Moreover, transmitter 2606 is configured such that the various subcomponents that comprise transmitter 2606 can be reconfigured, or programmed, as described in section 5. Similarly, receiver 2608 is configured to implement the channel access protocol described above and is, therefore, also configured such that the various sub-components comprising receiver 2608 can be reconfigured," or reprogrammed, as described in section 6.

Transmitter 2606 and receiver 2608 are interfaced with processor 2610, which can comprise various processing, controller, and/or Digital Signal Processing (DSP) circuits. Processor 2610 controls the operation of device 2600 including encoding signals to be transmitted by transmitter 2606 and decoding signals received by receiver 2608. Device 2610 can also include memory 2612, which can be configured to store operating instructions, e.g., firmware/software, used by processor 2610 to control the operation of device 2600.

Processor 2610 is also preferably configured to reprogram transmitter 2606 and receiver 2608 via control interfaces 2614 and 2616, respectively, as required by the wireless communication system in which device 2600 is operating. Thus, for example, device 2600 can be configured to periodically ascertain the availability is a preferred communication system. If the system is detected, then processor 2610 can be configured to load the corresponding operating instruction from memory 2612 and reconfigure transmitter 2606 and receiver 2608 for operation in the preferred system.

For example, it may preferable for device 2600 to switch to an indoor wireless LAN if it is available. So device 2600 may be operating in a wireless WAN where no wireless LAN is available, while periodically searching for the availability of an appropriate wireless LAN. Once the wireless LAN is detected, processor 2610 will load the operating instructions, e.g., the appropriate protocol stack, for the wireless LAN environment and will reprogram transmitter 2606 and receiver 2608 accordingly, In this manner, device 2600 can move from one type of communication system to another, while maintaining superior performance.

It should be noted that a base station configured in accordance with the systems and methods herein will operate in a similar manner as device 2600; however, because the base station does not move from one type of system to another, there is generally no need to configure processor 2610 to reconfigure transmitter 2606 and receiver 2608 for operation in accordance with the operating instruction for a different type of system. But processor 2610 can still be configured to reconfigure, or reprogram the sub-components of transmitter 2606 and/or receiver 2608 as required by the operating conditions within the system as reported by communication devices in communication with the base station. Moreover, such a base station can be configured in accordance with the systems and methods described herein to implement more than one mode of operation. In which case, controller 2610 can be configured to reprogram transmitter 2606 and receiver 2608 to implement the appropriate mode of operation.

8. Bandwidth Recovery

As described above in relation to FIGS. 11-14, when a device, such as device 1118 is near the edge of a communication cell 1106, it may experience interference from base station 1112 of an adjacent communication cell 1104. In this case, device 1118 will report a low SIR to base station 1114, which will cause base station 1114 to reduce the number of sub-channels assigned to device 1118. As explained in relation to FIGS. 12 and 13, this reduction can comprise base station 1114 assigning only even sub-channels to device 1118. Preferably, base station 1112 is correspondingly assigning only odd sub-channels to device 1116.

fn this manner, base station 1112 and 1114 perform complementary reductions in the channels assigned to devices 1116 and 1118 in order to prevent interference and improve performance of devices 1116 and 1118. The reduction in assigned channels reduces the overall bandwidth available to devices 1116 and 1118. But as described above, a system implementing such a complementary reduction of sub-channels will still maintain a higher bandwidth than conventional systems. Still, it is preferable to recover the unused sub-channels, or unused bandwidth, created by the reduction of sub-channels in response to a low reported SIR.

Figure 27:
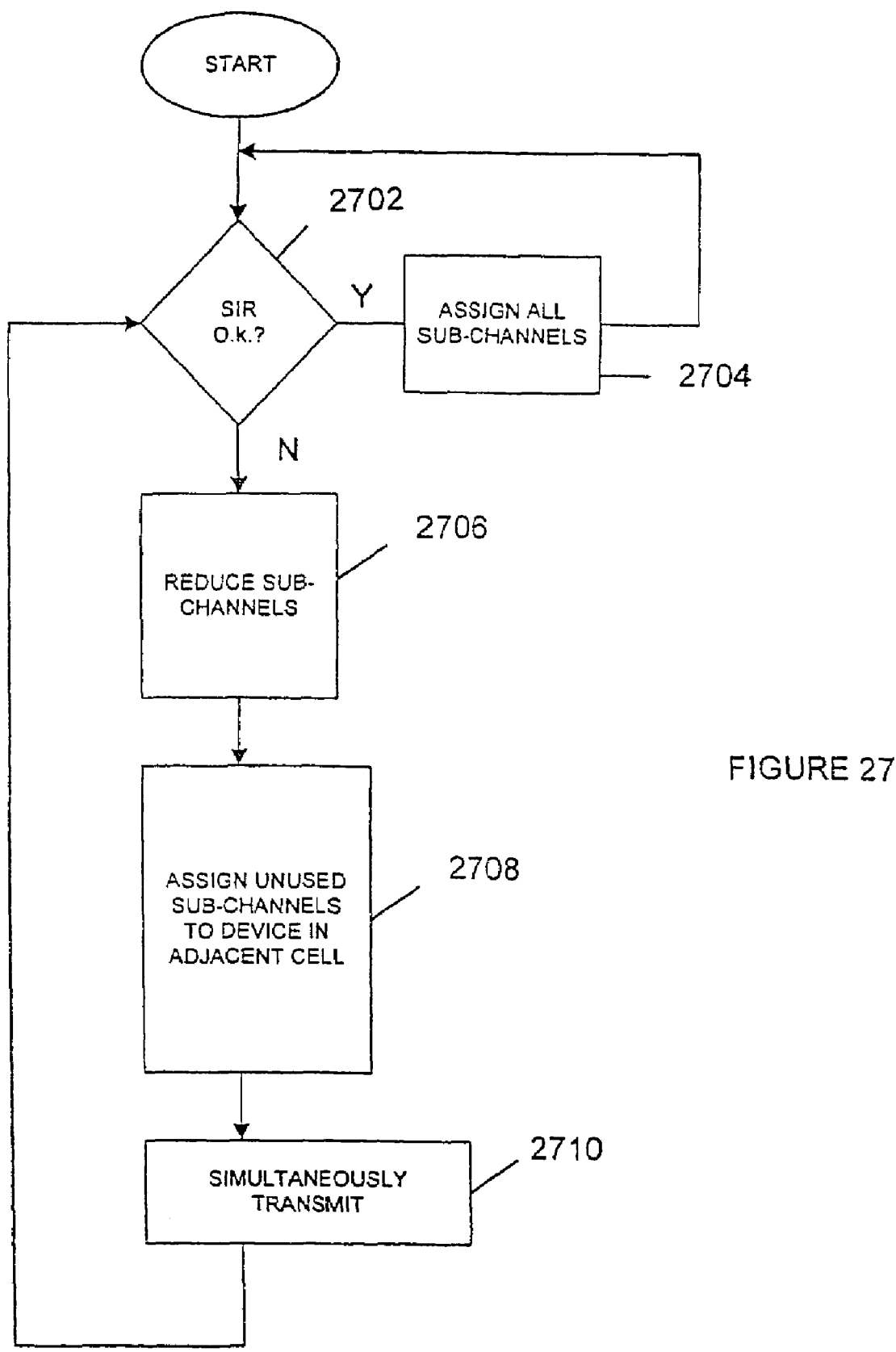
FIG. 27 is a flow chart illustrating an exemplary method for recovering bandwidth in a wireless communication network in accordance with the invention.

One method for recovering the unused bandwidth is illustrated in the flow chart of FIG. 27. First, in step 2702, base station 1114 receives SIR reports for different groups of sub-channels from device 1118 as described above. If the group SIR reports are good, then base station 1114 can assign all sub-channels to device 1118 in step 2704. If, however, some of the group SIR reports received in step 2702 are poor, then base station 1114 can reduce the number of sub-channels assigned to device 1118, e.g., by assigning only even sub-channels, in step 2706. At the same time, base station 1112 is preferably performing a complementary reduction in the sub-channels assigned to device 1116, e.g., by assigning only odd sub-channels.

At this point, each base station has unused bandwidth with respect to devices 1116 and 1118. To recover this bandwidth, base station 1114 can, in step 2708, assign the unused odd sub-channels to device 1116 in adjacent cell 1104. It should be noted that even though cells 1102, 1104, and 1106 are illustrated as geometrically shaped, non-overlapping coverage areas, the actual coverage areas do not resemble these shapes. The shapes are essentially fictions used to plan and describe a wireless communication system 1100. Therefore, base station 1114 can in fact communicate with device 1116, even though it is in adjacent cell 1104.

Once base station 1114 has assigned the odd sub-channels to device 1116. in step 2708, base station 1112 and 1114 communicate with device 1116 simultaneously over the odd sub-channels in step 2710. Preferably, base station 1112 also assigns the unused even sub-channels to device 1118 in order to recover the unused bandwidth in- cell 1104 as well.

In essence, spatial diversity is achieved by having both base station 1114 and 1112 communicate with device 1116 (and 1118) over the same sub-channels. Spatial diversity occurs when the same message is transmitted simultaneously over statistically independent communication paths to the same receiver. The independence of the two paths improves the overall immunity of the system to fading. This is because the two paths will experience different fading effects. Therefore, if the receiver cannot receive the signal over one path due to fading, then it will probably still be able to receive the signal over the other path, because the fading that effected the first path will not effect the second. As a result, spatial diversity improves overall system performance by improving the Bit Error Rate (BER) in the receiver, which effectively increases the deliverable data rate to the receiver, i.e., increase the bandwidth.

For effective spatial diversity, base stations 1112 and 1114 ideally transmit the same information at the same time over the same sub-channels. As mentioned above, each base station in system 1100 is configured to transmit simultaneously, i.e., system 1100 is a TDM system with synchronized base stations. Base stations 1112 and 1114 also assigned the same sub-channels to device 1116 in step 2708. Therefore, all that is left is to ensure that base stations 1112 and 1114 send the same information. Accordingly, the information communicated to device 1116 by base stations 1112 and 1114 is preferably coordinated so that the same information is transmitted at the same time. The mechanism for enabling this coordination is discussed more fully below. Such coordination, however, also allows encoding that can provide further performance enhancements within system 1100 and allow a greater percentage of the unused bandwidth to be recovered.

One example coordinated encoding scheme that can be implemented between base stations 1112 and 1114 with respect to communications with device 1116 is Space-Time-Coding (STC) diversity. STC Is illustrated by system 2800 in FIG. 28. In system 2800, transmitter 2802 transmits a message over channel 2808 to receiver 2806. Simultaneously, transmitter 2804 transmits a message over channel 2810 to receiver 2806. Because channels 2808 and 2810 are independent, system 2800 will have spatial diversity with respect to communications from transmitters 2802 and 2804 to receiver 2806. In addition, however, the data transmitted by each transmitter 2802 and 2804 can be encoded to also provide time diversity. The following equations illustrate the process of encoding and decoding data in a STC system, such as system 2800.

First, channel 2808 can be denoted $h_n$ and channel 2810 can be denoted $g_n$, where:

$$h_n = \alpha_h e^{j\theta_h} \text{ and} \quad (1)$$

$$g_n = \alpha_h e^{j\theta_g} \quad (2)$$

Figure 28:
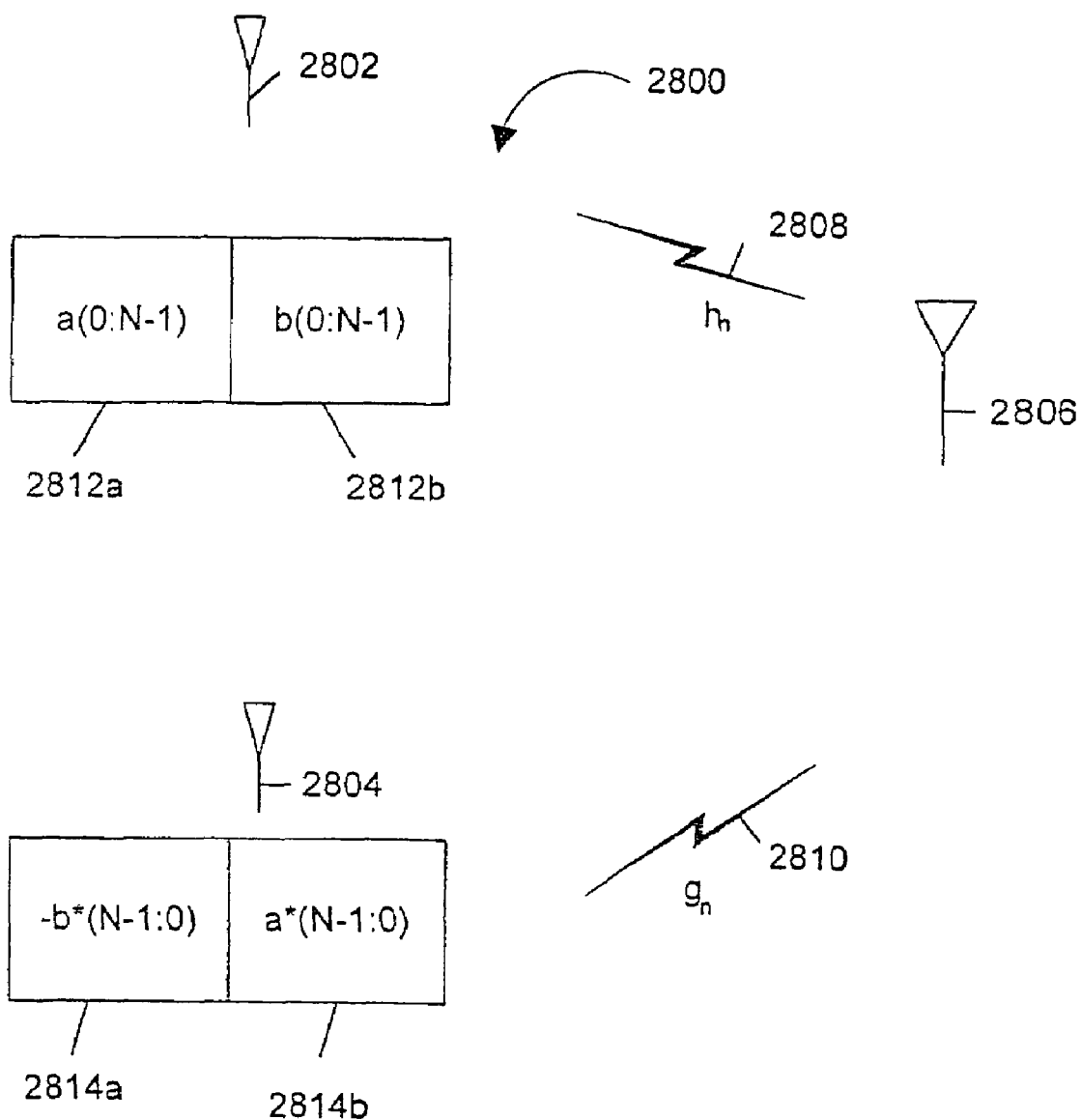
FIG. 28 is a diagram illustrating an exemplary wireless communication network in which the method of FIG. 27 can be implemented.

Second, we can look at two blocks of data 2812a and 2812b to be transmitted by transmitter 2802 as illustrated in FIG. 28. Block 2812a comprises N-symbols denoted as $a_0, a_1, a_2, \ldots, a_{N-1}$, or a(0:N−1). Block 2812b transmits N-symbols of data denoted b(0:N−1). Transmitter 2804 simultaneously transmits two block of data 2814a and 2814b. Block 2814a is the negative inverse conjugate of block 2812b and can therefore be described as −b*(N−1:0). Block 2814b is the inverse conjugate of block 2812a and can therefore be described as a*(N−1:0). It should be noted that each block of data in the forgoing description will preferably comprise a cyclical prefix as described above.

When blocks 2812a, 2812b, 2814a, and 2814b are received in receiver 2806, they are combined and decoded in the following manner: First, the blocks will be combined in the receiver to form the following blocks, after discarding the cyclical prefix:

$$\text{Block1} = a(0:N-1) \otimes h_n - b^*(N-1:0) \otimes g_n; \text{ and} \quad (3)$$

$$\text{Block2} = b(0:N-1) \otimes h_n + a^*(N-1:0) \otimes g_n \quad (4)$$

Where the symbol $\otimes$ represents a cyclic convolution.

Second, by taking an IFFT of the blocks, the blocks can be described as:

$$\text{Block1} = A_n {}_* H_n - B_n^* {}_* G_n; \text{ and} \quad (5)$$

$$\text{Block2} = B_n {}_* H_n - A_n^* {}_* G_n. \quad (6)$$

Where n=0 to N−1.

In equations (5) and (6) $H_n$ and $G_n$ will be known, or can be estimated. But to solve the two equations and determine $A_n$ and $B_n$, it is preferable to turn equations (5) and (6) into two equations with two unknowns. This can be achieved using estimated signals X, and Y, as follows:

$$X_n = A_n {}_* H_n - B_n^* {}_* G_n; \text{ and} \quad (7)$$

$$Y_n = B_n {}_* H_n + A_n^* {}_* G_n \quad (8)$$

To generate two equations and two unknowns, the conjugate of Y, can be used to generate the following two equations:

$$X_n = A_n {}_* H_n - B_n^* {}_* G_n; \text{ and} \quad (9)$$

$$Y_n^* = B_n^* {}_* H_n^* + A_n {}_* G_n^*. \quad (10)$$

Thus, the two unknowns are $A_n$ and $B_n^*$ and equations (9) and (10) define a matrix relationship in terms of these two unknowns as follows:

$$\begin{bmatrix} X_n \\ Y_n^* \end{bmatrix} = \begin{bmatrix} H_n & -G_n \\ G_n^* & H_n^* \end{bmatrix} * \begin{bmatrix} A_n \\ B_n^* \end{bmatrix} \quad (11)$$

$$\begin{bmatrix} A_n \\ B_n^* \end{bmatrix} = \frac{1}{|H_n|^2 + |G_n|^2} * \begin{bmatrix} H_n^* & G_n \\ -G_n^* & H_n \end{bmatrix} * \begin{bmatrix} X_n \\ Y_n^* \end{bmatrix} \quad (12)$$

Signals $A_n$ and $B_n$ can be determined using equation (12). It should be noted, that the process just described is not the only way to implement STC. Other methods can also be implemented in accordance with the systems and methods described herein. Importantly, however, by adding time diversity, such as described in the preceding equations, to the space diversity already achieved by using base stations 1112 and 1114 to communicate with device 1116 simultaneously, the BER can be reduced even further to recover even more bandwidth.

Figure 29:
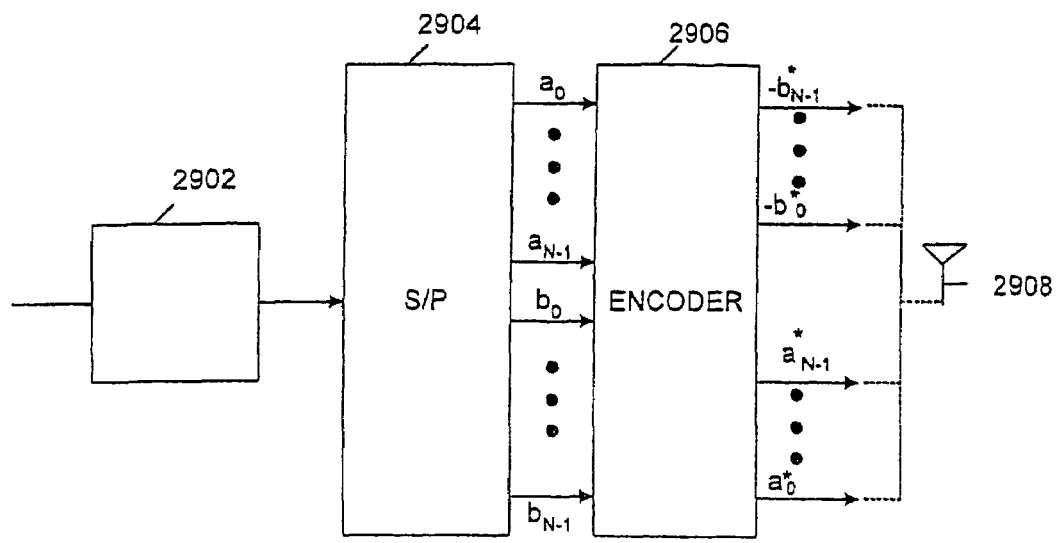
FIG. 29 is a logical block diagram illustrating an exemplary transmitter that can be used in the network of FIG. 28 to implement the method of FIG. 27.

An example transmitter 2900 configured to communicate using STC in accordance with the systems and methods described herein is illustrated in FIG. 29. Transmitter 2900 includes a block storage device 2902, a serial-to-parallel converter 2904, encoder 2906, and antenna 2908. Block storage device 2902 is included in transmitter 2900 because a 1 block delay is necessary to implement the coding illustrated in FIG. 28. This is because transmitter 2804 first transmits $-b_n^*$ (n=N−1 to 0). But $b_n$ is the second block, so if transmitter 2900 is going to transmit $-b_n^*$ first, it must store two blocks, e.g., $a_n$ and $b_n$, and then generate block 2814a and 2814b (see FIG. 28).

Serial-to-parallel converter 2904 generates parallel bit streams from the bits of blocks $a_n$ and $b_n$. Encoder 2906 then encodes the bit streams as required, e.g., encoder 2906 can generate $-b_n^*$ and $a_n^*$ (see blocks 2814a and 2814b in FIG. 28). The encoded blocks are then combined into a single transmit signal as described above and transmitted via antenna 2908.

Figure 30:
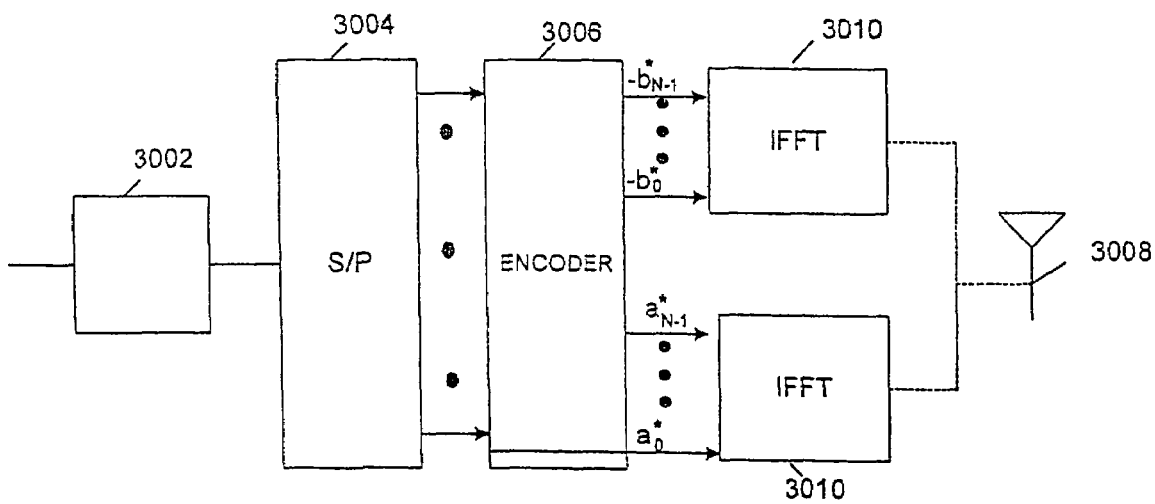
FIG. 30 is a logical block diagram illustrating another exemplary transmitter that can be used in the network of FIG. 28 to implement the method of FIG. 27.

Transmitter 2900 preferably uses TDM to transmit messages to receiver 2806. An alternative transmitter 3000 embodiment that uses FDM is illustrated in FIG. 30. Transmitter 3000 also includes block storage device 3002, a serial-to-parallel converter 3004, encoder 3006, and antenna 3008, which are configured to perform in the same manner as the corresponding components in transmitter 2900. But in addition, transmitter 3000 includes IFFTs 3010 to take the IFFT of the blocks generated by encoder 2906. Thus, transmitter 3000 transmits $-B_n^*$ and $A_n^*$ as opposed to $-b_n^*$ and $a_n^*$, which provides space, frequency, and time diversity.

Figure 31:
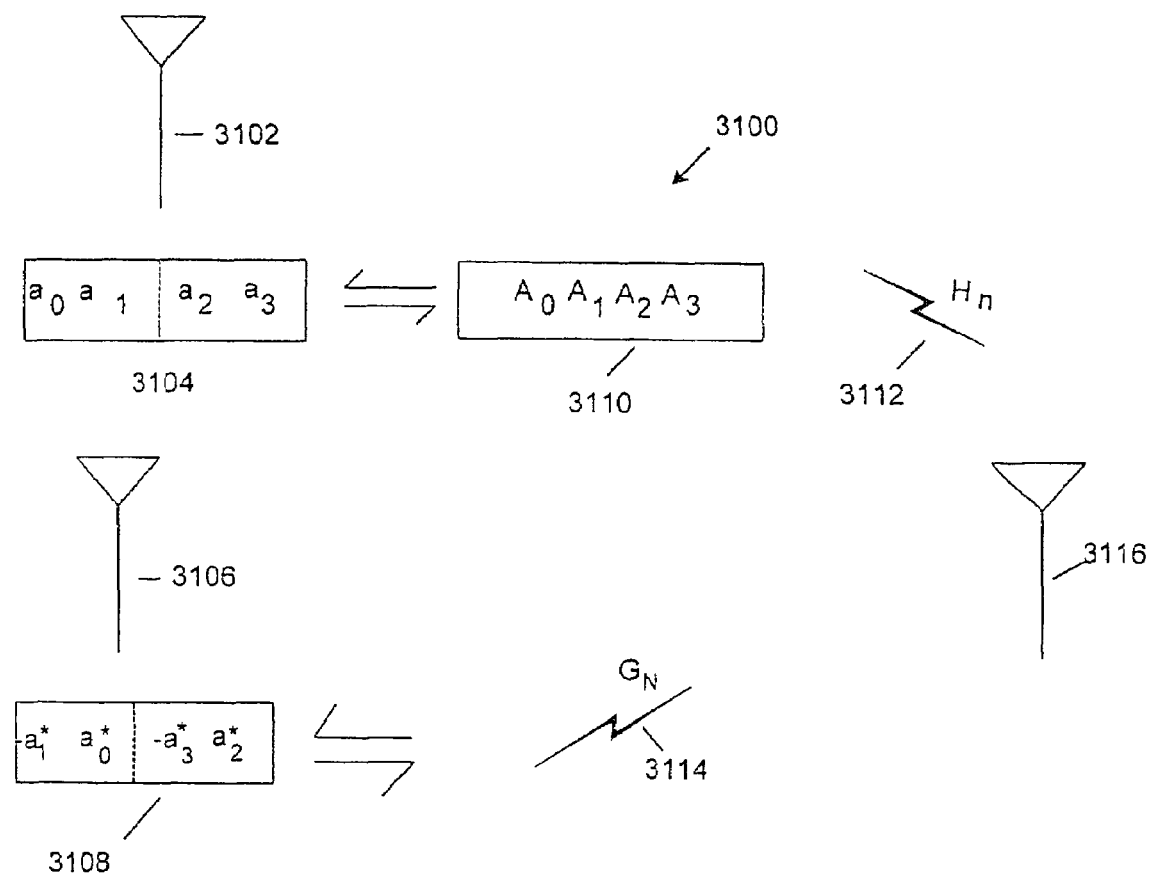
FIG. 31 is a diagram illustrating another exemplary wireless communication network in which the method of FIG. 27 can be implemented.

FIG. 31 illustrates an alternative system 3100 that also uses FDM but that eliminates the 1 block delay associated with transmitters 2900 and 3000. In system 3100, transmitter 3102 transmits over channel 3112 to receiver 3116. Transmitter 3106 transmits over channel 3114 to receiver 3116. As with transmitters 2802 and 2804, transmitters 3102 and 3106 implement an encoding scheme designed to recover bandwidth in system 3100. In system 3100, however, the coordinated encoding occurs at the symbol level instead of the block level.

Thus, for example, transmitter 3102 can transmit block 3104 comprising symbols $a_0, a_1, a_2$, and $a_3$. In which case, transmitter 3106 will transmit a block 3108 comprising symbols $-a_1^*, a_0^*, -a_3^*$, and $a_2^*$. As can be seen, this is the same encoding scheme used by transmitters 2802 and 2804, but implemented at the symbol level instead of the block level. As such, there is no need to delay one block before transmitting. An IFFT of each block 3104 and 3108 can then be taken and transmitted using FDM. An IFFT 3110 of block 3104 is shown in FIG. 31 for purposes of illustration.

Channels 3112 and 3114 can be described by $H_n$ and $G_n$, respectively. Thus, in receiver 3116 the following symbols will be formed:

$(A_{0*}H_0) - (A_1^* {}_* G_0)$
$(A_{1*}H_1) + (A_0^* {}_* G_1)$
$(A_{2*}H_2) - (A_3^* {}_* G_2)$
$(A_{3*}H_3) + (A_2^* {}_* G_3)$.

In time, each symbol $a_n$ (n=0 to 3) occupies a slightly different time location. In frequency, each symbol $A_n$ (n=0 to 3) occupies a slightly different frequency. Thus, each symbol An is transmitted over a slightly different channel, i.e., $H_n$ (n=0 to 3) or $G_n$ (n=0 to 3), which results in the combinations above.

As can be seen, the symbol combinations formed in the receiver are of the same form as equations (5) and (6) and, therefore, can be solved in the same manner, but without the one block delay.

In order to implement STC or Space Frequency Coding (SPC) diversity as described above, bases stations 1112 and 1114 must be able to coordinate encoding of the symbols that are simultaneously sent to a particular device, such as device 1116 or 1118. Fortunately, base stations 1112 and 1114 are preferably interfaced with a common network interface server. For example, in a LAN, base stations 1112 and 1114 (which would actually be service access points in the case of a LAN) are interfaced with a common network interface server that connects the LAN to a larger network such as a Public Switched Telephone Network (PSTN). Similarly, in a wireless WAN, base stations 1112 and 1114 are typically interfaced with a common base station control center or mobile switching center. Thus, coordination of the encoding can be enabled via the common connection with the network interface server. Bases station 1112 and 1114 can then be configured to share information through this common connection related to communications with devices at the edge of cells 1104 and 1106. The sharing of information, in turn, allows time or frequency diversity coding as described above.

It should be noted that other forms of diversity, such as polarization diversity or delay diversity, can also be combined with the spatial diversity in a communication system designed in accordance with the systems and methods described herein. The goal being to combine alternative forms of diversity with the spatial diversity in order to recover larger amounts of bandwidth. It should also be noted, that the systems and methods described can be applied regardless of he number of base stations, devices, and communication cells involved.

Briefly, delay diversity can preferably be achieved in accordance with the systems and methods described herein by cyclical shifting the transmitted blocks. For example, one transmitter can transmit a block comprising $A_0$, $A_1$, $A_2$, and $A_3$ in that order, while the other transmitter transmits the symbols in the following order $A_3$, $A_0$, $A_1$, and $A_2$. Therefore, it can be seen that the second transmitter transmits a cyclically shifted version of the block transmitted by the first transmitter. Further, the shifted block can be cyclically shifted by more then one symbol of required by a particular implementation.

9. Open Loop Architecture

In a wireless communication system, there is the fundamental problem of how to ensure that a receiver can detect and decode a signal transmitted to it from a transmitter in the system. The transmitted signal will have an associated timing, frequency and phase, all of which can be important to a receiver's ability to receive the signal. But a receiver often does not have any prior knowledge concerning these characteristics of the transmitted signal, other than a general knowledge of possible ranges. Many conventional wireless communication systems use coherent receiver architectures in order to retrieve that frequency, timing, and phase of received signals.

Figure 32:
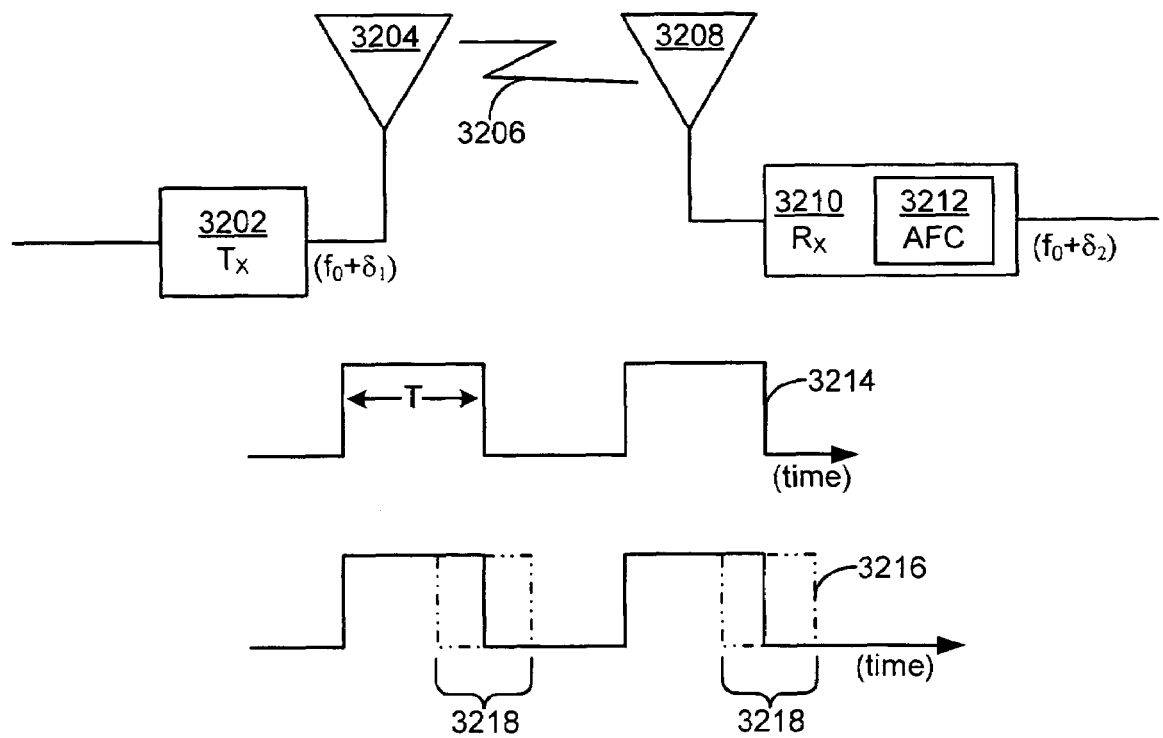
FIG. 32 is a diagram illustrating an example wireless communication system.

FIG. 32 illustrates a conventional coherent system 3200 comprising a transmitter 3202 configured to transmit a signal 3206 via an antenna 3204, and a receiver 3210 configured to receive signal 3206 via antenna 3208. In general, transmitter 3202 can be configured to transmit a signal with a center frequency of ($f_0$). But even if receiver 3210 is aware that transmitter 3202 is transmitting at ($f_0$) it may still not be able to effectively receive the signal. This is because there is drift in both the transmitter and receiver, do to fundamental limitations on the accuracy of various components and other losses or errors. Thus, as illustrated in FIG. 32, transmitter 3202 can actually be transmitting at ($f_0+\delta_1$), while receiver 3210 is actually receiving at ($f_0+\delta_2$). In this example, $\delta_1$ and $\delta_2$ represent the corresponding drift components. Accordingly, receiver 3210 will require some form of Automatic Frequency Correction (AFC) circuitry 3212 configured to ensure that $\delta_1$ and $\delta_2$ are equal, or sufficiently equal, to allow receiver 3210 to receive signal 3206 correctly. Often AFC is carried out in a digital portion of receiver 3210 and thus requires some form of a Digital to Analog Converter (DAC).

Figure 33:
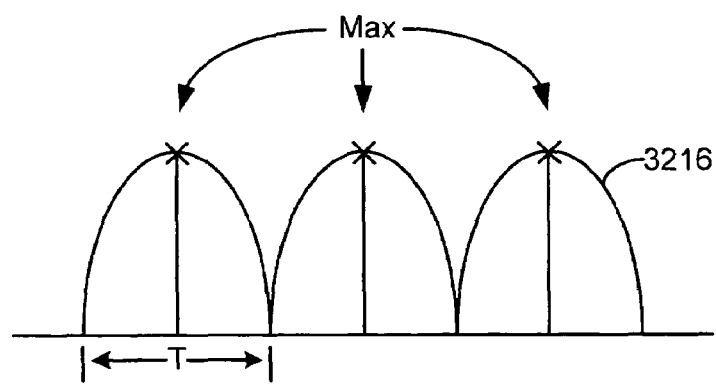
FIG. 33 is a diagram illustrating sampling of a signal received by a receive in the system of FIG. 32.

As illustrated by the waveforms in the bottom half of FIG. 32, if $\delta_1$ and $\delta_2$ are not equal, then pulses in received signal 3216, received by receiver 3210, can be shorter or longer than the corresponding pulse in transmit signal 3214, transmitted by transmitter 3202, as illustrated by the variable portion 3218 of signal 3216. As a result, receiver 3210 will eventually see an extra pulse or will miss one of the pulses in transmit signal 3214, causing errors in the decoding process, When the frequency is corrected and receiver 3210 is looking at the correct frequency for signal 3206, receiver 3210 is said to be locked to the correct frequency. Once receiver 3210 is locked, it can begin sampling the received signal to detect the data contained therein. But there can be still another issue: As illustrated in FIG. 33, it is important to sample each pulse, e.g., of received signal 3216, at or near the peak, or maximum, to ensure that there is enough energy to correctly decode the data contained therein. If a pulse is sampled to far from the maximum, then errors are more likely to occur. Thus, a conventional coherent system must take measures to determine the correct timing of receiver 3210 relative to transmitter 3202.

A final issue for a conventional coherent system is phase. A coherent receiver must also be capable of recovering the correct phase of transmit signal 3206.

A common method for obtaining the correct frequency, timing, and phase information is to use a closed loop architecture. In a closed loop architecture, transmitter 3202 transmits information concerning the correct frequency, timing and phase. Receiver 3210, makes some gross estimates of the correct frequency, timing, and/or phase sufficient enough to enable it to receive the more granular information from transmitter 3202, which it can then use for more finite adjustments.

Thus, transmitter 3202 can transmit frequency information that can be used, e.g., by AFC circuitry 3212, for frequency adjustment as well as timing and phase information that can be used, e.g., by Phase Lock Loop (PLL) circuitry (not shown) in receiver 3210 to recover the correct timing and phase. It can be preferable, however, to avoid the need for such recovery, and the requisite overhead that it requires. The alternative to a closed loop architecture is an open loop architecture in which receiver 3210 is capable of detecting and decoding signal 3206 without any assistance from transmitter 3202, One way to achieve this in accordance with the systems and methods described herein, is to insert preamble packets into the data being transmitted from transmitter 3202 to receiver 3210. First, however, it should be noted that the need for phase information can be eliminated by using a non-coherent receiver 3210.

Figure 34:
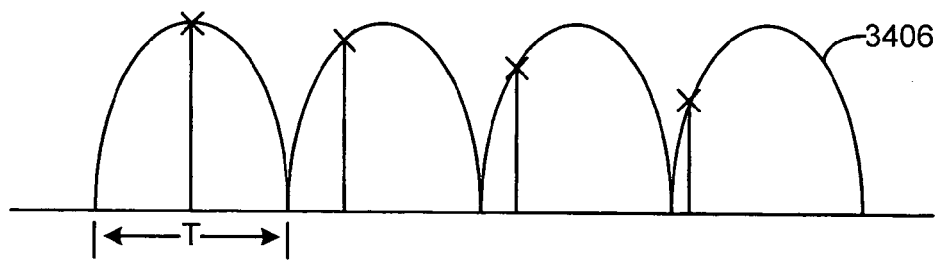
FIG. 34 is a diagram illustrating a frame structure that can be used to implement an open loop architecture in the system of FIG. 32 in accordance with one embodiment.
Figure 34:
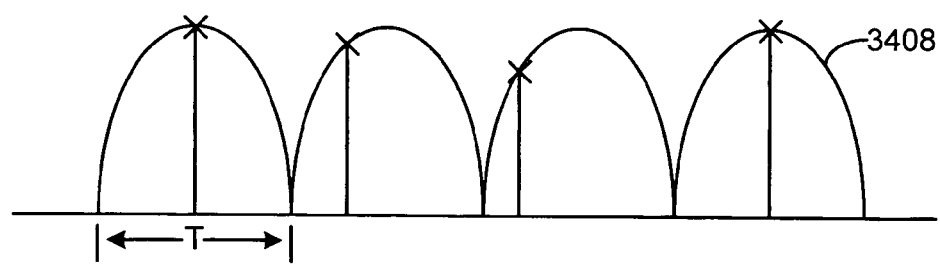

The frame structure illustrated in FIG. 34 can then be used to ensure that receiver 3210 has accurate enough frequency and timing information to allow it to detect and decode signal 3206. As can be seen, the data being transmitted by transmitter 3202 can be structured such that it comprises a SYNC packet 3402, followed by data packets 3404 interspersed with preamble packets 3406. SYNC packet 3402 can allow receiver 3210 to detect and lock onto signal 3206 as described above. Receiver 3210 can then begin sampling the received information to recover the data contained therein. But as illustrated by waveform 3406 in FIG. 34, without the correct timing and frequency information the samples will start to drift away from the maximum, leading to errors.

Preambles 3406, however, can act as re-synchronizing packets that allow receiver 3210 to maintain sampling at the maximum as illustrated by waveform 3408. As can be seen, after SYNC packet 3402, receiver 3210 is sampling at or near the maximum. But, as before, the samples begin to drift away from the maximum. The subsequent preamble re-synchronizes receiver 3210, however, so that it is again sampling at or near the maximum. If preambles 3206 are positioned close enough, then noticeable errors due to the drift that inherently occurs can be avoided. In other words, the length of packets 3404 can be designed such that the drift over one packet length is minimized, maintaining any resulting degradation within acceptable limits. For example, a packet length of T/5 or T/8 can be used to limit degradation.

Figure 35:
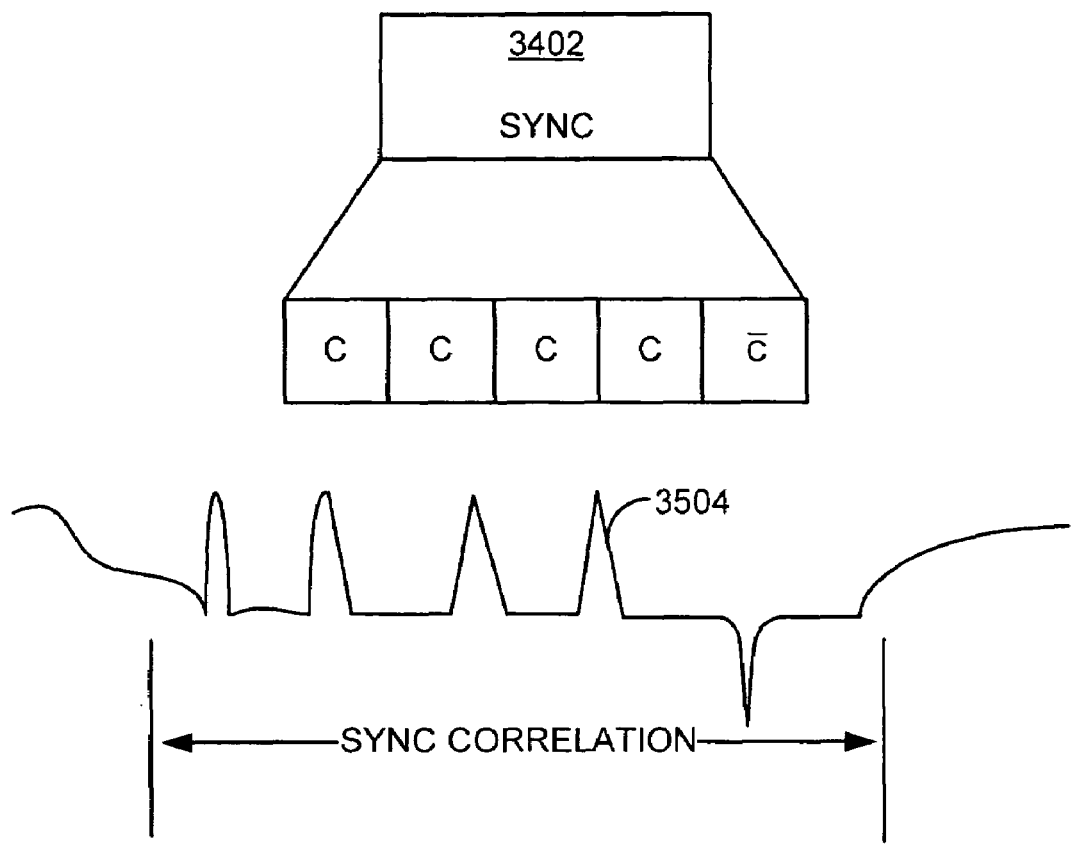
FIG. 35 is a diagram illustrating an example embodiment of SYNC packet that can comprise a portion of the frame structure of FIG. 34.

As described above SYNC packet 3402 can comprise a perfect sequence, or code, as can preambles 3406. In certain embodiments, SYNC packet 3402 can comprise the same perfect sequence as that used to generate preambles 3406. FIG. 35 illustrates one possible configuration for SYNC packet 3402. Here, the same perfect sequence, or code, (c) is repeated a number of times, e.g., 3, or 4, as illustrated in FIG. 35. These repeated codes can then be followed by an inverted version of code (c). Use of an inverted code can be helpful to ensure that the packet is following, once the receiver is locked. For example, as SYNC packet 3402 is correlated, it will result in the peaks illustrated by waveform 3504. Several copies of code (c) are used to ensure that receiver 3210 correlates SYNC packet 3402 and locks onto the correct frequency, because interference caused, e.g., by fading can prevent receiver 3210 from detecting one or more of the peaks. Thus, for example, if receiver 3210 only detected one or two of the peaks corresponding to code (c), receiver 3210 would have no way of knowing if another code (c) should follow or if data packet 3404 should be next. But, in an embodiment using a SYNC packet structure similar to that illustrated by SYNC packet 3402, once one or two peaks are detected, receiver 3210 can be configured to then start looking for an inverted peak corresponding to the inverse of code (c). Once this inverted peak is detected, then receiver 3210 will know that data packet 3404 is to follow.

Specific implementations of code (c) are described in more detail below.

Figure 36:
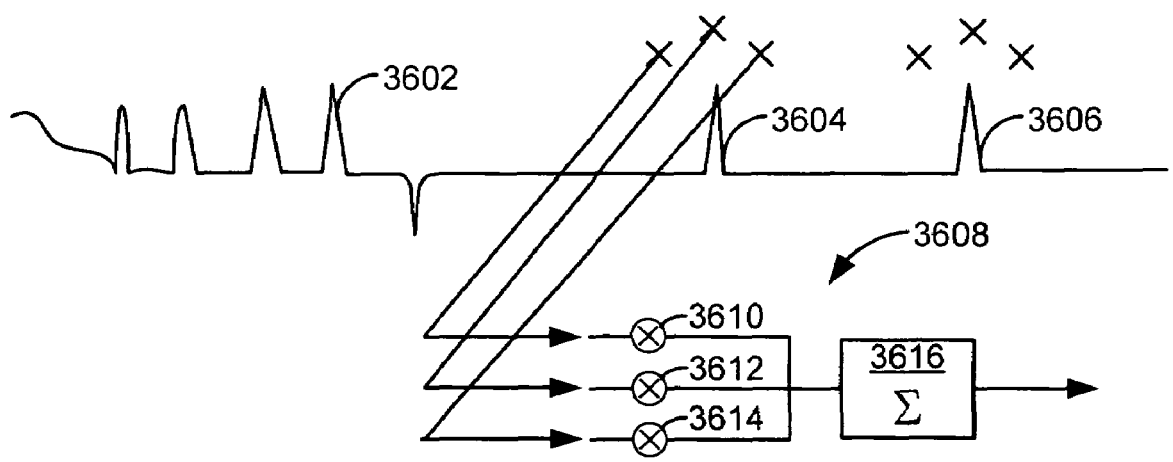
FIG. 36 is a diagram illustrating correlation of the frame illustrated in FIG. 34 by a receiver in the system of FIG. 32.

It should be noted that in a multipath environment, it can be beneficial to actually open up a correlation window in which receiver 3210 is configured to attempt to correlate each preamble at multiple discrete intervals, i.e., the correlator used by receiver 3210 can actually comprise several correlators 3610, 3612, and 3614, as illustrated in FIG. 36, the outputs of which are summed by a summer 3616. Thus, once SYNC packet 3402 is correlated, receiver 3210 should have an idea of the delay spread ($d_s$) involved, Receiver 3210 should also know approximately where to look for the peaks of preambles 3206, Thus, a window can be opened around each preamble peak 3604, 3606 so that useful multipaths can also be correlated. In one particular implementation, 3 correlators 3610, 3612, and 3614 can be used, and the window around each peak 3604 and 3606 can be set equal to $2*d_s$, which for an Ultra Wideband (UWB) application, for example, would be approximately 200 ns maximum.

Further, because receiver 3210 will know where to search for preamble peaks 3604 and 3606, full correlators are not necessarily required, saving further resources.

The systems and methods described in the previous paragraphs can also be used to allow devices configured for different air interface standards to operate in the same environment, without interfering with each other. For example, in UWB applications, there are several competing technologies that use different air interface and communication protocols, but that will conceivably be operating in the same physical areas and within the same frequency bands. The description below describes how interference between devices implementing these different technologies can be eliminated, and how the devices can even be allowed to communicate with the same Service Access Points (SAPs).

Figure 37:
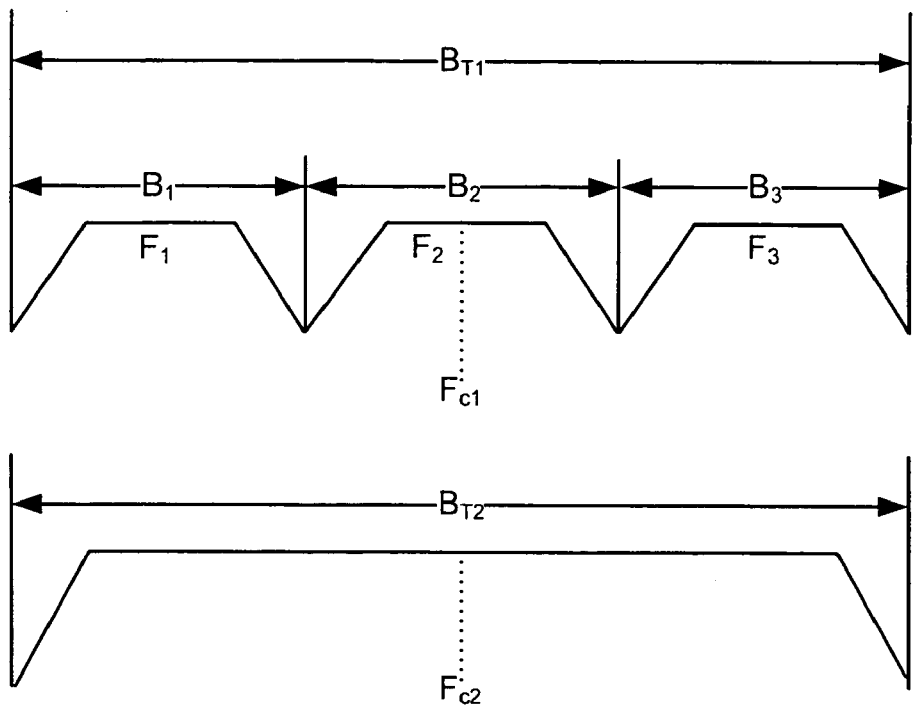
FIG. 37 is a diagram illustrating OFDM and CDMA communication protocols.

FIG. 37 illustrated two possible competing technologies, e.g., competing UWB technologies, that can be operating in the same environment, thus potentially interfering with each other. One technology can, for example, be implementing Orthogonal Frequency Division Multiplexing (OFDM) as illustrated in the upper half of FIG. 37. The other technology can be implementing CDMA. As can be seen, such an OFDM system can comprise three frequency bands, each with a bandwidth B1, B2, B3, respectively, which will normally be equal to each other, an overall bandwidth of ($B_{T1}$), and a center frequency of ($f_{c1}$). Such a CDMA signal can comprise an overall-bandwidth of ($B_{T2}$) and a center frequency of ($f_{c2}$). Depending on the various implementations, $B_{T1}$ can be unequal to $B_{T2}$, although as explained below the closer they are, the better performance can be. Further, $f_{c1}$ and $f_{c2}$ do not need to be equal, but often will be fairly close, since the technologies are being implemented in the same frequency band, which is what leads to potential interference.

Figure 38:
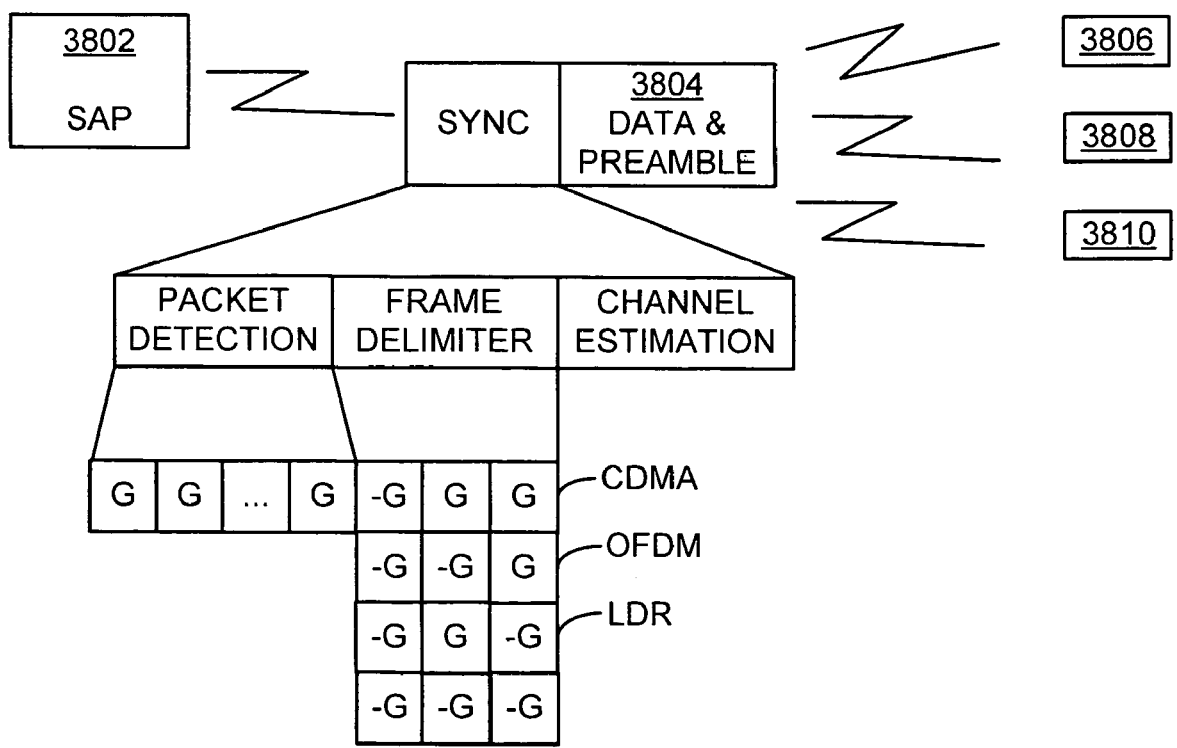
FIG. 38 is a diagram of a wireless communication system that can be configured to enable coexistence of a plurality of communication protocols, such as the OFDM and CDMA protocols illustrated in FIG. 37.

FIG. 38 illustrates a wireless communication environment 3800, such as a LAN environment, in which several communication protocols are operating in the same frequency band, e.g., protocols implementing the channel access techniques briefly described in FIG. 37. SAP 3802 is configured to communicate with a plurality of devices, of which devices 3806, 3808, and 3810 are shown for purpose of illustration. One or more of these devices 3806, 3808, and 3810 can be configured as OFDM devices, CDMA devices, and/or as a device configured to implement still another communication protocol.

In order for SAP 3802 to communicate with each of devices 3806, 3808, and 3810, there must be a way for devices 3806, 3808, and 3810 to determine if a given communication is intended for the particular device. In one embodiment, this is achieved using a frame structure such as, or similar to, the open loop frame structure described above, In other words, SAP 3802 can be configured to transmit a frame 3804 that includes a SYNC packet 3812 followed by data packets and known re-synchronizing information, such as the preambles described above.

Packet 3812 can be divided into sub-packets as illustrated in FIG. 38. SYNC packet 3812 can comprise packet detection information that can be used to detect frame 3804, as described above. It can also comprise frame delimiter information used to determine when frame detection has ended and data is to begin, as well as channel estimation information. Again as described above, frame detection information can comprise a series of codes (G) that can be used to lock onto a transmitted signal. Note that the identifier G is used to identify a particular type of code that is described in detail below. The packet detection information can, therefore, be used for automatic control determinations, diversity selection, e.g., antenna diversity selections, DC removal, energy detection, and packet detection as well as other functions and determinations depending on the implementation.

Frame delimiter information can comprise an inverted version of code (G) as described above. In addition, however, frame delimiter information can also be used for protocol detection. For example, as illustrated in FIG. 38, frame delimiter information can comprise several fields each including code (G) or the inverse of code (G). Of course, the first field in this example is always the inverse of code (G). But the subsequent fields can be used to indicate which protocol frame 3804 is using. For example, three field scan be used to specify up to four different protocols, e.g., including CDMA, OFDM, and other protocols such as a Low Data Rate (LDR) protocol for UWB implementations.

It should also be noted that significant overhead and resource savings can be achieved if the same code is used through out the various sub-packets comprising SYNC packet 3812. This is because the same circuitry can then be used to decode each sub-packet and perform the corresponding functions, i.e., the same circuitry and/or logic functionality can be used for packet detection, frame delimiting, protocol identification, channel estimation, etc. Similarly, the same code can be used for the preambles used to re-synchronize the receiver as described above, further consolidating the required circuitry.

Certain other advantages, and resource savings, can be obtained through the use of certain types of codes. For example, if a random code of length N is used, it is well known that a receiver receiving the code requires N-1 adders and associated registers, or memory, which can be very resource intensive. Recognizing this problem, hierarchical codes have been developed to significantly reduce the number of adders and registers required. An even further reduction in resources can be achieved by using Golay (G) codes. A Golay code is characterized by a set of delays. If, for example, a code of length N=128 is used, the Golay code equivalent will require 7 weights and 7 delays and can be implemented using only 13 adders.

Code (G) can, depending on the embodiment, be a Golay code or a hierarchical Golay code. A hierarchical Golay code is any code that is spread by a Golay code. For example if a Golay code G64 of length 64 is used and another code A of length 4 for example A=[1 −1 1 −1] is also used, then a hierarchical Golay code (G) can be formed as follows: G=[G64 −G64 G64 −G64].

Different SAPs, or Piconets, can then use different Golay codes (G) as follows:

Option1: Each SAP uses a different Golay Code of length 128

Option 2: Each SAP uses a different Hierarchical Code of length 128 as follows:
SAP1 uses G=[+G64 +G64 +G64 +G64];
SAP2 uses G=[+G64 −G64 +G64 −G64];
SAP3 uses G=[+G64 +G64 −G64 −G64]; and
SAP4 uses G=[+G64 −G64 −G64 +G64].

Option 2 can be preferred since the codes of different SAP s are completely orthogonal and generated from the same code G64, which allows the same circuitry can be used to lock to all SAPs.

Thus, by selecting an advantageous code and using that code through out frame 3804, significant resource savings can be achieved.

Bandwidth synchronization is also required in order for devices 3806, 3808, and 3810 to be able to receive frame 3804. In one embodiment, each device can begin using the same bandwidth. For example, assuming that $B_{T2}$ is greater than or equal to $B_{T1}$, and recalling that the center frequency should be the same or nearly the same, then $B_{T1}$ can originally be used by all devices. It should be noted that $B_{T1}$ and $B_{T2}$ do not need to be equal, but the closer they are, the better performance can be.

Figure 39:
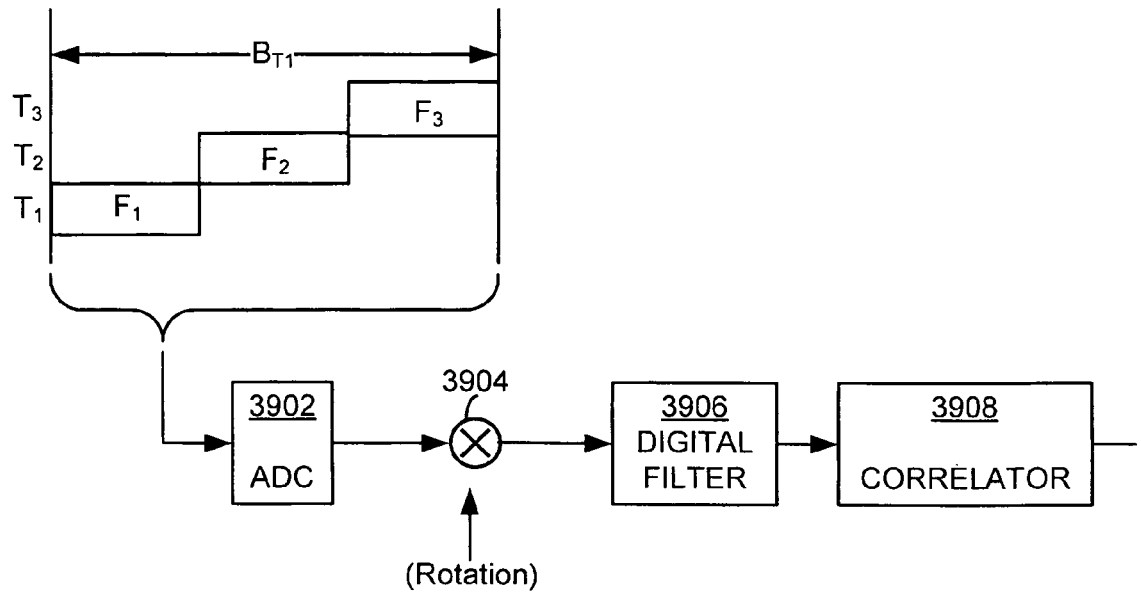
FIG. 39 is a diagram of a receiver configured to receive a frame used to achieve coexistence in the system of FIG. 38.

Thus, as illustrated in FIG. 39, SYNC packet 3812 can be transmitted using $B_{T1}$. If the frequency associated with the frequency bands comprising an OFDM system are F1, F2, and F3 respectively, then, as illustrated in FIG. 39, at time T1, the transmitter can transmit at frequency F1, at time T2 the transmitter can transmit at frequency F2, and at time T3 the transmitter can transmit at frequency F3. An OFDM device, of course, will have no trouble receiving a SYNC packet 3812 transmit in this manner. Other types of devices, however, will need to compensate for the frequency hoping inherent in an OFDM system.

For example, a CDMA device can sample the received signal, convert the samples to a digital signal using an Analog to Digital Converter (ADC) (3902), and then apply some rotation during down conversion, e.g., using down converter 3904. The resulting signal can then be filtered and passed through a correlator, such as a Golay correlator 3908. The portion of the packet residing at F2 should not need any rotation, since both an OFDM device and a CDMA device operating in system 3800 should be using the same, or nearly the same center frequency; however, the portions of the packet at F1 and F3 will need to be rotated in order for, e.g., a CDMA device, to receive the packet correctly.

In the example embodiment described, the chipping rate for a CDMA device should be 3 times the bandwidth or: 3*B, where B=B1=B2=B3. Therefore, while an OFDM receiver will sample the SYNC packet at a rate equal to the bandwidth B, a CDMA receiver will sample at 3*B.

If SAP 3802 is a OFDM device, then transmitting SYNC packet 3812 as described will not be a problem. But if it is, e.g., a CDMA device, then again some adjustment, e.g., rotation, of the transmit signal will be required. Again, the portion of the signal at F2 should be fine, but the portions at F1 and F3 should be, e.g., rotated. Further, because rotation means that the data will no longer comprise simple 1 s, and −1 s, it will be understood that a DAC will be required to convert the signal to an analog signal after rotation.

An alternative approach is to simply use F2 for SYNC packet 3812. This eliminates the need for rotation, and any required DACs or ADCs.

Figure 40:
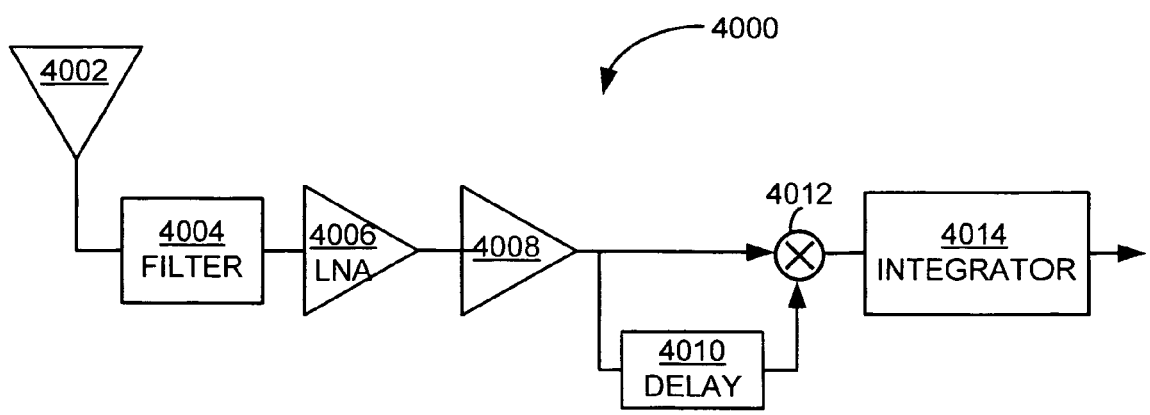
FIG. 40 is a diagram of another receiver configured to receive a frame used to achieve coexistence in the system of FIG. 38.

Further, in a UWB system, an LDR device can also be configured to receive SYNC packet 3812. Here, however, reception and any adjustments can be done in analog circuitry, using a non-coherent architecture, in order to keep costs down. Such circuitry is illustrated by the example receiver 4000 of FIG. 40. In receiver 4000, antenna 4002 couples received signals to a filter 4004, which then passes the signal to an LNA stage 4006. LNA stage 4006 can then pass the signal onto a subsequent amplification stage 4008. The output of amplification stage 4008 can then be sent to delay 4010 and combiner 4012, which can be configured to multiply the output of amplification stage 4008 with the output of delay 4010. The output of combiner 4012 can then be integrated over the requisite time period by integrator 4014.

The integration in the analog domain performed by integrator 4014 allows receiver 4000 to use a sample rate of: [(B*3)/N], where N is the code length.

Thus, the approach described can be used with either a coherent or non-coherent receiver, which provides added flexibility and capability.

10. Position Location

Figure 41:
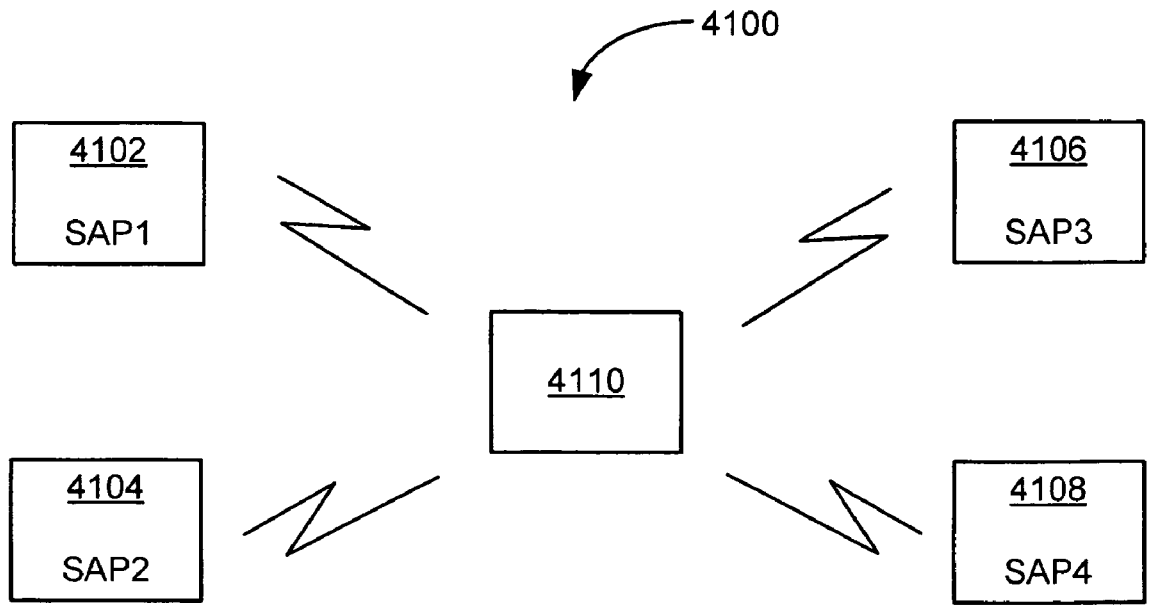
FIG. 41 is a diagram of a wireless communication system configured to enable position location in accordance with one embodiment.
Figure 41:
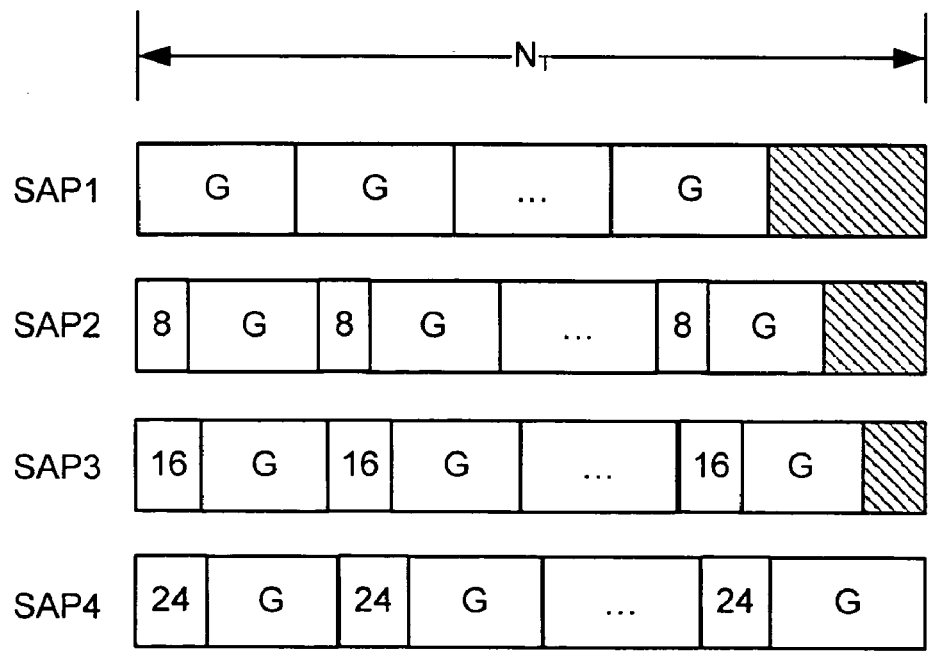

Position location can also be achieved using the systems and methods described herein. For example, in a UWB system, a device 4110 can be in proximity to four SAPs 4102-4108 as illustrated in FIG. 41. Each SAP can be implementing a SYNC packet as described above. In order to provide position location capability, SAP 4102 can be configured to use a code, such as a Golay code (G), of a certain length N, e.g., N=128. SAP 4104 can also use the same Golay code, but with an additional, e.g., 8 bits appended to the front. The additional bits can, for example, be copied from the last eight bits of the Golay code. SAP 4106 can then append 16 bits and SAP 4108 can append 24 bits as illustrated in FIG. 41. The overall length $N_T$ can be maintained equal, by coping codes or bits onto the end of each packet as required.

Figure 42:
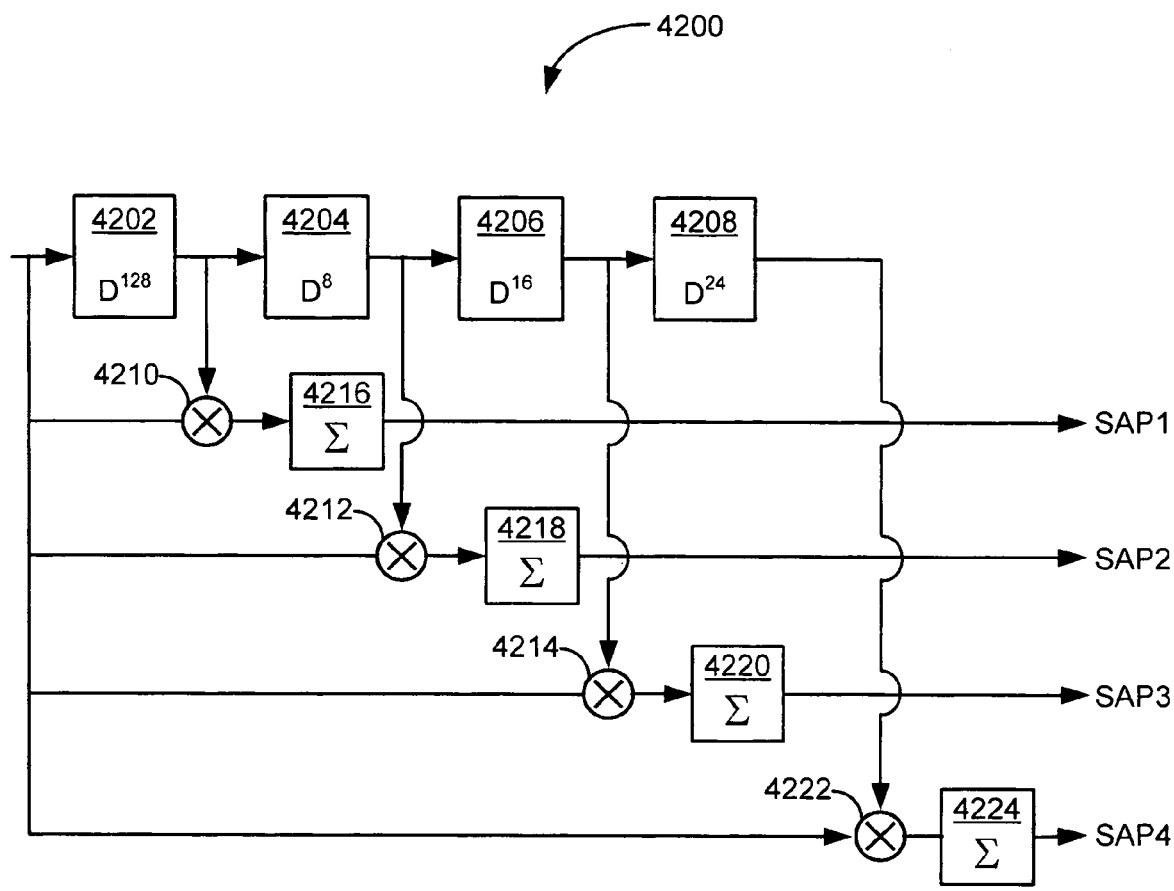
FIG. 42 is a diagram illustrating example receive circuitry configured to provide the position location within the system of FIG. 41 in accordance with one embodiment.

With a little additional circuitry, such as that illustrated in FIG. 42, device 4110 can lock onto all four SAPs 4102-4108 simultaneously. This allows device 4110 to not only determine which SAP has the strongest signal, but because device 4110 will know the relative timing of the signals received from each SAP, it can determine its location relative to each SAP. The position of device 4110 can then be determined using this relative location information. FIG. 42 is a diagram illustrating example receiver circuitry 4200 that can be used to lock onto a plurality of SAPS in accordance with one embodiment of the systems and methods described herein.

Figure 43:
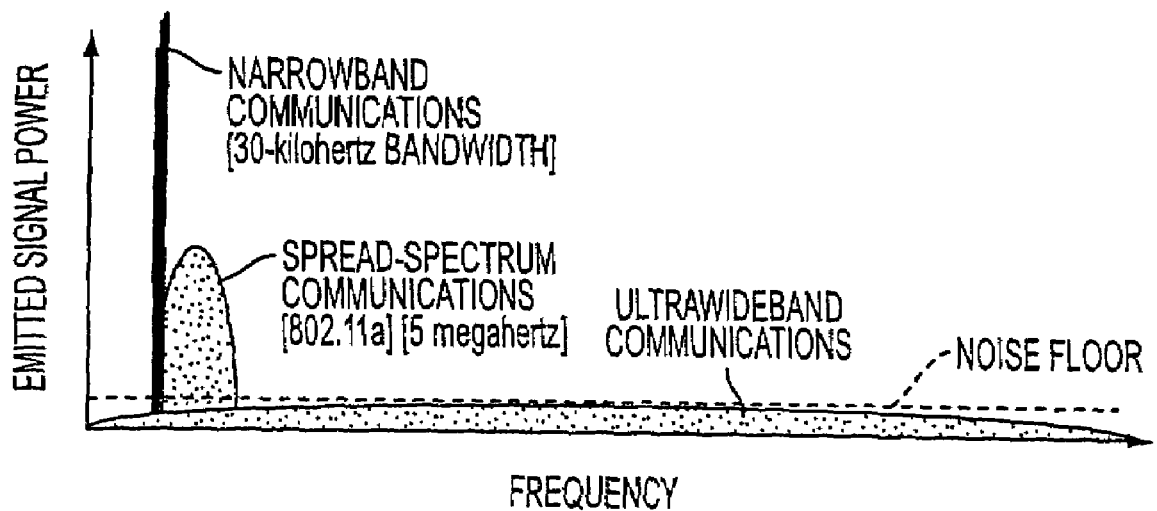
FIG. 43 is an illustration of different communication methods.
Figure 44:
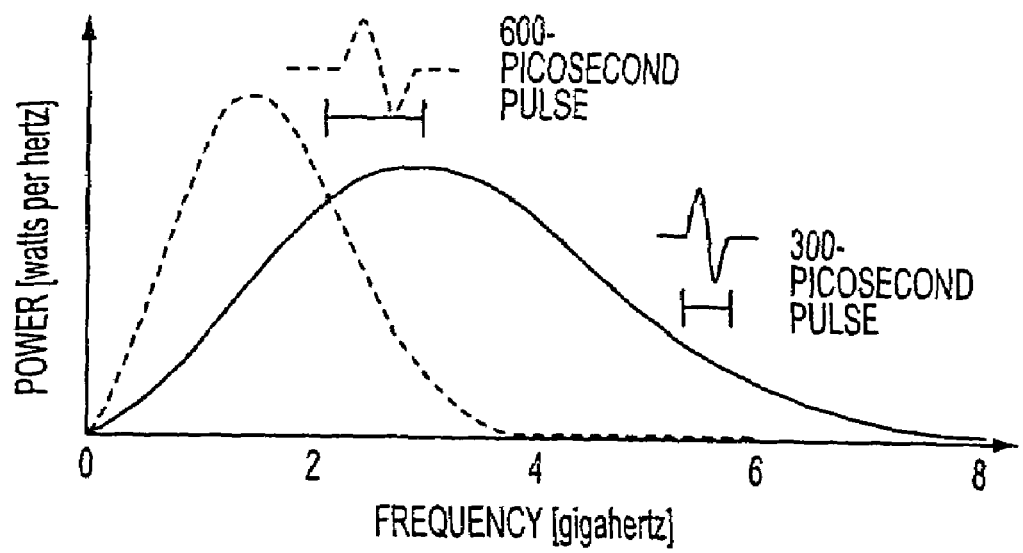
FIG. 44 is an illustration of two ultra-wideband pulses.

With reference to FIGS. 43 and 44, additional embodiments of the present invention will now be described. The embodiments described below employ ultra-wideband communication technology. Referring to FIGS. 43 and 44, ultra-wideband (UWB) communication technology employs discrete pulses of electromagnetic energy that are emitted at, for example, nanosecond or picosecond intervals (generally tens of picoseconds to hundreds of nanoseconds in duration). For this reason, ultra-wideband is often called "impulse radio." That is, the UWB pulses may be transmitted without modulation onto a sine wave, or a sinusoidal carrier, in contrast with conventional carrier wave communication technology. Thus, UWB generally requires neither an assigned frequency nor a power amplifier.

Another example of sinusoidal carrier wave communication technology is illustrated in FIG. 43. IEEE 802.11a is a wireless local area network (LAN) protocol, which transmits a sinusoidal radio frequency signal at a 5 GHz center frequency, with a radio frequency spread of about 5 MHz. As defined herein, a carrier wave is an electromagnetic wave of a specified frequency and amplitude that is emitted by a radio transmitter in order to carry information. The 802.11 protocol is an example of a carrier wave communication technology. The carrier wave comprises a substantially continuous sinusoidal waveform having a specific narrow radio frequency (5 MHz) that has a duration that may range from seconds to minutes.

In contrast, an ultra-wideband (UWB) pulse may have a 2.0 GHz center frequency, with a frequency spread of approximately 4 GHz, as shown in FIG. 44, which illustrates two typical UWB pulses. FIG. 44 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 43. In addition, either of the pulses shown in FIG. 44 may be frequency shifted, for example, by using heterodyning, to have essentially the same bandwidth but centered at any desired frequency. And because UWB pulses are spread across an extremely wide frequency range, UWB communication systems allow communications at very high data rates, such as 100 megabits per second or greater.

Also, because the UWB pulses are spread across an extremely wide frequency range, the power sampled in, for example, a one megahertz bandwidth, is very low. For example, UWB pulses of one nano-second duration and one milliwatt average power (0 dBm) spreads the power over the entire one gigahertz frequency band occupied by the pulse. The resulting power density is thus 1 milliwatt divided by the 1,000 MHz pulse bandwidth, or 0.001 milliwatt per megahertz (−30 dBm/MHz).

Generally, in the case of wireless communications, a multiplicity of UWB pulses may be transmitted at relatively low power density (milliwatts per megahertz). However, an alternative UWB communication system may transmit at a higher power density. For example, UWB pulses may be transmitted between 30 dBm to −50 dBm.

Several different methods of ultra-wideband (UWB) communications have been proposed. For wireless UWB communications in the United States, all of these methods must meet the constraints recently established by the Federal Communications Commission (FCC) in their Report and Order issued Apr. 22, 2002 (ET Docket 98-153). Currently, the FCC is allowing limited UWB communications, but as UWB systems are deployed, and additional experience with this new technology is gained, the FCC may expand the use of UWB communication technology. It will be appreciated that the present invention may be applied to current forms of UWB communications, as well as to future variations and/or varieties of UWB communication technology.

For example, the April 22 Report and Order requires that UWB pulses, or signals occupy greater than 20% fractional bandwidth or 500 megahertz, whichever is smaller. Fractional bandwidth is defined as 2 times the difference between the high and low 10 dB cutoff frequencies divided by the sum of the high and low 10 dB cutoff frequencies. However, these requirements for wireless UWB communications in the United States may change in the future.

Communication standards committees associated with the International Institute of Electrical and Electronics Engineers (IEEE) are considering a number of ultra-wideband (UWB) wireless communication methods that meet the current constraints established by the FCC. One UWB communication method may transmit UWB pulses that occupy 500 MHz bands within the 7.5 GHz FCC allocation (from 3.1 GHz to 10.6 GHz). In one embodiment of this communication method, UWB pulses have about a 2-nanosecond duration, which corresponds to about a 500 MHz bandwidth. The center frequency of the UWB pulses can be varied to place them wherever desired within the 7.5 GHz allocation. In another embodiment of this communication method, an Inverse Fast Fourier Transform (IFFT) is performed on parallel data to produce 122 carriers, each approximately 4.125 MHz wide. In this embodiment, also known as Orthogonal Frequency Division Multiplexing (OFDM), the resultant UWB pulse, or signal is approximately 506 MHz wide, and has a 242 nanosecond duration. It meets the FCC rules for UWB communications because it is an aggregation of many relatively narrow band carriers rather than because of the duration of each pulse.

Another UWB communication method being evaluated by the IEEE standards committees comprises transmitting discrete UWB pulses that occupy greater than 500 MHz of frequency spectrum. For example, in one embodiment of this communication method, UWB pulse durations may vary from 2 nanoseconds, which occupies about 500 MHz, to about 133 picoseconds, which occupies about 7.5 GHz of bandwidth. That is, a single UWB pulse may occupy substantially all of the entire allocation for communications (from 3.1 GHz to 10.6 GHz).

Yet another UWB communication method being evaluated by the IEEE standards committees comprises transmitting a sequence of pulses that may be approximately 0.7 nanoseconds or less in duration, and at a chipping rate of approximately 1.4 giga pulses per second. The pulses are modulated using a Direct-Sequence modulation technique, and is called DS-UWB. Operation in two bands is contemplated, with one band is centered near 4 GHz with a 1.4 GHz wide signal, while the second band is centered near 8 GHz, with a 2.8 GHz wide UWB signal. Operation may occur at either or both of the UWB bands. Data rates between about 28 Megabits/second to as much as 1,320 Megabits/second are contemplated.

Thus, described above are three different methods of wireless ultra-wideband (UWB) communication. It will be appreciated that the present invention may be employed using any one of the above-described methods, variants of the above methods, or other UWB communication methods yet to be developed.

Certain features of the present invention may be employed in an ultra-wideband (UWB) communication system. For example, one embodiment of an UWB communication system employs a communication frame that includes a synchronization section, and at least two data sections and at least two preamble sections. An ultra-wideband receiver synchronizes with the ultra-wideband transmitter using the synchronization section, and may also re-synchronize with the transmitter using at least one preamble section. In another embodiment, the length of the data sections are selected to ensure that drift between the ultra-wideband receiver and transmitter will be minimal before re-synchronization.

The UWB devices, systems and/or methods in the above-described embodiments communicate with each other by transmitting and receiving a plurality of discrete electromagnetic pulses, as opposed to a substantially continuous carrier wave. Each pulse may have a duration that can range between about 10 picoseconds to about 1 microsecond, and a power that may range between about +30 dBm to about −60 dBm, as measured at a single frequency.

The present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may use wires or they may be wireless. A network as defined herein can interconnect with other networks and contain sub-networks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology used by the network, such as, for example, a Transmission Control Protocol/Internet Protocol (TCP/IP) network, a Systems Network Architecture network, among others. A network as defined herein can also be characterized by whether it carries voice, data, or both kinds of signals. A network as defined herein may also be characterized by users of the network, such as, for example, users of a public switched telephone network (PSTN) or other type of public network, and private networks (such as within a single room or home), among others. A network as defined herein can also be characterized by the usual nature of its connections, for example, a dial-up network, a switched network, a dedicated network, and a non-switched network, among others. A network as defined herein can also be characterized by the types of physical links that it employs, for example, optical fiber, coaxial cable, a mix of both, unshielded twisted pair, and shielded twisted pair, among others.

The present invention may be employed in any type of wireless network, such as a wireless PAN, LAN, MAN, or WAN. In addition, the present invention may be employed in wire media, as the present invention dramatically increases the bandwidth of conventional networks that employ wire media, such as hybrid fiber-coax cable networks, or CATV networks, yet it can be inexpensively deployed without extensive modification to the existing wire media network.

Thus, it is seen that systems and methods of ultra-wideband communications are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. An ultra-wideband communication method, the method comprising the steps of:
    generating a communication frame comprising a synchronization section, and at least two data sections and at least two preamble sections;
    transmitting the communication frame;
    synchronizing a receiver with a transmitter using at least the synchronization section; and
    re-synchronizing the receiver with the transmitter using at least one preamble section;
    where the synchronization section and the preamble section both include a code, with the synchronization section comprising multiple copies of the code, followed by an inverse of the code.

2. The method of claim 1, wherein the data contained in the communication frame is intended for one user.

3. The method of claim 1, wherein the synchronization and preamble sections comprise the same code.

4. The method of claim 3, wherein the code is a perfect sequence.

5. The method of claim 1, wherein the code is selected from a group consisting of: hierarchical codes, Golay codes, orthogonal Golay codes, m-sequence codes, Kasami codes, and Walsh codes.

6. The method of claim 1, wherein a length of each of the data sections is ⅕ of a length of the communication frame.

7. The method of claim 1, wherein a length of each of the data sections is ⅛th of a length of the communication frame.

8. The method of claim 1, wherein the communication frame comprises a plurality of time bins, with each time bin capable of receiving an ultra-wideband pulse.

9. The method of claim 1, wherein the communication frame comprises a plurality of time bins, with each time bin capable of receiving an ultra-wideband pulse, wherein the ultra-wideband pulse may range in duration from about 10 picoseconds to about one microsecond.

10. The method of claim 1, wherein the step of transmitting the communication frame comprises transmitting a plurality of electromagnetic pulses, with each pulse occupying at least 500 megahertz of a radio frequency spectrum.

11. A method of minimizing drift between an ultra-wideband transmitter and an ultra-wideband receiver, the method comprising the steps of:
generating a communication frame comprising a synchronization section, and at least two data sections and at least two preamble sections;
transmitting the communication frame;
synchronizing the ultra-wideband receiver with the ultra-wideband transmitter using at least the synchronization section; and
re-synchronizing the ultra-wideband receiver with the ultra-wideband transmitter using at least one preamble section;
where the synchronization section and the preamble section both include a code, and wherein the synchronization section comprises multiple copies of the code followed by an inverse of the code.

12. The method of claim 11, wherein a length of each of the data sections is selected so that drift between the ultra-wideband transmitter and the ultra-wideband receiver will be minimal before re-synchronization.

13. The method of claim 11, further comprising the step of:
correlating the synchronization section to obtain a peak information that is used by the ultra-wideband receiver to synchronize with the ultra-wideband transmitter.

14. The method of claim 11, further comprising the step of:
correlating at least one preamble section to obtain a peak information that is used by the ultra-wideband receiver to re-synchronize with the ultra-wideband transmitter.

15. The method of claim 11, wherein the data contained in the communication frame is intended for one user.

16. The method of claim 11, wherein the synchronization section comprises multiple copies of the code.

17. The method of claim 11, wherein the code is selected from a group consisting of: hierarchical codes, Golay codes, orthogonal Golay codes, m-sequence codes, Kasami codes, and Walsh codes.

18. The method of claim 11, wherein a length of each of the data sections is ⅕ of a length of the communication frame.

19. The method of claim 11, wherein a length of each of the data sections is ⅛th of a length of the communication frame.

20. The method of claim 11, wherein the communication frame comprises a plurality of time bins, with each time bin capable of receiving an ultra-wideband pulse.

21. The method of claim 11, wherein the communication frame comprises a plurality of time bins, with each time bin capable of receiving an ultra-wideband pulse, wherein the ultra-wideband pulse may range in duration from about 10 picoseconds to about one microsecond.

22. The method of claim 11, wherein the step of transmitting the communication frame comprises transmitting a plurality of electromagnetic pulses, with each pulse occupying at least 500 megahertz of a radio frequency spectrum.

23. An ultra-wideband communication system, comprising:
a communication frame comprising a synchronization section, and at least two data sections and at least two preamble sections;
an ultra-wideband transmitter structured to transmit the communication frame; and an ultra-wideband receiver structured to receive the communication frame and to synchronize with the transmitter using at least the synchronization section and re-synchronize with the transmitter using at least one preamble section;
where the synchronization section and the preamble section both include a code, and wherein the synchronization section comprises multiple copies of the code followed by an inverse of the code.

24. The ultra-wideband communication system of claim 23, wherein a length of each of the data sections is chosen to ensure that a drift in the receiver will be minimized before re-synchronization.

25. The ultra-wideband communication system of claim 23, further comprising a correlator configured to correlate the synchronization section and provide peak information that is used by the ultra-wideband receiver to synchronize with the ultra-wideband transmitter.

26. The ultra-wideband communication system of claim 23, further comprising a correlator configured to correlate at least one preamble section and provide peak information that can be used by the ultra-wideband receiver to re-synchronize with the ultra-wideband transmitter.

27. The ultra-wideband communication system of claim 23, further comprising a plurality of correlators each configured to correlate the synchronization section and provide peak information that is used by the ultra-wideband receiver to synchronize with the ultra-wideband transmitter.

28. The ultra-wideband communication system of claim 27, further comprising a combiner communicating with the plurality of correlators, the combiner configured to combine the output of the correlators.

29. The ultra-wideband communication system of claim 27, wherein the correlators define a correlation window that enables the ultra-wideband receiver to synchronize with the ultra-wideband transmitter in a multipath environment.

30. The ultra-wideband communication system of claim 29, wherein a correlation window is longer than a delay spread of the multipath environment.

31. The ultra-wideband communication system of claim 30, wherein the correlation window is twice the length of the delay spread.

32. The ultra-wideband communication system of claim 27, wherein the plurality of correlators is used to determine a delay spread in a multipath environment.

33. The ultra-wideband communication system of claim 27, wherein the plurality of correlators is used to determine a location of at least one peak associated with each preamble section.

34. The ultra-wideband communication system of claim 23, wherein the synchronization section comprises multiple copies of the code.

35. The ultra-wideband communication system of claim 23, wherein the code is selected from a group consisting of: hierarchical codes, Golay codes, orthogonal Golay codes, m-sequence codes, Kasami codes, and Walsh codes.

36. The ultra-wideband communication system of claim 23, wherein a length of each of the data sections is ⅕ of a length of the communication frame.

37. The ultra-wideband communication system of claim 23, wherein a length of each of the data sections is ⅛th of a length of the communication frame.

38. The ultra-wideband communication system of claim 23, wherein the communication frame comprises a plurality of time bins, with each time bin capable of receiving an ultra-wideband pulse.

39. The ultra-wideband communication system of claim 23, wherein the communication frame comprises a plurality of time bins, with each time bin capable of receiving an ultra-wideband pulse, wherein the ultra-wideband pulse may range in duration from about 10 picoseconds to about one microsecond.

40. The ultra-wideband communication system of claim 23, wherein the step of transmitting the communication frame comprises transmitting a plurality of electromagnetic pulses, with each pulse occupying at least 500 megahertz of a radio frequency spectrum.

* * * * *